(12) United States Patent
Kato et al.

(10) Patent No.: US 7,698,138 B2
(45) Date of Patent: Apr. 13, 2010

(54) BROADCAST RECEIVING METHOD, BROADCAST RECEIVING SYSTEM, RECORDING MEDIUM, AND PROGRAM

(75) Inventors: Yumiko Kato, Osaka (JP); Takahiro Kamai, Kyoto (JP); Hideyuki Yoshida, Kyoto (JP); Yoshifumi Hirose, Nara (JP)

(73) Assignee: Panasonic Corporation, Osaka (JP)

( * ) Notice: Subject to any disclaimer, the term of this patent is extended or adjusted under 35 U.S.C. 154(b) by 1307 days.

(21) Appl. No.: 10/542,409

(22) PCT Filed: Dec. 26, 2003

(86) PCT No.: PCT/JP03/17015
§ 371 (c)(1),
(2), (4) Date: Jul. 14, 2005

(87) PCT Pub. No.: WO2004/064393
PCT Pub. Date: Jul. 29, 2004

(65) Prior Publication Data
US 2006/0259299 A1 Nov. 16, 2006

(30) Foreign Application Priority Data
Jan. 15, 2003 (JP) ............................. 2003-007442

(51) Int. Cl.
*G10L 15/00* (2006.01)
*G10L 15/06* (2006.01)
*G10L 11/00* (2006.01)
*G10L 21/00* (2006.01)

(52) U.S. Cl. ..................... 704/257; 704/239; 704/243; 704/270; 704/278

(58) Field of Classification Search ................ 704/270, 704/270.1, 275, 278, E15.018, E15.019, 239, 704/243, 257
See application file for complete search history.

(56) References Cited

U.S. PATENT DOCUMENTS
6,131,086 A * 10/2000 Walker et al. ................. 705/26
6,314,398 B1 11/2001 Junqua et al.

(Continued)

FOREIGN PATENT DOCUMENTS
JP 09-016191 1/1997

(Continued)

OTHER PUBLICATIONS

Hauptman, A.G., 1999. Speech recognition in the informedia digital video library: uses and limitations. ICdiTAI '95.*
D. Roy, Learning visually grounded words and syntax of natural spoken language. Evol. Commun. 4 (2001), pp. 33-56.*

(Continued)

*Primary Examiner*—David R Hudspeth
*Assistant Examiner*—Edgar Guerra-Erazo
(74) *Attorney, Agent, or Firm*—RatnerPrestia

(57) ABSTRACT

A broadcast receiving system includes a broadcast receiving part for receiving a broadcast in which additional information that corresponds to an object appearing in broadcast contents and that contains keyword information for specifying the object is broadcasted simultaneously with the broadcast contents; a recognition vocabulary generating section for generating a recognition vocabulary set in a manner corresponding to the additional information by using a synonym dictionary; a speech recognition section for performing the speech recognition of a voice uttered by a viewing person, and for thereby specifying keyword information corresponding to a recognition vocabulary set when a word recognized as the speech recognition result is contained in the recognition vocabulary set; and a displaying section for displaying additional information corresponding to the specified keyword information.

20 Claims, 39 Drawing Sheets

U.S. PATENT DOCUMENTS

| | | |
|---|---|---|
| 6,763,332 B1 | 7/2004 | Fujii |
| 6,961,700 B2 * | 11/2005 | Mitchell et al. ............. 704/235 |
| 7,324,947 B2 * | 1/2008 | Jordan et al. ................. 704/275 |
| 7,536,706 B1 * | 5/2009 | Sezan et al. .................. 725/113 |
| 2002/0143550 A1 * | 10/2002 | Nakatsuyama ........... 704/270.1 |
| 2002/0193998 A1 * | 12/2002 | Dvorak ....................... 704/270 |
| 2003/0110507 A1 * | 6/2003 | Dimitrova et al. ........... 725/110 |
| 2003/0196201 A1 * | 10/2003 | Schein et al. .................. 725/42 |
| 2004/0073493 A1 * | 4/2004 | Kato et al. ..................... 705/26 |
| 2006/0206340 A1 * | 9/2006 | Silvera et al. ............... 704/278 |

FOREIGN PATENT DOCUMENTS

| | | |
|---|---|---|
| JP | 09-186943 | 7/1997 |
| JP | 11-110385 A | 4/1999 |
| JP | 11-252533 A | 9/1999 |
| JP | 2000-244838 A | 9/2000 |
| JP | 2000-250575 A | 9/2000 |
| JP | 2001-022373 A | 1/2001 |
| JP | 2001-229180 A | 6/2001 |
| JP | 2001-258011 A | 9/2001 |
| JP | 2002-010207 | 1/2002 |
| JP | 2002-091477 A | 3/2002 |
| JP | 2002-290859 A | 10/2002 |
| JP | 2002-330422 A | 11/2002 |
| WO | WO 03/021943 A1 | 3/2003 |

OTHER PUBLICATIONS

D. Roy, "Towards Visually-Grounded Spoken Language Acquisition", International Conference on Multimodal Interfaces, in Proceedings IEEE, (ICMI'02).*

EIC_Search_Report.*

R. Nakatsu, N. Tosa, and T. Ochi, "Interactive Movie System with Multi-person Participation and Anytime Interaction Capabilities", Proc. ACM Int. Conf. Multimedia, Bristol, UK, 1998.*

Japanese Office Action for JP 2004-566305, dated Feb. 14, 2006.

International Search Report for PCT/JP2003/017015, dated May 18, 2004, and English translation thereof.

* cited by examiner

Fig.5

| | Word (391) | Pronunciation (392) | Word class (393) | Appearance frequency (394) |
|---|---|---|---|---|
| | ... | ... | ... | ... |
| | coat | 'coat' | clothing | 0.10 |
| | ... | ... | ... | ... |
| | jacket | 'jacket' | clothing | 0.20 |
| | car inspection | 'car inspection' | social system | 0.15 |
| | garage | 'garage' | building | 0.13 |
| | squilla | 'squilla' | food | 0.04 |
| | small fry | 'small fry' | food | 0.06 |
| | ... | ... | ... | ... |
| | dress | 'dress' | clothing | 0.30 |
| | ... | ... | ... | ... |

| | Word 401 | Pronunciation 461 | Word class 1 402 | Word class 2 403 | ... Word class n 404 | Appearance frequency 405 |
|---|---|---|---|---|---|---|
| 400 | ...... | ...... | ...... | ...... | | ...... |
| | jacket | 'jacket' | clothing | fashion | | 0.020 |
| | car inspection | 'car inspection' | social system | transportation | | 0.015 |
| | garage | 'garage' | building | transportation | ● ● ● ● ● | 0.013 |
| | squilla | 'squilla' | food | shellfish | | 0.004 |
| | small fry | 'small fry' | food | fish | | 0.006 |
| | ...... | ...... | ...... | ...... | | ...... |

Fig. 13

| | 407 Word | 408 Word class | 409 Frequency |
|---|---|---|---|
| 406 | jacket | clothing, fashion | 0.02 |
| | dress | clothing, fashion | 0.03 |
| | coat | clothing, fashion | 0.01 |
| | .. | .. | .. |
| | bag | general goods, fashion | 0.02 |
| | .. | .. | .. |

Fig.14

| Pronunciation 411 | Frequency within set 412 |
|---|---|
| 'jacket' | 0.2 |
| 'dress' | 0.3 |
| 'coat' | 0.1 |
| : | : |
| 'bag' | 0.2 |
| : | : |

```
P('jacket'|'that')  =  P([clothing]|[demonstrative]) × P('jacket'|[clothing])
P('dress'|'that')   =  P([clothing]|[demonstrative]) × P('dress'|[clothing])
P('coat'|'that')    =  P([clothing]|[demonstrative]) × P('coat'|[clothing])
P('shirt'|'that')   =  P([clothing]|[demonstrative]) × P('shirt'|[clothing])
...
```

When four words belong to word class $C_i$,
$C_i = \{W_{i1}, W_{i2}, W_{i3}, W_{i4}\}$
$C_i$: [clothing]
$W_{i1}$: 'jacket'
$W_{i2}$: 'dress'
$W_{i3}$: 'coat'
$W_{i4}$: 'shirt'

421: 'pumps', 'lipstick', 'television', 'jacket', 'air conditioner', 'cosmetic', 'jacket', 'dress', 'heels', 'bag'

$P'(\text{'jacket'}|[\text{clothing}]) = P(\text{'jacket'}|[\text{clothing}]) + 2/100$
$P'(\text{'dress'}|[\text{clothing}]) = P(\text{'dress'}|[\text{clothing}]) + 1/100$
$P'(\text{'coat'}|[\text{clothing}]) = P(\text{'coat'}|[\text{clothing}]) - \dfrac{P(\text{'coat'}|[\text{clothing}])}{1-(P(\text{'jacket'}|[\text{clothing}])+P(\text{'dress'}|[\text{clothing}]))} \times 3/100$
$P'(\text{'shirt'}|[\text{clothing}]) = P(\text{'shirt'}|[\text{clothing}]) - \dfrac{P(\text{'shirt'}|[\text{clothing}])}{1-(P(\text{'jacket'}|[\text{clothing}])+P(\text{'dress'}|[\text{clothing}]))} \times 3/100$

422:

| $W_i$ | $P'(W_{ix}|[\text{clothing}])$ |
|---|---|
| 'jacket' | 0.42 |
| 'dress' | 0.31 |
| 'coat' | 0.18 |
| 'shirt' | 0.09 |

425:

| $W_i$ | $P(W_{ix}|[\text{clothing}])$ |
|---|---|
| 'jacket' | 0.4 |
| 'dress' | 0.3 |
| 'coat' | 0.2 |
| 'shirt' | 0.1 |

Fig.22

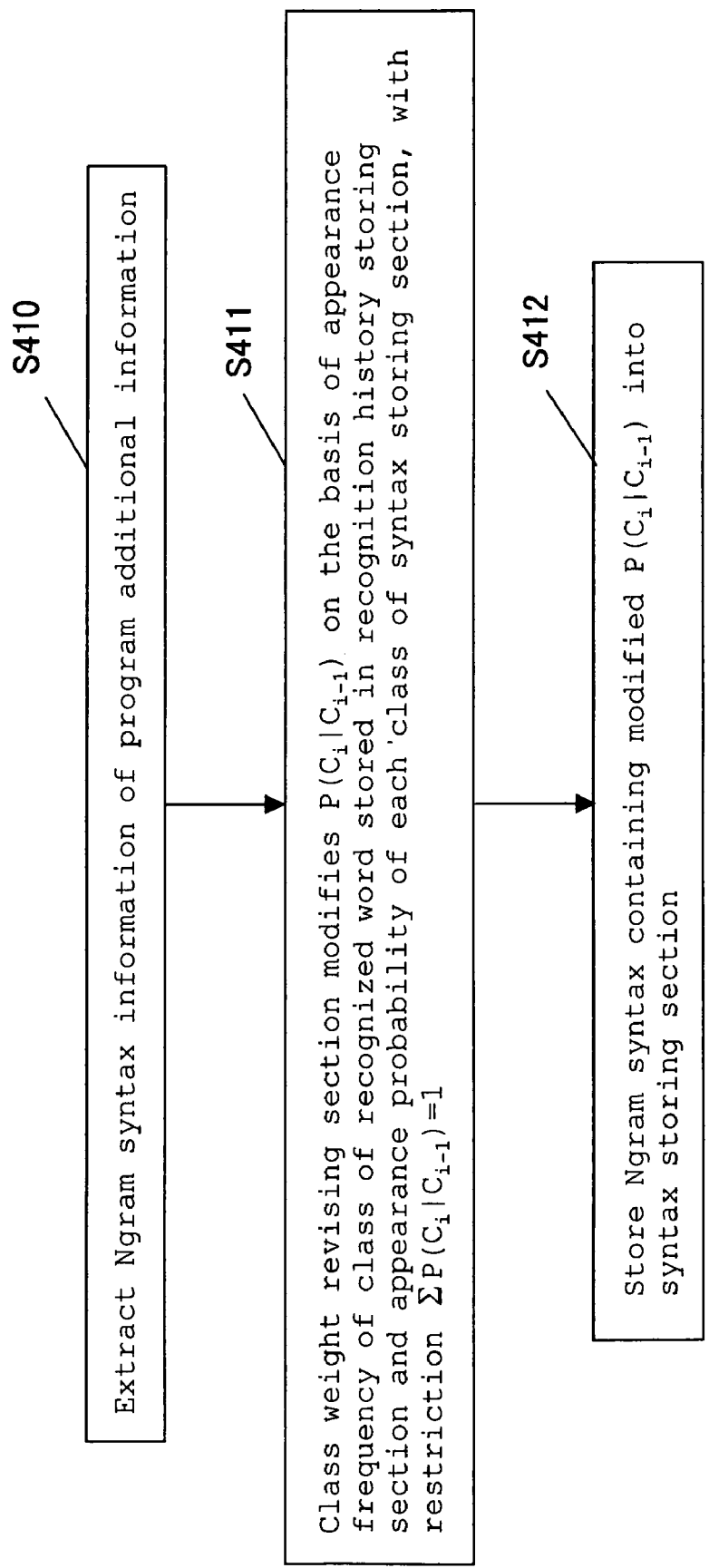

S410: Extract Ngram syntax information of program additional information

S411: Class weight revising section modifies $P(C_i|C_{i-1})$ on the basis of appearance frequency of class of recognized word stored in recognition history storing section and appearance probability of each class of syntax storing section, with restriction $\Sigma P(C_i|C_{i-1})=1$ S412: Store Ngram syntax containing modified $P(C_i|C_{i-1})$ into syntax storing section

Fig.24

| $C_i$ | $C_{i-1}$ | $P(C_i|C_{i-1})$ |
|---|---|---|
| clothing | demonstrative | 0.30 |
| furniture | demonstrative | 0.15 |
| general goods | adnominal | 0.30 |
| food | adnominal | 0.20 |
| .. | .. | .. |
| .. | .. | .. |

Fig.25

$C=\{C_1, C_2, \ldots C_n\}$

450

451

| | |
|---|---|
| 'pumps' | general goods |
| 'lipstick' | cosmetic |
| 'dryer' | electrical appliance |
| 'jacket' | clothing |
| 'washing machine' | electrical appliance |
| 'cosmetic' | demonstrative |
| 'jacket' | clothing |
| 'dress' | clothing |
| 'bag' | general goods |
| 'dress' | clothing |

453

$P(C_n|C_n)$
$C_3$

| Rule | $P(C_n|C_j)$ |
|---|---|
| [clothing] \| [demonstrative] | 0.74 |
| [furniture] \| [demonstrative] | 0.26 |

452

$P(C_n|C_n)$
$C_3$

| Rule | $P(C_n|C_2)$ |
|---|---|
| [clothing] \| [demonstrative] | 0.7 |
| [furniture] \| [demonstrative] | 0.3 |

Fig.33

| Goods | Detailed description |
|---|---|
| Jacket | / Price 9,800 yen; Size S, L, M available; ... |
| Dress | / Price 12,000 yen; Size S, L, M available; ... |
| Book | / Price 2,400 yen; ... |
| Desk | / Price 22,000 yen; ... |

_BROADCAST RECEIVING METHOD, BROADCAST RECEIVING SYSTEM, RECORDING MEDIUM, AND PROGRAM_

This application is a U.S. National Phase Application of PCT International Application PCT/JP 2003/017015.

TECHNICAL FIELD

The present invention relates to a broadcast receiving method, a broadcast receiving system, a first apparatus, a second apparatus, a recording medium, and a program which receive a broadcast broadcasted from a broadcasting station.

BACKGROUND ART

When watching a program or a commercial broadcasted by conventional television broadcasting, a viewing person sometime desires to acquire an object such as an article appearing in the program or the commercial and music performed in the program or the commercial.

In this case, the viewing person first connects a PC (personal computer) to the Internet, then retrieves on the Internet the information of such an object, and thereby acquires the information of the target object.

Then, on the basis of the acquired information, the viewing person contacts with or goes to a vendor who sells the object, and thereby purchases the object. Conventionally, a viewing person had purchased an object appearing in a program or a commercial, in such a manner.

Nevertheless, in order to acquire an object appearing in a broadcasted program or a broadcasted commercial, the viewing person need access the Internet through a PC completely independently of the reception of the broadcast, and then need download the information of the object via the Internet. Further, on the basis of the downloaded information, an order for the object need be placed by telephone or the like. This is inconvenient.

That is, conventional broadcasting has a problem that an object appearing in a broadcasted program or a broadcasted commercial cannot be obtained easily, but that certain time and effort are necessary, and hence it is inconvenient.

Thus, in order to resolve the above-mentioned problem, in a previous application of the present inventor (Japanese patent application No. 2001-258564), the present inventor has proposed a shopping assistance system employing two-way broadcasting that allows an object appearing in a broadcasted program or a broadcasted commercial to be acquired easily without much time and effort. The entire disclosure of the reference of Japanese patent application No. 2001-258564 is incorporated herein by reference in its entirety.

The shopping assistance system employing two-way broadcasting proposed by the present inventor is described below.

FIG. 37 is a block diagram showing the conceptual configuration of the shopping assistance system employing two-way broadcasting in the previous application of the present inventor. FIG. 38 is a flow chart showing the operation of the shopping assistance system employing two-way broadcasting (simply referred to as a shopping assistance system, hereafter) FIG. 39 is a functional block diagram showing the detail of a part of FIG. 37.

In FIG. 37, the shopping assistance system comprises a broadcasting station 10, a vendor 20, and a home 30. A TV/STB 310 and a remote controller 320 are installed in the home 30.

The broadcasting station 10 is a broadcasting station which broadcasts a program together with program additional information. The vendor 20 is a vendor who sells an article appearing in a program. The home 30 is a home where the broadcast is received.

The TV/STB 310 is a two-way broadcasting receiver composed of a television receiver or an STB (Set Top Box) serving as a two-way broadcasting receiver.

The remote controller 320 is part of operating the TV/STB 310, and is provided with a microphone 321.

The TV/STB 310 is provided with a recognition vocabulary storing section 311, a speech recognition section 312, and the like. That is, as shown in FIG. 39, the TV/STB 310 comprises a broadcast receiving section 313, a recognition vocabulary generating section 314, the recognition vocabulary storing section 311, the speech recognition section 312, a time expression dictionary 316, a stored time controlling section 315, an additional information storing section 317, a displaying section 318, and a transmitting section 319.

The broadcast receiving section 313 is part of receiving broadcasting radio waves. The recognition vocabulary generating section 314 is part of generating a recognition vocabulary serving as an object of speech recognition, from the program additional information received by the broadcast receiving section 313. The recognition vocabulary storing section 311 is part of storing the generated recognition vocabulary. The time expression dictionary 316 is a dictionary of retaining expressions concerning time such as "now" and "a while ago", as a recognition vocabulary. The speech recognition section 312 is part of performing speech recognition by using as a recognition vocabulary dictionary the recognition vocabulary storing section 311 and the time expression dictionary 316. The stored time controlling section 315 is part of learning the relation between each time expression vocabulary and an actual time width or the number of scenes on the basis of the relation between a recognized time expression vocabulary and an information selection input performed by a viewing person, and of thereby controlling the speech recognition section 312 and the recognition vocabulary storing section 311. The additional information storing section 317 is part of storing additional information corresponding to a within-the-program article or the like specified by speech recognition. The displaying section 318 is part of displaying the additional information. The transmitting section 319 is part of transmitting to the broadcasting station an input result such as the selection of additional information performed by a viewing person.

Next, the operation of such a shopping assistance system is described below.

FIG. 38 shows the operation of the shopping assistance system and its service. The following description is given with reference to FIG. 38.

First, during the watching of a program, a viewing person pays attention to an article or the like appearing in the program, and then utters words notifying that attention is paid to a specific article. Then, the microphone 321 receives the utterance, and then outputs a signal to the speech recognition section 312.

The speech recognition section 312 performs speech recognition on the utterance signal inputted through the microphone 321. On the basis of the speech recognition result, the speech recognition section 312 judges the article or the like of the viewing person's attention, then specifies corresponding program additional information, and then accumulates the information into the additional information storing section 317 (step 331).

Detailed description is given below for the case that a drama is watched. For example, during the watching of the drama, the viewing person paid attention to a suit worn by a character. However, the character who wears the suit has exited the screen. In this case, the viewing person utters "the red jacket a while ago is good" or the like.

The voice uttered by the viewing person is inputted through the microphone 321. With reference to the time expression dictionary 316 and the recognition vocabulary storing section 311, the speech recognition section 312 recognizes the inputted voice, and then extracts corresponding additional information from the broadcasted program additional information.

The recognition vocabulary stored in the recognition vocabulary storing section 311 is generated by the recognition vocabulary generating section 314 by successively accumulating each vocabulary indicating an article, music, or the like provided with additional information obtained from the received program additional information. That is, the program additional information contains also keyword information of specifying an article or music to which program additional information has been made to correspond at the broadcasting station. The recognition vocabulary generating section 314 generates the recognition vocabulary from this keyword information. Then, the speech recognition section 312 performs the speech recognition of a viewing person's uttered voice such as "the red jacket a while ago is good", and thereby extracts a recognition vocabulary from the viewing person's uttered voice. For example, in the case of the uttered voice "the red jacket a while ago is good", a recognition vocabulary of "red" and "jacket" is extracted. Then, program additional information is selected that has the largest number of keyword information pieces corresponding to the extracted recognition vocabulary. Then, the selected program additional information is stored into the additional information storing section 317. That is, when certain program additional information contains both of the keyword information corresponding to the recognition vocabulary "red" and the keyword information corresponding to the recognition vocabulary "jacket", this program additional information is stored into the additional information storing section 317. As such, the speech recognition section 312 can specify program additional information by means of selection.

The description has been given for the case that the speech recognition section 312 selects program additional information having the largest number of keyword information pieces corresponding to the recognition vocabulary extracted from the viewing person's uttered voice. However, the invention is not limited to this. The speech recognition section 312 may select, for example, five pieces of program additional information in the descending order of the number of keyword information pieces corresponding to the recognition vocabulary extracted from the viewing person's uttered voice. Then, the selected program additional information may be stored into the additional information storing section 317. As such, the speech recognition section 312 may narrow down the program additional information, instead of specifying the information.

The stored time controlling section 315 performs control such that the generated recognition vocabulary should be retained during a time corresponding to a time range or the number of scenes having been set in advance or alternatively to a time range or the number of scenes that is the largest in the time expressions learned on the basis of the previous utterance of the viewing person and the subsequent input. The learning in the stored time controlling section 315 is described later. For example, in the case of the uttered voice "the red jacket a while ago is good", in response to the control of the stored time controlling section 315, the speech recognition section 312 extracts a time expression vocabulary "a while ago" indicating a past. Then, with reference to the time expression dictionary 316, the speech recognition section 312 performs the above-mentioned specifying or narrowing down on the program additional information broadcasted within the time range or the number of scenes corresponding to "a while ago".

After the drama ends (step 332), the displaying section 318 displays the additional information corresponding to the article which has appeared in the drama and has been specified by speech recognition (step 333).

The additional information contains information on the dimensions, the weight, the quality of the material, the color variation, the prices of the size variation, the manufacturer, the vendor, the vendor's contact address, and the like. The viewing person checks and examines the information. Then, when purchasing, the viewing person selects additional information and thereby inputs purchase information by using inputting part such as the remote controller 320, a pointing device, and speech recognition.

The transmitting section 319 transmits to the broadcasting station the purchase information together with an identification number or the like of the corresponding additional information (step 334).

As described above, on the basis of the relation between a recognized time expression vocabulary and an information selection input performed by a viewing person, the stored time controlling section 315 learns the relation between each time expression vocabulary and an actual time width or the number of scenes. This process of learning is described below in detail. The stored time controlling section 315 retains information of establishing the correspondence of each recognition vocabulary which is a time expression stored in the time expression dictionary 316, to an actual time width or the number of scenes. For example, the stored time controlling section 315 establishes the correspondence of a recognition vocabulary "a while ago" to a time width ranging from 20 seconds before to 5 minutes before relative to the present, and the correspondence of a recognition vocabulary "now" to a time width ranging from the present to 30 seconds before the present.

Thus, as described above, when a recognition vocabulary indicating the time expression "a while ago" is received from the speech recognition section 312, the stored time controlling section 315 performs the control such that the specifying and the narrowing down should be performed on the program additional information received within the time width ranging from 20 seconds before to 5 minutes before relative to the present. In response to this control, the speech recognition section 312 performs the control such that the specifying and the narrowing down should be performed on the program additional information received within the time width ranging from 20 seconds before to 5 minutes before relative to the present. Then, the specified or narrowed down program additional information is stored into the additional information storing section 317. That is, the stored time controlling section 315 performs the control such that the recognition vocabulary generated within this time width should be retained.

Meanwhile, when the stored time controlling section 315 receives a recognition vocabulary indicating a time expression "a while ago", and when the time width ranging from 20 seconds before to 5 minutes before relative to the present is made to correspond to the time expression as described above, the program additional information displayed on the displaying section 318 could have a time width different from the intention of the viewing person. In this case, the viewing person utters "redo", "display preceding information", "display subsequent information", or the like to the microphone 321.

Then, the speech recognition section 312 performs speech recognition on the utterance of the viewing person, and then notifies the speech recognition result to the stored time controlling section 315. In the speech recognition of an utterance "display preceding information", the speech recognition section 312 extracts "display", "preceding", and "information" as a recognition vocabulary, and then notifies the result to the stored time controlling section 315.

On receiving a recognition vocabulary of "display", "preceding", and "information" from the speech recognition section 312, the stored time controlling section 315 revises the information on the time width made to correspond to the recognition vocabulary indicating the time expression "a while ago". That is, revision is performed such that the recognition vocabulary "a while ago" should correspond to a time width ranging from 40 seconds before to 5 minutes and 40 seconds before relative to the present. Then, the stored time controlling section 315 controls the speech recognition section 312 such that the speech recognition section 312 should specify or narrow down the program additional information again with respect to the program additional information received between 40 seconds before and 5 minutes and 40 seconds before relative to the present. In response to the control of the stored time controlling section 315, the speech recognition section 312 specifies again or narrows down the program additional information again, and then stores the specified or narrowed down program additional information into the additional information storing section 317. Then, the displaying section 318 displays the program additional information stored in the additional information storing section 317. Then, if the desired article is included in the displayed program additional information, the viewing person selects the program additional information, and thereby inputs purchase information.

When this procedure is repeated many times, the stored time controlling section 315 can incorporate the intention of the viewing person into the recognition vocabulary for time expressions, or establish appropriate time width correspondence. As such, the learning is performed in the stored time controlling section 315.

As described above, according to the shopping assistance system and the service, with respect to an article, music, or the like which appears in a program and in which a viewing person becomes interested, the information can be obtained and then the article or the like can be purchased in a manner that the watching of the program itself is not interrupted by the work of making a memorandum or the like, merely by means of natural utterance performed in parallel to the watching of the program.

The use of the shopping assistance system proposed by the present inventor realizes such an outstanding effect.

Nevertheless, in the shopping assistance system in the previous application of the present inventor, additional information is specified by judging the degree of agreement between the word obtained by speech recognition and the keyword corresponding to the keyword information contained in the additional information. Thus, it is desired that the specifying of the additional information should be performed more flexibly and appropriately than in this method. That is, an issue is present that an object appearing in a broadcasted program or a broadcasted commercial should be acquired more easily with less time and effort.

Further, it is desired that the additional information should be specified in a manner more suitable for the expression uttered by a viewing person. That is, an issue is present that an object appearing in a broadcasted program or a broadcasted commercial should be acquired easily without much time and effort in a manner suitable for the expression uttered by a viewing person.

Further, an issue is present that the additional information should be specified in a manner more suitable for the interest of a viewing person. That is, an issue is present that an object appearing in a broadcasted program or a broadcasted commercial should be acquired easily without much time and effort in a manner suitable for the interest of a viewing person.

DISCLOSURE OF THE INVENTION

With considering the above-mentioned issues, an object of the present invention is to provide a broadcast receiving method, a broadcast receiving system, a first apparatus, a second apparatus, a recording medium, and a program which allow an object appearing in a broadcasted program or a broadcasted commercial to be acquired more easily with less time and effort.

Further, with considering the above-mentioned issues, an object of the present invention is to provide a broadcast receiving method, a broadcast receiving system, a first apparatus, a second apparatus, a recording medium, and a program in which an object appearing in a broadcasted program or a broadcasted commercial is acquired easily without much time and effort in a manner suitable for the expression uttered by a viewing person.

Further, with considering the above-mentioned issues, an object of the present invention is to provide a broadcast receiving method, a broadcast receiving system, a first apparatus, a second apparatus, a recording medium, and a program in which an object appearing in a broadcasted program or a broadcasted commercial is acquired easily without much time and effort in a manner suitable for the interest of a viewing person.

In order to solve the above problems, a first aspect of the present invention is a broadcast receiving method comprising:

a receiving step of receiving a broadcast in which additional information that is made to correspond to an object appearing in broadcast contents broadcasted from a broadcasting station and that contains keyword information of specifying said object is broadcasted simultaneously with said broadcast contents;

a recognition vocabulary set generating step of utilizing a synonym dictionary in which a plurality of words are classified into word classes on the basis of the synonymy between the words, and of thereby generating, in a manner corresponding to said additional information, a recognition vocabulary set consisting of words belonging to said word class including a word corresponding to said keyword information;

a speech recognition step of performing speech recognition of a voice uttered by a viewing person;

a specifying step of specifying said keyword information corresponding to said recognition vocabulary set when a word recognized as the speech recognition result is contained in the recognition vocabulary set; and a displaying step of displaying additional information corresponding to said specified keyword information.

A second aspect of the present invention is a broadcast receiving method comprising:

a receiving step of receiving a broadcast in which additional information that is made to correspond to an object appearing in broadcast contents broadcasted from a broadcasting station and that contains keyword information of specifying said object and a language model are broadcasted simultaneously with said broadcast contents;

a correcting step of utilizing a synonym dictionary in which a plurality of words are classified into word classes on the basis of the synonymy between the words, and of thereby correcting a frequency of appearance of a predetermined combination of said word classes in an expression form of said language model and/or a frequency of appearance of a predetermined word with reference to said word class in an expression form of said language model, on the basis of history information of speech recognition result of already performed speech recognition;

a speech recognition step of performing speech recognition of a voice uttered by a viewing person, by using said corrected language model;

a specifying step of specifying said keyword information on the basis of the speech recognition result; and a displaying step of displaying additional information corresponding to said specified keyword information.

A third aspect of the present invention is a broadcast receiving method comprising:

a receiving step of receiving a broadcast in which additional information that is made to correspond to an object appearing in broadcast contents broadcasted from a broadcasting station and that contains keyword information of specifying said object and information of specifying a language model are broadcasted simultaneously with said broadcast contents;

a language model specifying step of specifying said language model retained in advance, by using information of specifying said received language model;

a correcting step of utilizing a synonym dictionary in which a plurality of words are classified into word classes on the basis of the synonymy between the words, and of thereby correcting a frequency of appearance of a predetermined combination of said word classes in an expression form of said specified language model and/or a frequency of appearance of a predetermined word with reference to said word class in an expression form of said specified language model, on the basis of history information of speech recognition result of already performed speech recognition;

a speech recognition step of performing speech recognition of a voice uttered by a viewing person, by using said corrected language model;

a specifying step of specifying said keyword information on the basis of the speech recognition result; and a displaying step of displaying additional information corresponding to said specified keyword information.

A fourth aspect of the present invention is a broadcast receiving system comprising a first apparatus having broadcasting part for broadcasting additional information that is made to correspond to an object appearing in broadcast contents broadcasted from a broadcasting station and that contains keyword information specifying said object, simultaneously with said broadcast contents, and a second apparatus having: receiving part for receiving said broadcast broadcasted from said first apparatus; recognition vocabulary set generating part for utilizing a synonym dictionary in which a plurality of words are classified into word classes on the basis of the synonymy between the words, and of thereby generating, in a manner corresponding to said additional information, a recognition vocabulary set consisting of words belonging to said word class including a word corresponding to said broadcasted keyword information; speech recognition part for performing speech recognition of a voice uttered by a viewing person; specifying part for specifying said keyword information corresponding to said recognition vocabulary set when a word recognized as the speech recognition result is contained in the recognition vocabulary set; and displaying part for displaying additional information corresponding to said specified keyword information.

A fifth aspect of the present invention is a broadcast receiving system comprising a first apparatus having broadcasting part for broadcasting additional information that is made to correspond to an object appearing in broadcast contents broadcasted from a broadcasting station and that contains keyword information specifying said object, and a language model, simultaneously with said broadcast contents, and a second apparatus having: receiving part for receiving said broadcast broadcasted from said first apparatus; correcting part for utilizing a synonym dictionary in which a plurality of words are classified into word classes on the basis of the synonymy between the words, and of thereby correcting a frequency of appearance of a predetermined combination of said word classes in an expression form of said language model and/or a frequency of appearance of a predetermined word with reference to said word class in an expression form of said broadcasted language model, on the basis of history information of speech recognition result of already performed speech recognition; speech recognition part for performing speech recognition of a voice uttered by a viewing person, by using said corrected language model; specifying part for specifying said keyword information on the basis of the speech recognition result; and displaying part for displaying additional information corresponding to said specified keyword information.

A sixth aspect of the present invention is a broadcast receiving system comprising a first apparatus having broadcasting part for broadcasting additional information that is made to correspond to an object appearing in broadcast contents broadcasted from a broadcasting station and that contains keyword information specifying said object, and information specifying a language model, simultaneously with said broadcast contents, and a second apparatus having: receiving part for receiving said broadcast broadcasted from said first apparatus; language model specifying part for specifying said language model retained in advance, by using information specifying said received language model; correcting part for utilizing a synonym dictionary in which a plurality of words are classified into word classes on the basis of the synonymy between the words, and of thereby correcting a frequency of appearance of a predetermined combination of said word classes in an expression form of said specified language model and/or a frequency of appearance of a predetermined word with reference to said word class in an expression form of said specified language model, on the basis of history information of speech recognition result of already performed speech recognition; speech recognition part for performing speech recognition of a voice uttered by a viewing person, by using said corrected language model; specifying part specifying said keyword information on the basis of the speech recognition result; and displaying part for displaying additional information corresponding to said specified keyword information.

A seventh aspect of the present invention is a first apparatus comprising broadcasting part for broadcasting additional information that is made to correspond to an object appearing in broadcast contents broadcasted from a broadcasting station and that contains keyword information specifying said object, simultaneously with said broadcast contents, wherein said broadcast is received by a second apparatus comprising: receiving part for receiving said broadcast; recognition vocabulary set generating part for utilizing a synonym dictionary in which a plurality of words are classified into word classes on the basis of the synonymy between the words, and of thereby generating, in a manner corresponding to said additional information, a recognition vocabulary set consisting of words belonging to said word class including a word corresponding to said broadcasted keyword information; speech recognition part for performing speech recognition of a voice uttered by a viewing person; specifying part for specifying said keyword information corresponding to said recognition vocabulary set when a word recognized as the speech recognition result is contained in the recognition vocabulary set; and displaying part for displaying additional information corresponding to said specified keyword information.

An eighth aspect of the present invention is a first apparatus comprising broadcasting part for broadcasting additional information that is made to correspond to an object appearing in broadcast contents broadcasted from a broadcasting station and that contains keyword information specifying said object, and a language model, simultaneously with said broadcast contents, wherein said broadcast is received by a second apparatus comprising: receiving part for receiving said broadcast; correcting part for utilizing a synonym dictionary in which a plurality of words are classified into word classes on the basis of the synonymy between the words, and of thereby correcting a frequency of appearance of a predetermined combination of said word classes in an expression form of said language model and/or a frequency of appearance of a predetermined word with reference to said word class in an expression form of said broadcasted language model, on the basis of history information of speech recognition result of already performed speech recognition; speech recognition part for performing speech recognition of a voice uttered by a viewing person, by using said corrected language model; specifying part for specifying said keyword information on the basis of the speech recognition result; and displaying part for displaying additional information corresponding to said specified keyword information.

A ninth aspect of the present invention is a first apparatus comprising broadcasting part for broadcasting additional information that is made to correspond to an object appearing in broadcast contents broadcasted from a broadcasting station and that contains keyword information specifying said object, and information specifying a language model, simultaneously with said broadcast contents, wherein said broadcast is received by a second apparatus comprising: receiving part for receiving said broadcast; language model specifying part for specifying said language model retained in advance, by using information specifying said received language model; correcting part for utilizing a synonym dictionary in which a plurality of words are classified into word classes on the basis of the synonymy between the words, and of thereby correcting a frequency of appearance of a predetermined combination of said word classes in an expression form of said specified language model and/or a frequency of appearance of a predetermined word with reference to said word class in an expression form of said specified language model, on the basis of history information of speech recognition result of already performed speech recognition; speech recognition part for performing speech recognition of a voice uttered by a viewing person, by using said corrected language model; specifying part for specifying said keyword information on the basis of the speech recognition result; and displaying part for displaying additional information corresponding to said specified keyword information.

A tenth aspect of the present invention is a second apparatus comprising:

receiving part for receiving a broadcast broadcasted from a first apparatus having broadcasting part for broadcasting additional information that is made to correspond to an object appearing in broadcast contents broadcasted from a broadcasting station and that contains keyword information specifying said object, simultaneously with said broadcast contents;

recognition vocabulary set generating part for utilizing a synonym dictionary in which a plurality of words are classified into word classes on the basis of the synonymy between the words, and of thereby generating, in a manner corresponding to said additional information, a recognition vocabulary set consisting of words belonging to said word class including a word corresponding to said received keyword information;

speech recognition part for performing speech recognition of a voice uttered by a viewing person;

specifying part for specifying said keyword information corresponding to said recognition vocabulary set when a word recognized as the speech recognition result is contained in the recognition vocabulary set; and displaying part for displaying additional information corresponding to said specified keyword information.

An eleventh aspect of the present invention is a second apparatus according to the tenth aspect of the present invention, wherein an appearance frequency determined in advance is imparted to each word of said synonym dictionary, and wherein when a plurality of words have been recognized as candidates of said speech recognition, said speech recognition part specifies a word having the highest appearance frequency, as a word recognized as said speech recognition result.

A twelfth aspect of the present invention is a second apparatus according to the eleventh aspect of the present invention, comprising appearance frequency correcting part for rewriting said appearance frequency depending on a recognition result of said speech recognition result.

A thirteenth aspect of the present invention is a second apparatus according to the eleventh aspect of the present invention, comprising appearance frequency correcting part for rewriting said appearance frequency corresponding to each word of said recognition vocabulary set depending on history information of said speech recognition result, wherein said appearance frequency corresponding to each word is imparted to each word of said recognition vocabulary set, and wherein said speech recognition part performs said speech recognition using said appearance frequencies of said recognition vocabulary set.

A fourteenth aspect of the present invention is a second apparatus comprising:

receiving part for receiving a broadcast broadcasted from a first apparatus having broadcasting part for broadcasting additional information that is made to correspond to an object appearing in broadcast contents broadcasted from a broadcasting station and that contains keyword information specifying said object, and a language model, simultaneously with said broadcast contents;

correcting part for utilizing a synonym dictionary in which a plurality of words are classified into word classes on the basis of the synonymy between the words, and of thereby correcting a frequency of appearance of a predetermined combination of said word classes in an expression form of said language model and/or a frequency of appearance of a predetermined word with reference to said word class in an expression form of said received language model, on the basis of history information of speech recognition result of already performed speech recognition;

speech recognition part for performing speech recognition of a voice uttered by a viewing person, by using said corrected language model;

specifying part for specifying said keyword information on the basis of the speech recognition result; and displaying part for displaying additional information corresponding to said specified keyword information.

A fifteenth aspect of the present invention is a second apparatus comprising:

receiving part for receiving a broadcast broadcasted from a first apparatus having broadcasting part for broadcasting additional information that is made to correspond to an object appearing in broadcast contents broadcasted from a broadcasting station and that contains keyword information specifying said object, and information specifying a language model, simultaneously with said broadcast contents;

language model specifying part for specifying said language model retained in advance, by using information specifying said received language model;

correcting part for utilizing a synonym dictionary in which a plurality of words are classified into word classes on the basis of the synonymy between the words, and of thereby correcting a frequency of appearance of a predetermined combination of said word classes in an expression form of said specified language model and/or a frequency of appearance of a predetermined word with reference to said word class in an expression form of said specified language model, on the basis of history information of speech recognition result of already performed speech recognition;

speech recognition part for performing speech recognition of a voice uttered by a viewing person, by using said corrected language model;

specifying part for specifying said keyword information on the basis of the speech recognition result; and displaying part for displaying additional information corresponding to said specified keyword information.

A sixteenth aspect of the present invention is a second apparatus according to the fifteenth aspect of the present invention, wherein the information specifying said language model is an ID imparted to said language model in advance.

A seventeenth aspect of the present invention is a second apparatus according to the fifteenth aspect of the present invention, wherein:

the information specifying said language model is keyword information for language model specification;

said keyword information for language model specification is imparted also to said language model retained in advance; and said language model specifying part specifies said language model depending on the degree of agreement of those keywords for language model specification.

An eighteenth aspect of the present invention is a second apparatus according to any one of the fourteenth through seventeenth aspects of the present invention.

in a case that said correcting part corrects a frequency of appearance of a predetermined word with reference to a predetermined word class in an expression form of said language model, wherein:

said history information contains a word recognized in said already performed speech recognition;

said correcting part extracts a word contained in said word class containing the word corresponding to said keyword information;

with respect to a word contained in said history information among the extracted words, a frequency of appearance of the word with reference to said word class in an expression form of said language model is increased; and with respect to a word not contained in said history information among the extracted words, a frequency of appearance of the word with reference to said word class in an expression form of said language model is decreased.

A nineteenth aspect of the present invention is a second apparatus according to any one of the fourteenth through seventeenth aspects of the present inventions, in a case that said correcting part corrects a frequency of appearance of a predetermined combination of said word classes in an expression form of said language model, wherein:

said history information contains a word recognized in said already performed speech recognition;

said correcting part extracts a word contained in said word class containing the word corresponding to said keyword information;

with respect to said extracted word class, a frequency of appearance of a predetermined combination of said word classes in an expression form of said language model is increased; and with respect to a word class not extracted, a frequency that the word class appears after a predetermined sequence of said word classes in an expression form of said language model is decreased.

A twentieth aspect of the present invention is a second apparatus according to any one of the fourteenth through seventeenth aspects of the present inventions, in a case that said correcting part corrects a frequency of appearance of a predetermined combination of said word classes in an expression form of said language model, wherein:

said history information contains a word class containing a word recognized in said already performed speech recognition;

said correcting part extracts a word class containing a word corresponding to said keyword information;

with respect to said extracted word class, a frequency of appearance of a predetermined combination of said word classes in an expression form of said language model is increased; and with respect to a word class not extracted, a frequency of appearance of a predetermined combination of said word classes in an expression form of said language model is reduced.

A twenty first aspect of the present invention is a second apparatus according to any one of the tenth to the seventeenth aspects of the present invention, comprising transmitting part for transmitting an instruction corresponding to a predetermined operation to a predetermined transmission destination when the predetermined operation is performed on said displayed additional information.

A twenty second aspect of the present invention is a second apparatus according to the twenty first aspect of the present invention, wherein said additional information is goods sales information and/or services sales information, and wherein said instruction corresponding to a predetermined operation is a request for brochure or purchase instruction information concerning said goods and/or said service.

A twenty third aspect of the present invention is a second apparatus according to the fifteenth aspect of the present invention, wherein said language model retained in advance has been acquired in advance through a network.

A twenty fourth aspect of the present invention is a computer-processible recording medium having a program for causing a computer to serve, in a second apparatus according to the tenth aspect of the present invention, as:

receiving part for receiving a broadcast broadcasted from a first apparatus having broadcasting part for broadcasting additional information that is made to correspond to an object appearing in broadcast contents broadcasted from a broadcasting station and that contains keyword information specifying said object, simultaneously with said broadcast contents;

recognition vocabulary set generating part for utilizing a synonym dictionary in which a plurality of words are classified into word classes on the basis of the synonymy between the words, and of thereby generating, in a manner corresponding to said additional information, a recognition vocabulary set consisting of words belonging to said word class including a word corresponding to said received keyword information;

speech recognition part for performing speech recognition of a voice uttered by a viewing person;

specifying part for specifying said keyword information corresponding to said recognition vocabulary set when a word recognized as the speech recognition result is contained in the recognition vocabulary set; and displaying part for displaying additional information corresponding to said specified keyword information.

A twenty fifth aspect of the present invention is a computer-processible recording medium having a program that causes a computer to serve, in a second apparatus according to the fourteenth aspect of the present invention, as:

receiving part for receiving a broadcast broadcasted from a first apparatus having broadcasting part for broadcasting additional information that is made to correspond to an object appearing in broadcast contents broadcasted from a broadcasting station and that contains keyword information specifying said object, and a language model, simultaneously with said broadcast contents;

correcting part for utilizing a synonym dictionary in which a plurality of words are classified into word classes on the basis of the synonymy between the words, and of thereby correcting a frequency of appearance of a predetermined combination of said word classes in an expression form of said language model and/or a frequency of appearance of a predetermined word with reference to said word class in an expression form of said language model, on the basis of history information of speech recognition result of already performed speech recognition;

speech recognition part for performing speech recognition of a voice uttered by a viewing person, by using said corrected language model;

specifying part for specifying said keyword information on the basis of the speech recognition result; and displaying part for displaying additional information corresponding to said specified keyword information.

A twenty sixth aspect of the present invention is a computer-processible recording medium having a program that causes a computer to serve, in a second apparatus according to the fifteenth aspect of the present invention, as:

receiving part for receiving a broadcast broadcasted from a first apparatus having broadcasting part for broadcasting additional information that is made to correspond to an object appearing in broadcast contents broadcasted from a broadcasting station and that contains keyword information specifying said object, and information specifying a language model, simultaneously with said broadcast contents;

language model specifying part for specifying said language model retained in advance, by using information specifying said received language model;

correcting part for utilizing a synonym dictionary in which a plurality of words are classified into word classes on the basis of the synonymy between the words, and of thereby correcting a frequency of appearance of a predetermined combination of said word classes in an expression form of said specified language model and/or a frequency of appearance of a predetermined word with reference to said word class in an expression form of said specified language model, on the basis of history information of speech recognition result of already performed speech recognition;

speech recognition part for performing speech recognition of a voice uttered by a viewing person, by using said corrected language model;

specifying part for specifying said keyword information on the basis of the speech recognition result; and displaying part for displaying additional information corresponding to said specified keyword information.

BRIEF DESCRIPTION OF THE DRAWINGS

FIG. 5 is a diagram showing an example of a synonym dictionary according to Embodiment 1 of the present invention.

FIG. 11 is a diagram showing an example of a synonym dictionary according to Embodiment 2 of the present invention.

FIG. 13 is a diagram showing an example of a recognition vocabulary set according to Embodiment 2 of the present invention.

FIG. 14 is a diagram showing an example of a recognition vocabulary set in which the frequency is normalized according to Embodiment 2 of the present invention.

FIG. 19 is a diagram showing an example of Ngram syntax information according to Embodiment 3 of the present invention.

FIG. 20 is a diagram describing the operation of a vocabulary weight revising section according to Embodiment 3 of the present invention.

FIG. 22 is a flow chart showing the outline of operation of a shopping assistance system according to Embodiment 4 of the present invention.

FIG. 24 is a diagram showing an example of $P(C_i|C_{i-1})$ of Formula 4 according to Embodiment 4 of the present invention.

FIG. 25 is a diagram describing the operation of a class weight revising section according to Embodiment 4 of the present invention.

FIG. 33 is a diagram showing an example of a list of goods information according to Embodiment 6 of the present invention.

DESCRIPTION OF REFERENCE NUMERALS

Figure 1:
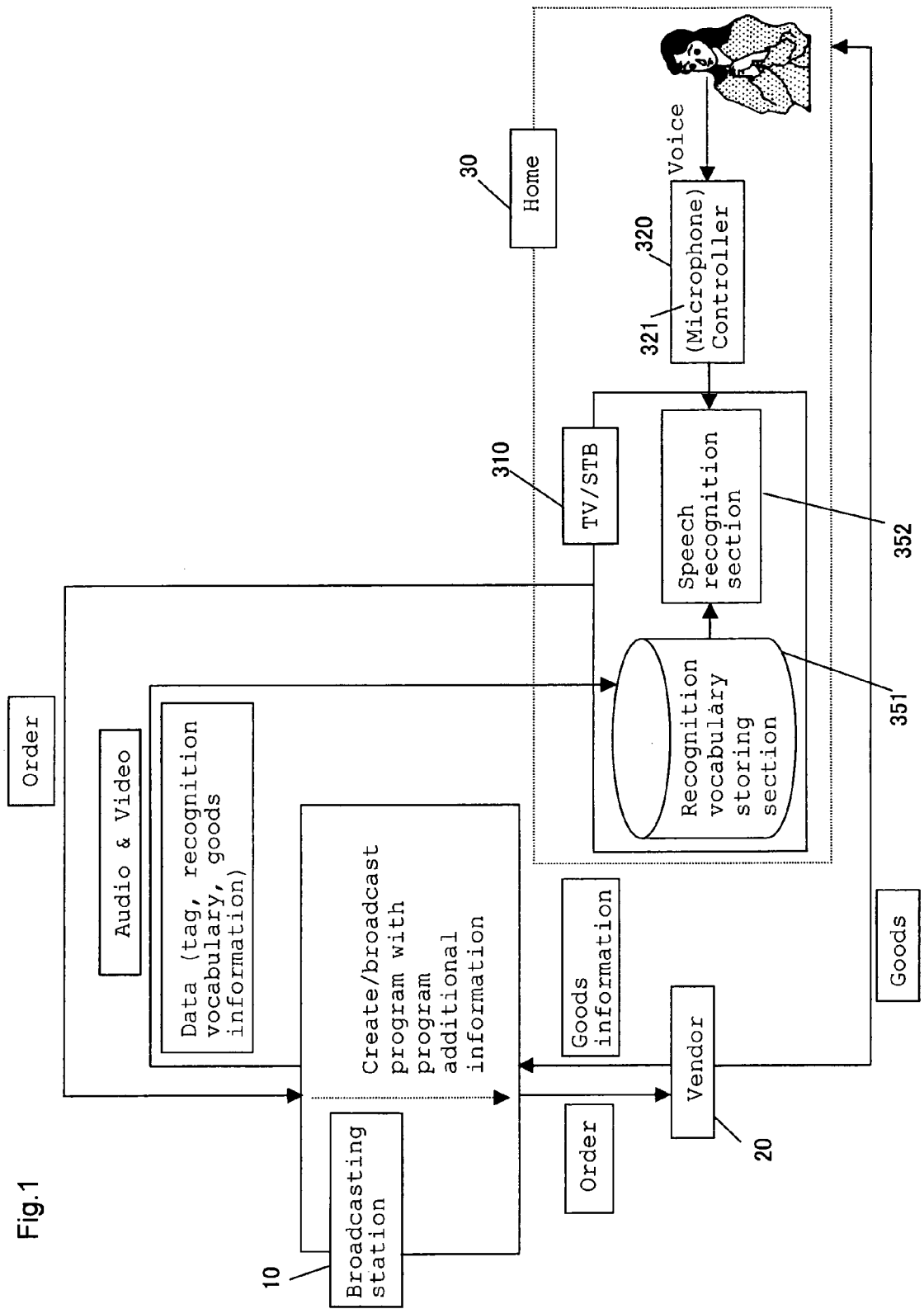
FIG. 1 is a block diagram showing a schematic configuration of a shopping assistance system according to Embodiment 1 of the present invention.

10 Broadcasting station
20 Vendor
30 Home
310 TV/STB
313 Broadcast receiving section
315 Stored time controlling section
316 Time expression dictionary
317 Additional information storing section
318 Displaying section
319 Transmitting section
351 Recognition vocabulary storing section
352 Speech recognition section
355 Recognition vocabulary extracting section
356 Synonym dictionary
357 Recognition vocabulary extending section
358 Recognition vocabulary adaptation section

BEST MODE FOR CARRYING OUT THE INVENTION

Embodiments of the present invention are described below with reference to the drawings.

Embodiment 1

Described first is a shopping assistance system employing two-way broadcasting according to Embodiment 1 of the present invention.

Figure 2:
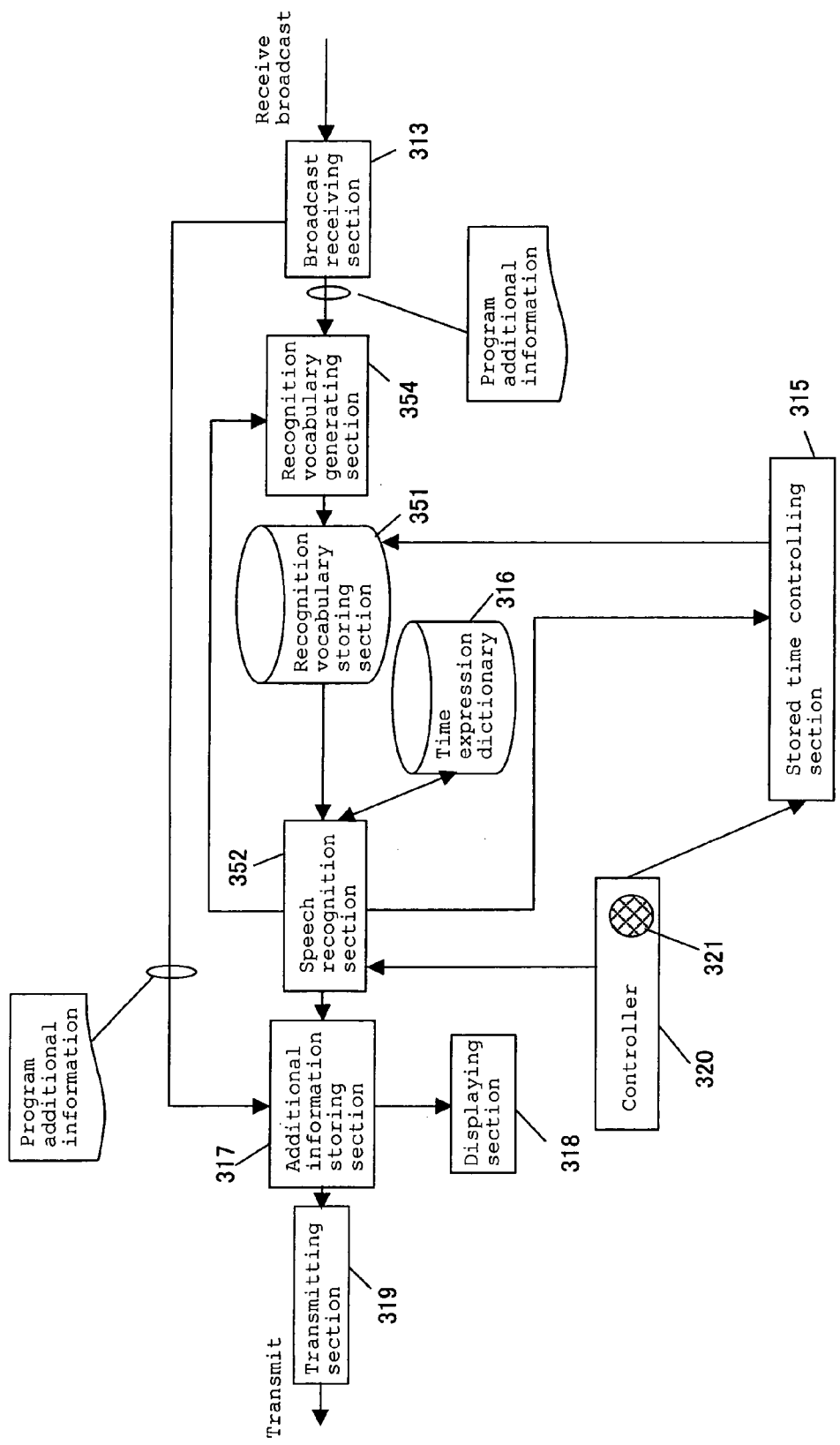
FIG. 2 is a block diagram showing the configuration of a TV/STB according to Embodiment 1 of the present invention.

FIG. 1 is a block diagram showing the conceptual configuration of a shopping assistance system employing two-way broadcasting according to Embodiment 1 of the present invention. FIG. 2 is a functional block diagram showing the detail of the shopping assistance system employing two-way broadcasting (referred to as a shopping assistance system, hereafter).

In FIG. 1, the shopping assistance system of the present embodiment comprises a broadcasting station 10, a vendor 20, and a home 30. A TV/STB 310 and a remote controller 320 are installed in the home 30.

The broadcasting station 10 is a broadcasting station which broadcasts a program together with program additional information. The vendor 20 is a vendor who sells an article appearing in a program. The home 30 is a home where the broadcast is received.

The TV/STB 310 is a two-way broadcasting receiver composed of a television receiver or an STB (Set Top Box) serving as a two-way broadcasting receiver.

The remote controller 320 is part of operating the TV/STB 310, and is provided with a microphone 321.

The TV/STB 310 is provided with a recognition vocabulary storing section 351, a speech recognition section 352, and the like. That is, as shown in FIG. 2, the TV/STB 310 comprises a broadcast receiving section 313, a recognition vocabulary generating section 354, the recognition vocabulary storing section 351, the speech recognition section 352, a time expression dictionary 316, a stored time controlling section 315, an additional information storing section 317, a displaying section 318, and a transmitting section 319.

The broadcast receiving section 313 is part of receiving broadcasting radio waves. The recognition vocabulary generating section 354 is part of generating a recognition vocabulary set serving as an object vocabulary of speech recognition, from the program additional information received by the broadcast receiving section 313. The recognition vocabulary storing section 351 is part of storing the generated recognition vocabulary set. The time expression dictionary 316 is a dictionary of retaining expressions concerning time such as "now" and "a while ago", as a recognition vocabulary. The speech recognition section 352 is part of performing speech recognition by using as a recognition vocabulary dictionary the recognition vocabulary storing section 351 and the time expression dictionary 316. The stored time controlling section 315 is part of learning the relation between each time expression vocabulary and an actual time width or the number of scenes on the basis of the relation between a recognized time expression vocabulary and an information selection input performed by a viewing person, and of thereby controlling the speech recognition section 352 and the recognition vocabulary storing section 351. The additional information storing section 317 is part of storing additional information corresponding to a within-the-program article or the like specified by speech recognition. The displaying section 318 is part of displaying the additional information. The transmitting section 319 is part of transmitting to the broadcasting station an input result such as the selection of additional information performed by a viewing person.

Figure 3:
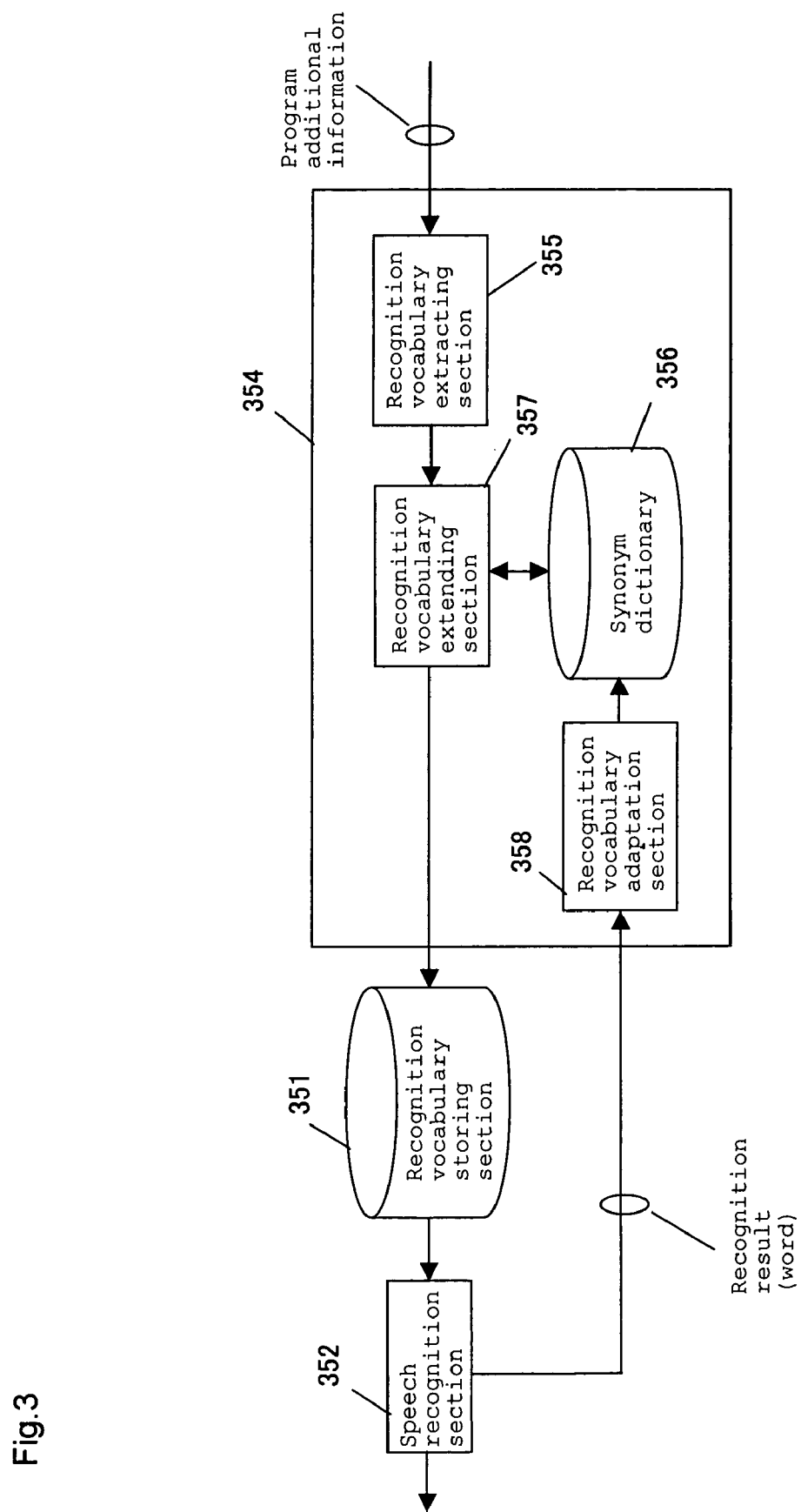
FIG. 3 is a block diagram showing a detailed configuration of a recognition vocabulary generating section according to Embodiment 1 of the present invention.

FIG. 3 shows a detailed configuration of a part relevant to the recognition vocabulary generating section 354. The recognition vocabulary generating section 354 comprises a recognition vocabulary extracting section 355, a recognition vocabulary extending section 357, a synonym dictionary 356, and a recognition vocabulary adaptation section 358.

The recognition vocabulary extracting section 355 is part of extracting as a keyword the word corresponding to the keyword information contained in program additional information. The recognition vocabulary extending section 357 is part of extending an extracted keyword and thereby generating a recognition vocabulary set. The synonym dictionary 356 is a dictionary in which a plurality of words are classified into word classes on the basis of the synonymy between the words. In Embodiment 1, it is assumed that a word is always contained only in a single specific word class, and that a single word is not contained in a plurality of word classes. The case that a single word is contained in a plurality of word classes is described in detail in Embodiment 2. The recognition vocabulary adaptation section 358 is part of correcting the frequency of appearance of each word listed in the synonym dictionary 356, on the basis of the speech recognition result.

Next, the operation of the present embodiment having such a configuration is described below.

Figure 4:
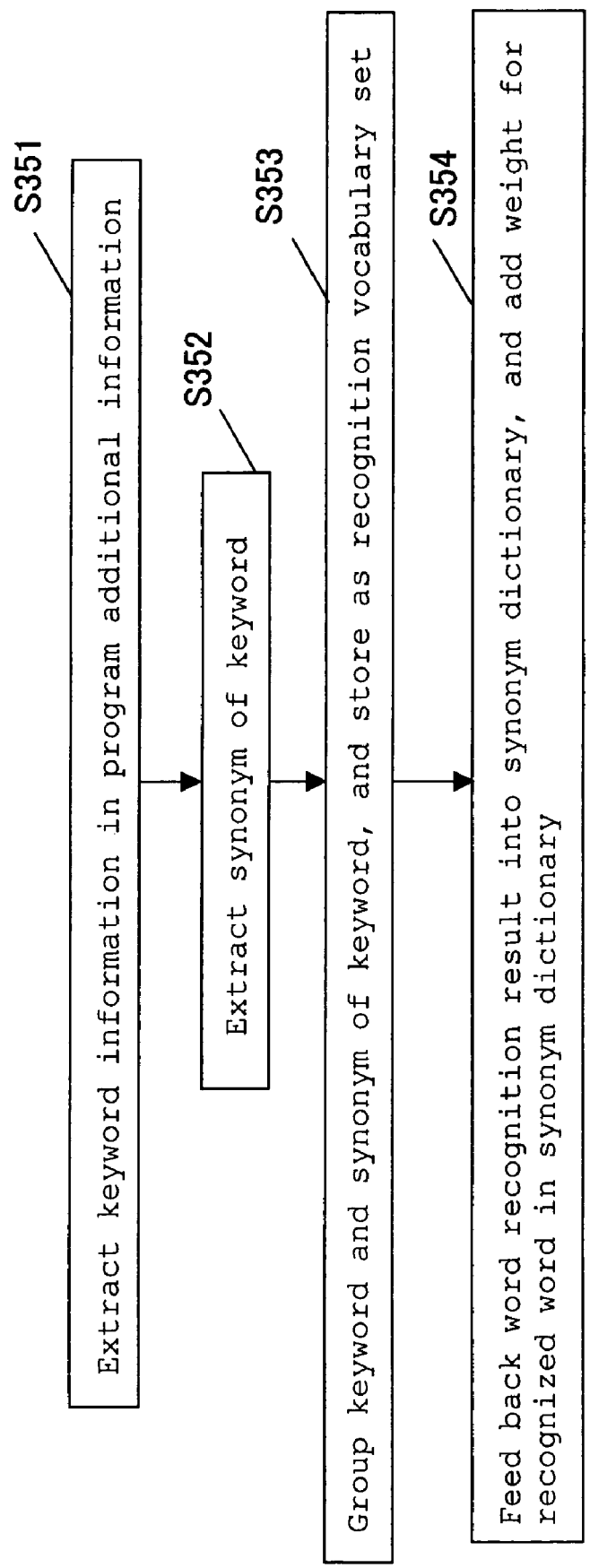
FIG. 4 is a flow chart showing the outline of operation of a shopping assistance system according to Embodiment 1 of the present invention.
Figure 6:
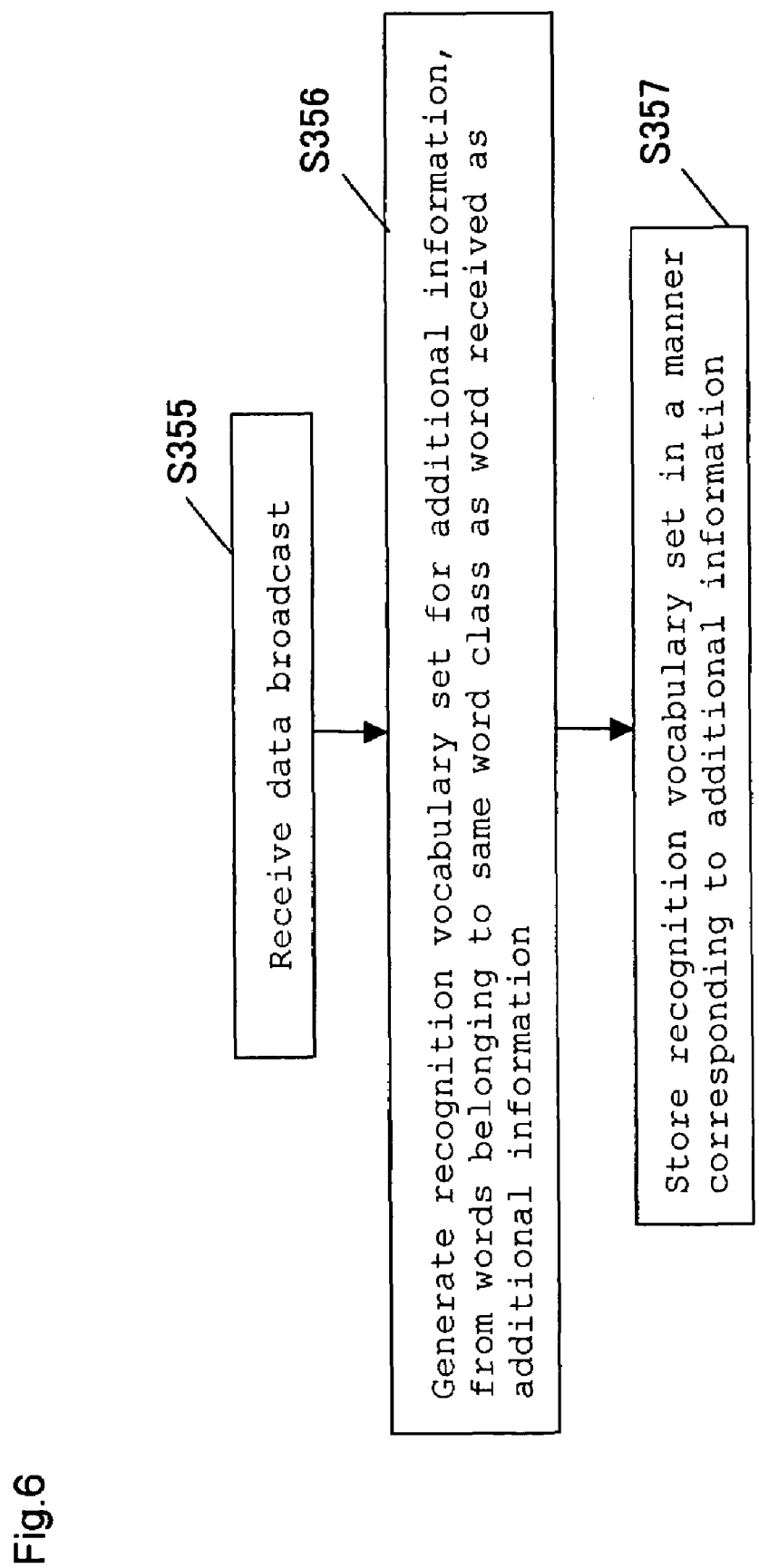
FIG. 6 is a flow chart showing the detail of operation of a shopping assistance system according to Embodiment 1 of the present invention.
Figure 8:
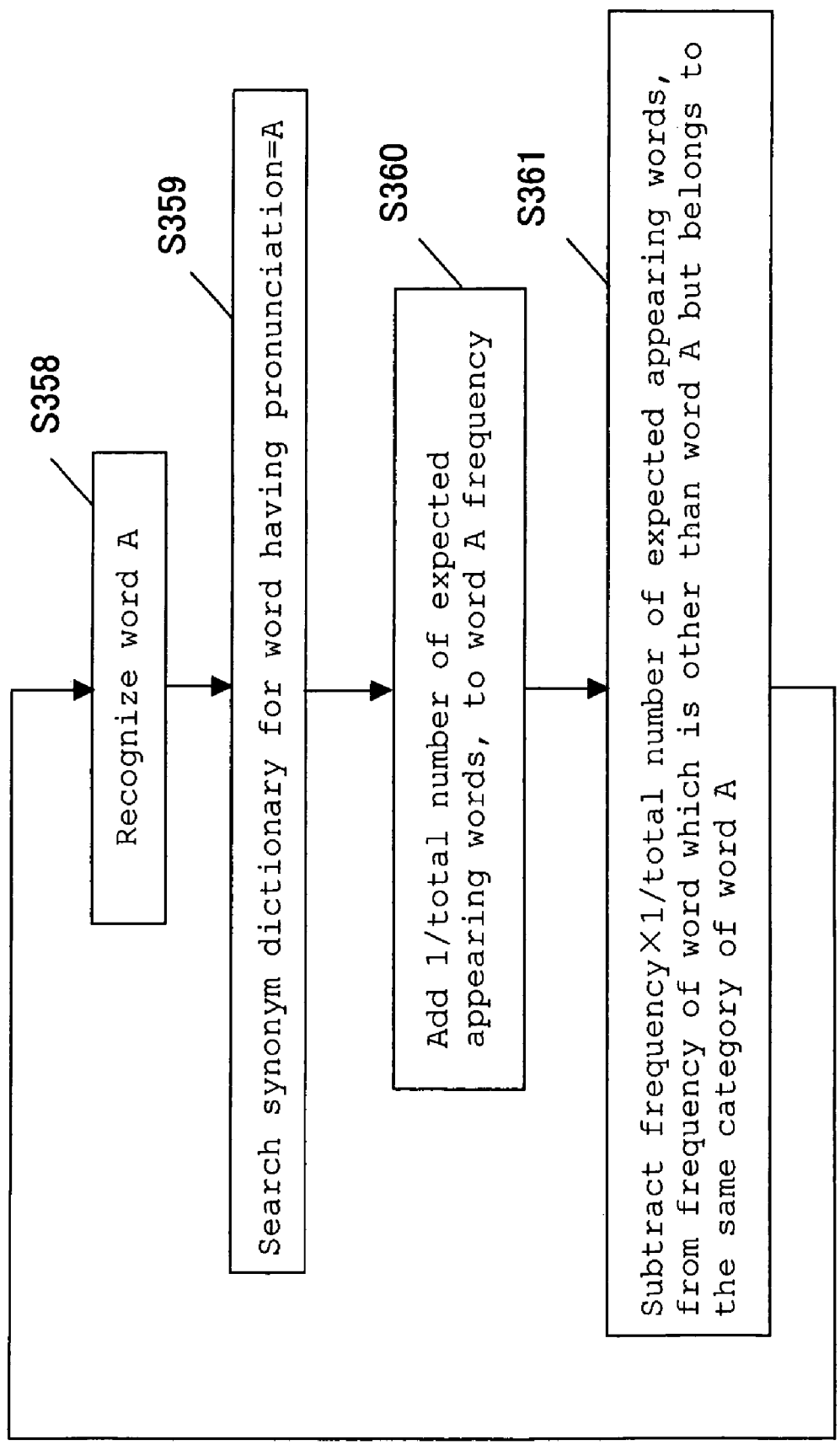
FIG. 8 is a flow chart showing the detail of operation of a shopping assistance system according to Embodiment 1 of the present invention.

FIG. 4 is a flow chart showing the outline of operation of the shopping assistance system of the present embodiment. FIGS. 6 and 8 are flow charts showing the detail of operation of the shopping assistance system of the present embodiment. The following description is given with reference to FIGS. 4, 6, and 8.

In FIGS. 2 and 4, from the broadcasting station 10, additional information that is made to correspond to an object appearing in broadcast contents and that contains keyword information of specifying the object is broadcasted together with the broadcast contents.

The broadcast receiving section 313 receives the broadcast. Then, the recognition vocabulary generating section 354 extracts the keyword information contained in the program additional information (step 351). Further, the recognition vocabulary generating section 354 extracts a synonym of a keyword corresponding to the keyword information (step 352). Then, the recognition vocabulary generating section 354 stores the extracted synonym as a recognition vocabulary set into the recognition vocabulary storing section 351 (step 353).

Next, when a viewing person utters, speech recognition is performed. The result is fed back to the synonym dictionary 390 so that a weight is added for a recognized word in the synonym dictionary (step 354).

In the following description, first, the operation of steps 351, 352, and 353 is described in detail. Then, the operation of speech recognition is described, and then the operation of step 354 is described in detail.

First, the operation of steps 351, 352, and 353 is described below in further detail with reference to FIGS. 3 and 6.

The synonym dictionary 390 is shown in FIG. 5. The synonym dictionary 390 is a dictionary listing a word 391, the pronunciation 392 of the word, a word class 393 in which the word is contained, the frequency 394 of appearance of the word. Here, a word class indicates a classification where a plurality of words are classified on the basis of synonymy between the words. In the initial state of the usage of the shopping assistance system of the present embodiment, within-the-word-class appearance frequency 394 is listed that is obtained from a sufficiently large Japanese corpus.

An example of a word 391 is jacket. The pronunciation 392 of jacket is 'jacket'. The word class 393 in which jacket is contained is clothing. The appearance frequency 394 that the jacket appears among the words contained in the clothing which is the word class of jacket is 0.20. Another example of a word 391 is coat. The pronunciation 392 of coat is 'coat'. The word class 393 in which coat is contained is clothing. The appearance frequency 394 that the coat appears among the words contained in the clothing which is the word class of coat is 0.10.

At step 355, it is assumed that the additional information of the jacket has been transmitted as additional information. As for the additional information in this case, the additional information contains the explanation of the price, the size, the color, and the like of the jacket and the explanation of a vendor and the like of the jacket, in addition to the keyword information indicating the jacket. As such, the additional information contains information on the goods to which the additional information is made to correspond, in addition to the keyword information. The detail of the additional information is described later.

Next, at step 356, the recognition vocabulary extracting section 355 extracts the keyword information contained in the additional information. That is, when the additional information of the jacket has been transmitted, the information corresponding to the jacket is extracted as the keyword information. Then, using the synonym dictionary 356, the recognition vocabulary extending section 357 generates a recognition vocabulary set consisting of words belonging to the same word class 393 as the keyword corresponding to the extracted keyword information.

More specifically, it is assumed that the keyword corresponding to the keyword information of the additional information having the object of a jacket is jacket. Then, from this additional information, the recognition vocabulary extracting section 355 extracts jacket which is the keyword corresponding to the keyword information.

Figure 7:
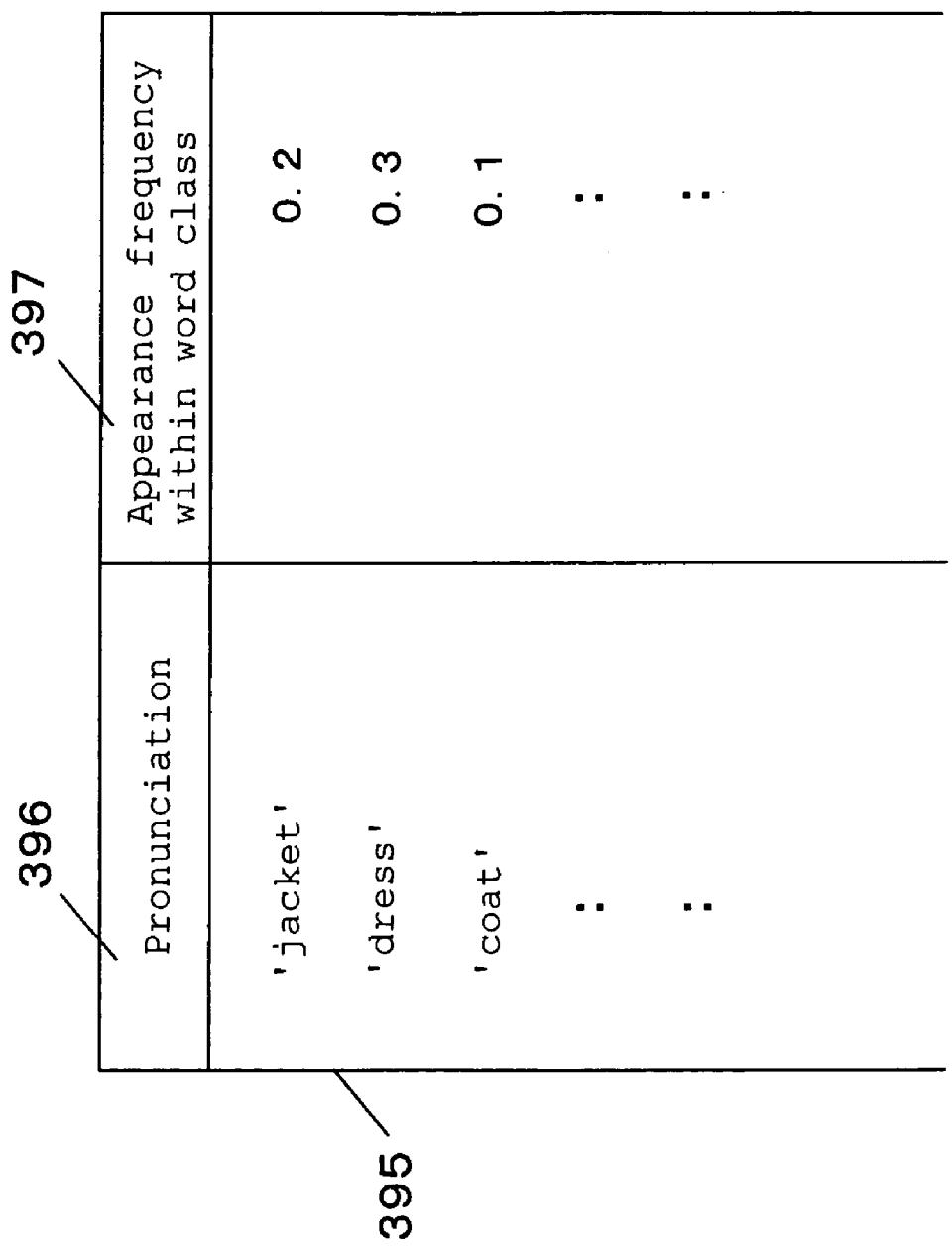
FIG. 7 is a diagram showing an example of a recognition vocabulary set according to Embodiment 1 of the present invention.

Then, since the word class 393 containing the keyword of jacket is clothing, the recognition vocabulary extending section 357 extracts a word having the word class of clothing. In the case of the synonym dictionary of FIG. 5, words having the word class 393 of clothing are coat, jacket, and dress. In this case, the recognition vocabulary extending section 357 treats the coat, the jacket, and the dress as the words constituting the recognition vocabulary set. Then, the recognition vocabulary extending section 357 describes the frequency appearance 394 corresponding to each word into the recognition vocabulary set. FIG. 7 shows the recognition vocabulary set 395 generated in this manner. The pronunciations 396 of the jacket, the dress, and the coat are described as 'jacket', 'dress', and 'coat'. Further, the within-the-word-class frequencies 397 are described, for example, as 0.2, 0.3, and 0.1 corresponding to the pronunciations 396.

Next, at step 357, the recognition vocabulary extending section 357 stores the generated recognition vocabulary set in a manner corresponding to the additional information into the recognition vocabulary storing section 351.

Here, the recognition vocabulary storing section 351 is assumed to be a semiconductor memory or a hard disk drive unit. Thus, the generated recognition vocabulary set is stored in a manner corresponding to the additional information into the semiconductor memory or the hard disk drive unit.

Next, described below is the operation in the speech recognition of a voice uttered by a viewing person during the watching of a program. First, in FIG. 2, during the watching of the program, a viewing person pays attention to an article or the like appearing in the program, and then utters words notifying that attention is paid to a specific article. Then, the microphone 321 receives the utterance, and then outputs a signal to the speech recognition section 352.

The speech recognition section 352 performs speech recognition on the utterance signal inputted through the microphone 321. On the basis of the speech recognition result, the speech recognition section 352 judges the article or the like of the viewing person's attention, then specifies corresponding program additional information, and then accumulates the information into the additional information storing section 317.

Detailed description is given below for the case that a drama is watched. For example, during the watching of the drama, the viewing person paid attention to a suit worn by a character. However, the character who wears the suit has exited the screen. In this case, the viewing person utters "the red jacket a while ago is good" or the like.

The voice uttered by the viewing person is inputted through the microphone 321. With reference to the time expression dictionary 316 and the recognition vocabulary storing section 351, the speech recognition section 352 recognizes the inputted voice, and then extracts corresponding additional information from the broadcasted program additional information.

That is, among the recognition vocabulary sets stored in the recognition vocabulary storing section 351, the recognition vocabulary set 395 shown in FIG. 7 contains the word of coat. Thus, the speech recognition section 352 specifies the recognition vocabulary set 395.

Further, as a result of the speech recognition in the speech recognition section 352, when a plurality of words have been recognized as candidates of the speech recognition, a word having the highest within-the-word-class frequency 397 in the recognition vocabulary set 395 is specified as the word recognized as the speech recognition result.

In this case, when each of the words belongs to word classes differing from each other, the processing is performed, for example, with assuming that the weight of each word class is the same. That is, the within-the-word-class frequencies 397 of a plurality of the words are compared directly so that the speech recognition section 352 simply specifies the word having the highest within-the-word-class frequency 397. For example, when there are a recognition vocabulary set generated from the keyword of jacket as shown in FIG. 7 and a recognition vocabulary set generated from the keyword of garage, and when as a result of the speech recognition, the jacket and the garage have been recognized as candidates of the speech recognition, the word class of clothing in which the jacket is contained and the word class of building in which the garage is contained are treated using the same weight, that is, treated even. Then, the within-the-word-class frequency 397 of the jacket and the within-the-word-class frequency 397 of the garage are compared directly, so that the word having the highest within-the-word-class frequency 397 is specified as the word of speech recognition result.

In the present embodiment, when a plurality of words have been recognized as candidates of the speech recognition, and when each of the words belongs to word classes differing from each other, the appearance frequency of each word class in which each of the words is contained has been treated even. However, the invention is not limited to this. The frequency of appearance of each word class may be acquired in advance from the above-mentioned sufficiently large Japanese corpus. Then, the frequency of appearance of each word class may be taken into consideration. This permits more accurate specifying of the word of speech recognition result. Alternatively, the weight of each word class may be broadcasted by data broadcasting from the broadcasting station 10. Then, the weight of each word class may be received by the broadcast receiving section 313 so that the received weight of each word class may be taken into consideration by the speech recognition section 352. Further, when a goods item is purchased in a homepage of the Internet by using a PC connected to the TV/STB 310 through a network, its purchase history information may be acquired so that the weight of each word class may be generated from the acquired purchase information. Then, the weight may be used in the speech recognition in the speech recognition section 352.

As such, when the speech recognition section 352 specifies the recognition vocabulary set 395 of FIG. 7, the speech recognition section 352 stores into the additional information storing section 317 the additional information of jacket which is the additional information corresponding to the recognition vocabulary set 395.

As such, according to the present embodiment, when the keyword corresponding to the keyword information contained in the additional information broadcasted from the broadcasting station 10 is jacket, a recognition vocabulary set is generated and used for the speech recognition. By virtue of this, even in the case that the viewing person utters a word coat that has synonymy with jacket, the additional information corresponding to the jacket can be specified. Similarly, even in the case that the viewing person utters a word dress that has synonymy with jacket, the additional information corresponding to the jacket can be specified. Thus, an object appearing in a broadcasted program or a broadcasted commercial can be specified easily without much time and effort, in a manner suitable for the expression uttered by a viewing person.

The stored time controlling section 315 performs control such that the generated recognition vocabulary set should be retained during a time corresponding to a time range or the number of scenes having been set in advance or alternatively to a time range or the number of scenes that is the largest in the time expressions learned on the basis of the previous utterance of the viewing person and the subsequent input. The learning in the stored time controlling section 315 is described later. For example, in the case of the uttered voice "the red jacket a while ago is good", in response to the control of the stored time controlling section 315, the speech recognition section 352 extracts a time expression vocabulary "a while ago" indicating a past. Then, with reference to the time expression dictionary 316, the speech recognition section 352 performs the above-mentioned specifying on the program additional information broadcasted within the time range or the number of scenes corresponding to "a while ago".

As described above, the additional information contains information on the weight, the quality of the material, the color variation, the price of the size variation, the manufacturer, the vendor, the vendor's contact address, and the like. The viewing person checks and examines the information. Then, when purchasing, the viewing person selects additional information and thereby inputs purchase information by using inputting part such as the remote controller 320, a pointing device, and speech recognition.

As described above, the additional information contains information on the weight, the quality of the material, the color variation, the price of the size variation, the manufacturer, the vendor, the vendor's contact address, and the like. The viewing person checks and examines the information. Then, when purchasing, the viewing person selects additional information and thereby inputs purchase information by using inputting means such as the remote controller 320, a pointing device, and speech recognition.

The transmitting section 319 transmits to the broadcasting station the purchase information together with an identification number or the like of the corresponding additional information.

As described above, on the basis of the relation between a recognized time expression vocabulary and an information selection input performed by a viewing person, the stored time controlling section 315 learns the relation between each time expression vocabulary and an actual time width or the number of scenes. This process of learning is described below in detail. The stored time controlling section 315 retains information of establishing the correspondence of each recognition vocabulary which is a time expression stored in the time expression dictionary 316, to an actual time width or the number of scenes. For example, the stored time controlling section 315 establishes the correspondence of a recognition vocabulary "a while ago" to a time width ranging from 20 seconds before to 5 minutes before relative to the present, and the correspondence of a recognition vocabulary "now" to a time width ranging from the present to 30 seconds before the present.

Thus, as described above, when receiving from the speech recognition section 352 the recognition vocabulary indicating the time expression "a while ago", the stored time controlling section 315 performs the control such that the specifying should be performed on the program additional information received within the time width ranging from 20 seconds before to 5 minutes before relative to the present. In response to this control, the speech recognition section 352 performs the control such that the specifying should be performed on the program additional information received within the time width ranging from 20 seconds before to 5 minutes before relative to the present. Then, the specified program additional information is stored into the additional information storing section 317. That is, the stored time controlling section 315 performs the control such that the recognition vocabulary set generated within this time width should be retained.

Meanwhile, when the stored time controlling section 315 receives a recognition vocabulary indicating a time expression "a while ago", and when the time width ranging from 20 seconds before to 5 minutes before relative to the present is made to correspond to the time expression as described above, the program additional information displayed on the displaying section 318 at the request of the viewing person could have a time width different from the intention of the viewing person. In this case, the viewing person utters "redo", "display preceding information", "display subsequent information", or the like to the microphone 321.

Then, the speech recognition section 352 performs speech recognition on the utterance of the viewing person, and then notifies the speech recognition result to the stored time controlling section 315. In the speech recognition of an utterance "display preceding information", the speech recognition section 352 extracts "display", "preceding", and "information" as a recognition vocabulary, and then notifies the result to the stored time controlling section 315.

On receiving a recognition vocabulary of "display", "preceding", and "information" from the speech recognition section 352, the stored time controlling section 315 revises the information on the time width made to correspond to the recognition vocabulary indicating the time expression "a while ago". That is, revision is performed such that the recognition vocabulary "a while ago" should correspond to a time width ranging from 40 seconds before to 5 minutes and 40 seconds before relative to the present. Then, the stored time controlling section 315 controls the speech recognition section 352 such that the speech recognition section 352 should specify the program additional information again with respect to the program additional information received between 40 seconds before and 5 minutes and 40 seconds before relative to the present. In response to the control of the stored time controlling section 315, the speech recognition section 352 specifies the program additional information again, and then stores the specified program additional information into the additional information storing section 317. The displaying section 318 displays the program additional information stored in the additional information storing section 317. Then, if the desired article is included in the displayed program additional information, the viewing person selects the program additional information, and thereby inputs purchase information.

When this procedure is repeated many times, the stored time controlling section 315 can incorporate the intention of the viewing person into the recognition vocabulary for time expressions, or establish appropriate time width correspondence. As such, the learning is performed in the stored time controlling section 315.

Next, the operation of step 354 of FIG. 4 is described below in detail with reference to the flow chart of FIG. 8.

As described above, in speech recognition, the recognition vocabulary adaptation section 358 of FIG. 3 feeds back the word recognition result to the synonym dictionary 390, and adds a weight for the recognized word in the synonym dictionary 390.

That is, in the flow chart of FIG. 8, at step 358, it is assumed that the speech recognition section 352 has recognized a word A (step 358). Specifically, the word A recognized here is assumed to be 'coat' as described above.

The synonym dictionary adaptation section 358 searches the synonym dictionary 390 for a word having the pronunciation A (step 359). That is, the synonym dictionary adaptation section 358 extracts a word having the pronunciation 'coat' from the synonym dictionary 390. Thus, the word coat is extracted.

Next, the synonym dictionary adaptation section 358 adds the (1/total number of expected appearing words) to the within-the-word-class frequency 397 of the word A, that is, coat. Here, the total number of expected appearing words is a value virtually having been set as the total number of words appearing at the time of generating the appearance frequency 394 in the synonym dictionary 390. For example, the total number of expected appearing words is set to be 100. In this case, since the previous frequency 394 of appearance of coat is 0.10, the synonym dictionary adaptation section 358 sets the frequency 394 of appearance of coat to be 0.10+0.01=0.11. In this manner, the synonym dictionary adaptation section 358 increases the frequency 394 of appearance of the word A recognized by speech recognition among the words of the synonym dictionary 390.

Next, at step 361, the synonym dictionary adaptation section 358 subtracts (appearance frequency of each word×(1/total number of expected appearing words)) from the frequency of each word other than the word A among the words contained in the word class containing the word A. The word class containing the coat is clothing. The clothing contains words jacket and dress as the words other than the coat. Thus, the frequencies 394 of appearance of the words of jacket and dress are decreased. That is, since the previous frequency of the jacket is 0.20, the synonym dictionary adaptation section 358 sets the frequency 394 of appearance of jacket to be 0.2−(0.2×(1/100))=0.198. Further, since the previous frequency 394 of appearance of dress is 0.30, the synonym dictionary adaptation section 358 sets the frequency 394 of appearance of dress to be 0.3−(0.3×(1/100))=0.297.

At each time that the speech recognition section 352 recognizes a word, the recognition vocabulary adaptation section 358 performs the process of steps 359, 360, and 361 of FIG. 8.

When new additional information has been broadcasted from the broadcasting station 10 and then the recognition vocabulary extending section 357 generates a recognition vocabulary set 395, the appearance frequency 394 corrected as described above is used as the appearance frequency 394 in the synonym dictionary 390. By virtue of this, words uttered more frequently by the viewing person become more easily recognizable in the speech recognition section 352.

As described above, according to the shopping assistance system of the present embodiment, with respect to an article, music, or the like which appears in a program and in which a viewing person becomes interested, the information can be obtained and then the article or the like can be purchased in a manner that the watching of the program itself is not interrupted by the work of making a memorandum or the like, merely by means of natural utterance performed in parallel to the watching of the program.

Further, by virtue of the use of a recognition vocabulary set, in place of the keyword itself corresponding to the keyword information contained in the additional information, a word having synonymy with the keyword may be uttered, so that the recognition vocabulary set is specified and hence the additional information is specified.

Further, in the present embodiment, the purchase information has been transmitted from the transmitting section 319 to the broadcasting station, together with the identification number or the like of the corresponding additional information. However, the information may be transmitted to the vendor contained in the additional information.

Further, in the present embodiment, the speech recognition section 352 has specified the corresponding additional information from the recognition result. However, solely a time stamp within the program may be confirmed, while the additional information storing section 317 may store the time stamp and additional information before the time stamp and the time stamp and a recognition vocabulary set corresponding to the additional information before the time stamp. That is, the speech recognition section 352 may confirm solely the time that the viewing person uttered a voice, while the additional information storing section 317 may store additional information corresponding to the time, additional information broadcasted during a predetermined time range before the time, and a recognition vocabulary set corresponding to the additional information. After the watching, the stored additional information is presented to the viewing person, so that speech recognition is performed on the voice uttered by the viewing person. Then, detailed additional information is presented, or purchase information or the like is transmitted. Such a case that additional information is specified after the watching of a program is described later in detail in Embodiments 5-7.

In the present embodiment, the additional information storing section 317 has stored solely the selected additional information. However, the additional information storing section 317 may store the entire additional information of the program, while the additional information selected by the speech recognition section may solely be displayed.

In the present embodiment, additional information has been stored and then displayed after the end of the program. However, the additional information and the recorded program may be displayed. Alternatively, the corresponding scene received again in response to a request signal transmitted to the broadcasting station may be displayed.

In the present embodiment, additional information has been stored and then displayed after the end of the program. However, the identification information of the additional information may solely be recorded. Then, the additional information received again in response to a request signal transmitted to the broadcasting station may be displayed.

The broadcasting station 10 of the present embodiment is an example of a first apparatus according to the present invention.

The TV/STB 310 of the present embodiment is an example of a second apparatus according to the present invention. The broadcast receiving section 313 of the present embodiment is an example of receiving part of the present invention. The recognition vocabulary generating section 354 of the present embodiment is an example of recognition vocabulary set generating part of the present invention. The speech recognition section 352 of the present embodiment is an example of speech recognition part of the present invention. The speech recognition section 352 of the present embodiment is an example of specifying part of the present invention. The displaying section 318 of the present embodiment is an example of displaying part of the present invention. The recognition vocabulary adaptation section 358 of the present embodiment is an example of appearance frequency correcting part of the present invention.

Embodiment 2

Described next is a shopping assistance system employing two-way broadcasting according to Embodiment 2 of the present invention.

Figure 9:
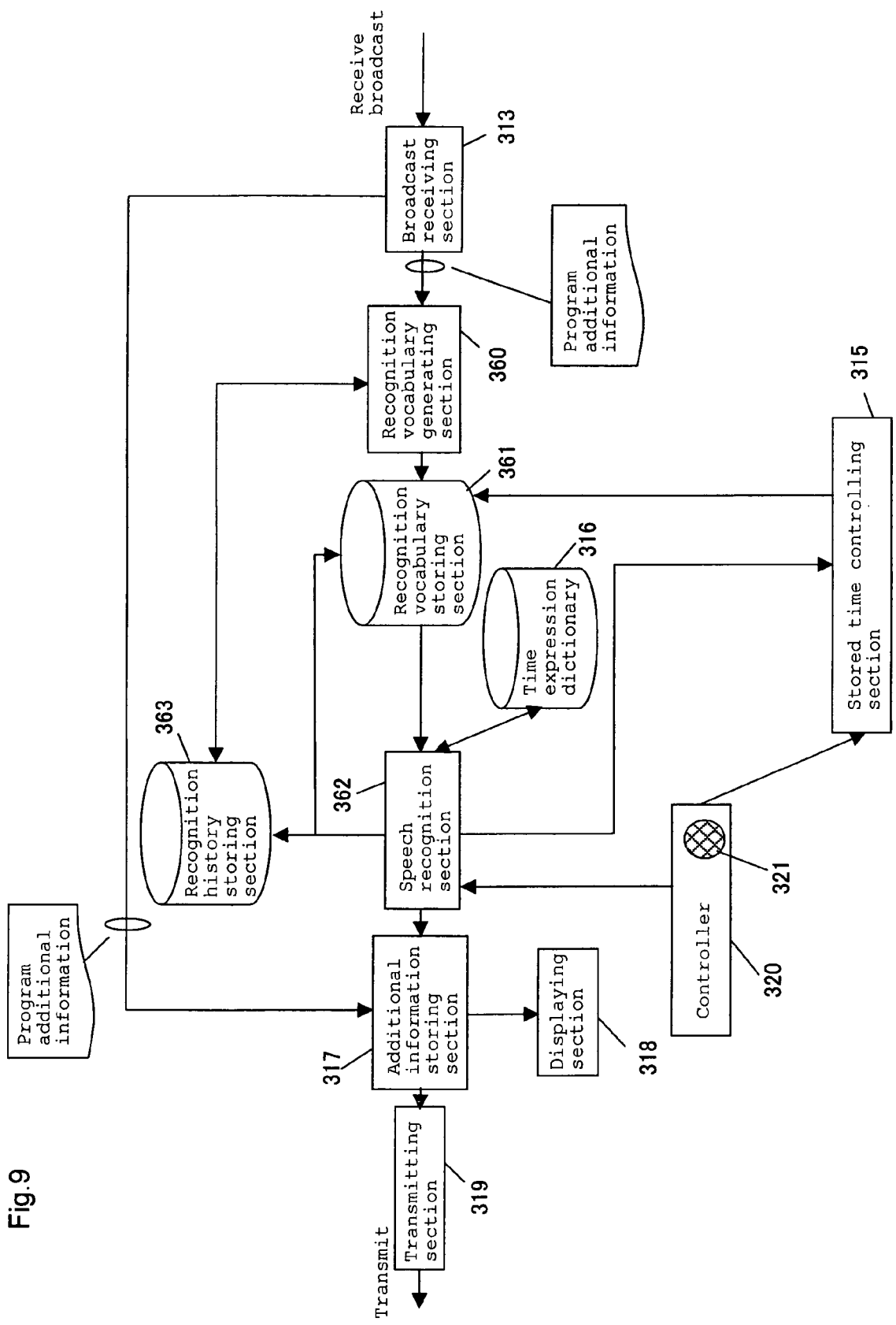
FIG. 9 is a block diagram showing the configuration of a TV/STB according to Embodiment 2 of the present invention.

A block diagram showing the conceptual configuration of a shopping assistance system employing two-way broadcasting according to Embodiment 2 of the present invention is equivalent to such a diagram that in FIG. 1, the recognition vocabulary storing section 351 is changed into a recognition vocabulary storing section 361, while the speech recognition section 352 is changed into a speech recognition section 362. Thus, description for FIG. 1 overlaps with that of Embodiment 1, and hence is omitted. FIG. 9 is a functional block diagram showing the detail of the shopping assistance system employing two-way broadcasting (referred to as a shopping assistance system, hereafter).

As shown in FIG. 9, the TV/STB 310 comprises a broadcast receiving section 313, a recognition vocabulary generating section 360, the recognition vocabulary storing section 361, the speech recognition section 362, a time expression dictionary 316, a stored time controlling section 315, an additional information storing section 317, a displaying section 318, a transmitting section 319, and recognition history storing section 363.

The broadcast receiving section 313, the time expression dictionary 316, the stored time controlling section 315, the additional information storing section 317, the displaying section 318, and the transmitting section 319 are similar to those of Embodiment 1, and hence description is omitted.

The recognition vocabulary generating section 360 is part of generating a recognition vocabulary set serving as an object vocabulary of speech recognition, from the program additional information received by the broadcast receiving section 313. In contrast to Embodiment 1, the recognition vocabulary generating section 360 generates a recognition vocabulary set in the case that a single word is contained in a plurality of word classes. The recognition vocabulary storing section 361 is part of storing the recognition vocabulary set generated in the case that a single word is contained in a plurality of word classes. The speech recognition section 362 is part of performing speech recognition by using as a recognition vocabulary dictionary the recognition vocabulary storing section 361 and the time expression dictionary 316. The recognition history storing section 363 is part of storing the word already recognized by the speech recognition section 362 and the word class in which the word is contained. The recognition history storing section 363 comprises a semiconductor memory, a hard disk drive unit, or the like.

Figure 10:
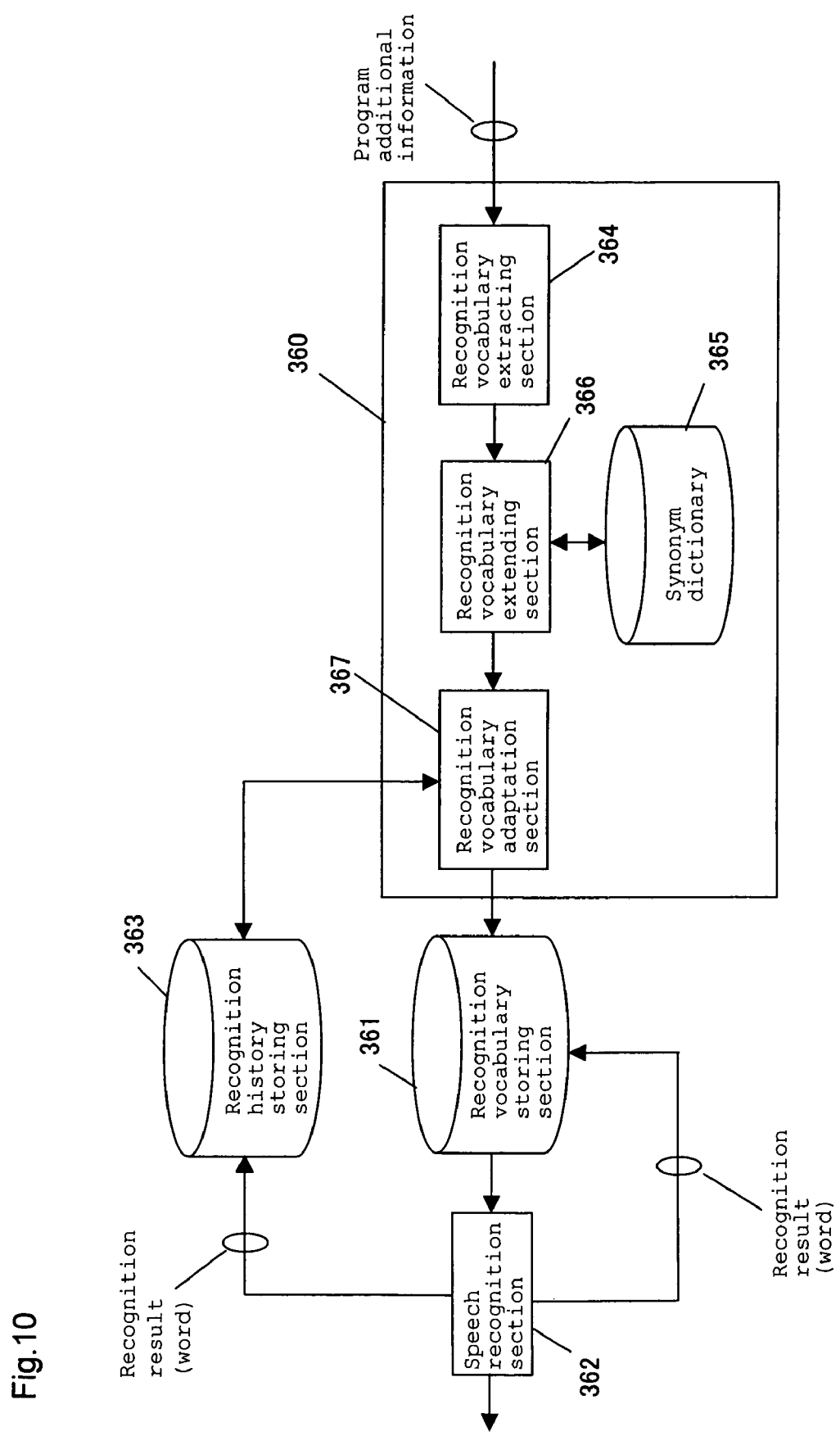
FIG. 10 is a block diagram showing a detailed configuration of a recognition vocabulary generating section 360 according to Embodiment 2 of the present invention.

FIG. 10 shows a detailed configuration of a part relevant to the recognition vocabulary generating section 360. The recognition vocabulary generating section 360 comprises a recognition vocabulary extracting section 364, a recognition vocabulary extending section 366, a synonym dictionary 365, and a recognition vocabulary adaptation section 367.

The recognition vocabulary extracting section 364 is part of extracting as a keyword the word corresponding to the keyword information contained in program additional information. The recognition vocabulary extending section 366 is part of extending an extracted keyword and thereby generating a recognition vocabulary set. The synonym dictionary 365 is a dictionary in which a plurality of words are classified into word classes on the basis of the synonymy between the words. As such, the synonym dictionary 365 of Embodiment 2 can treat also the case that a single word is contained in a plurality of word classes. The recognition vocabulary adaptation section 367 is part of correcting the frequency of appearance of each word listed in the synonym dictionary 365, on the basis of the speech recognition result.

Next, the operation of the present embodiment having such a configuration is described below.

Figure 12:
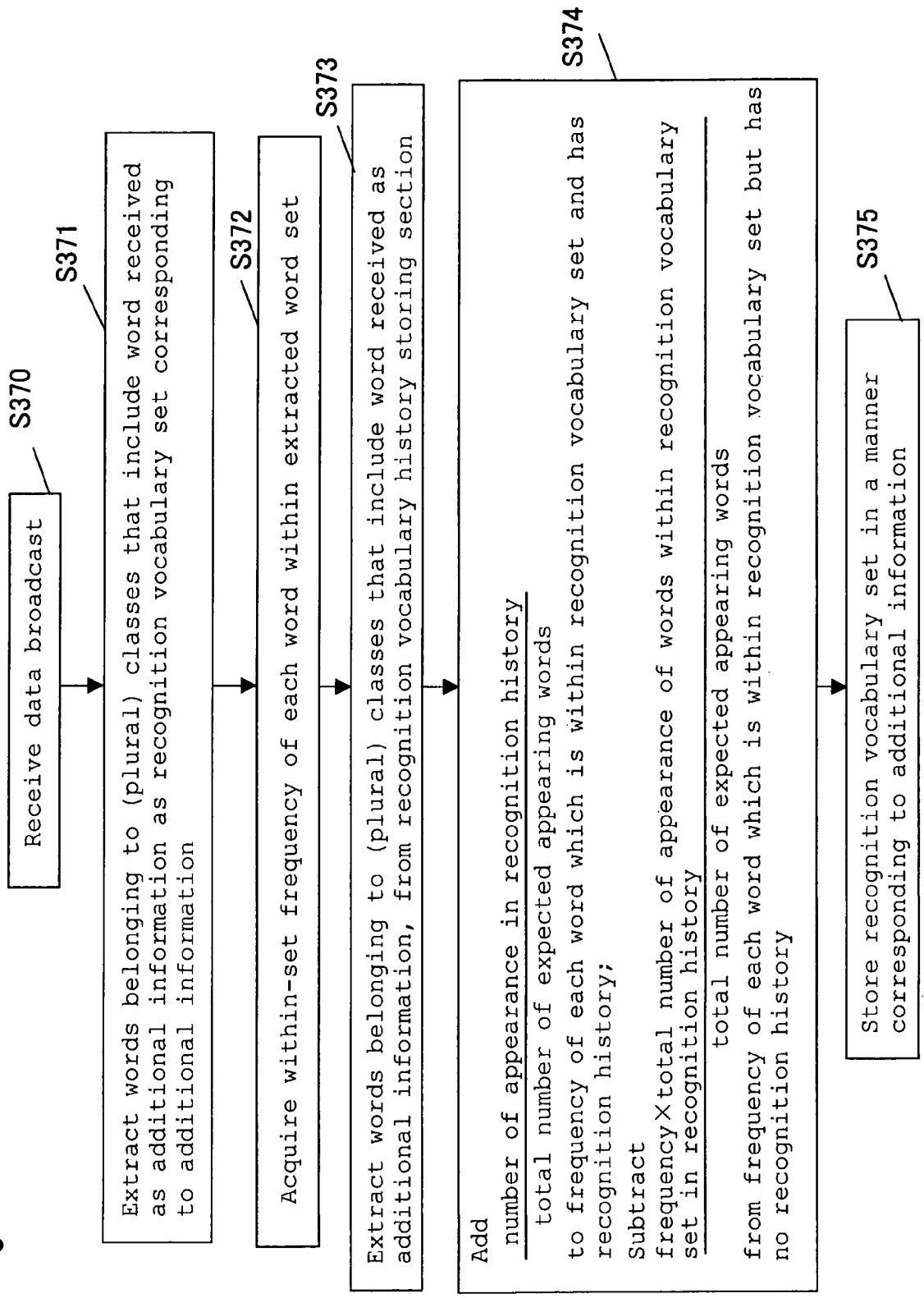
FIG. 12 is a flow chart showing the detail of operation of a shopping assistance system according to Embodiment 2 of the present invention.
Figure 15:
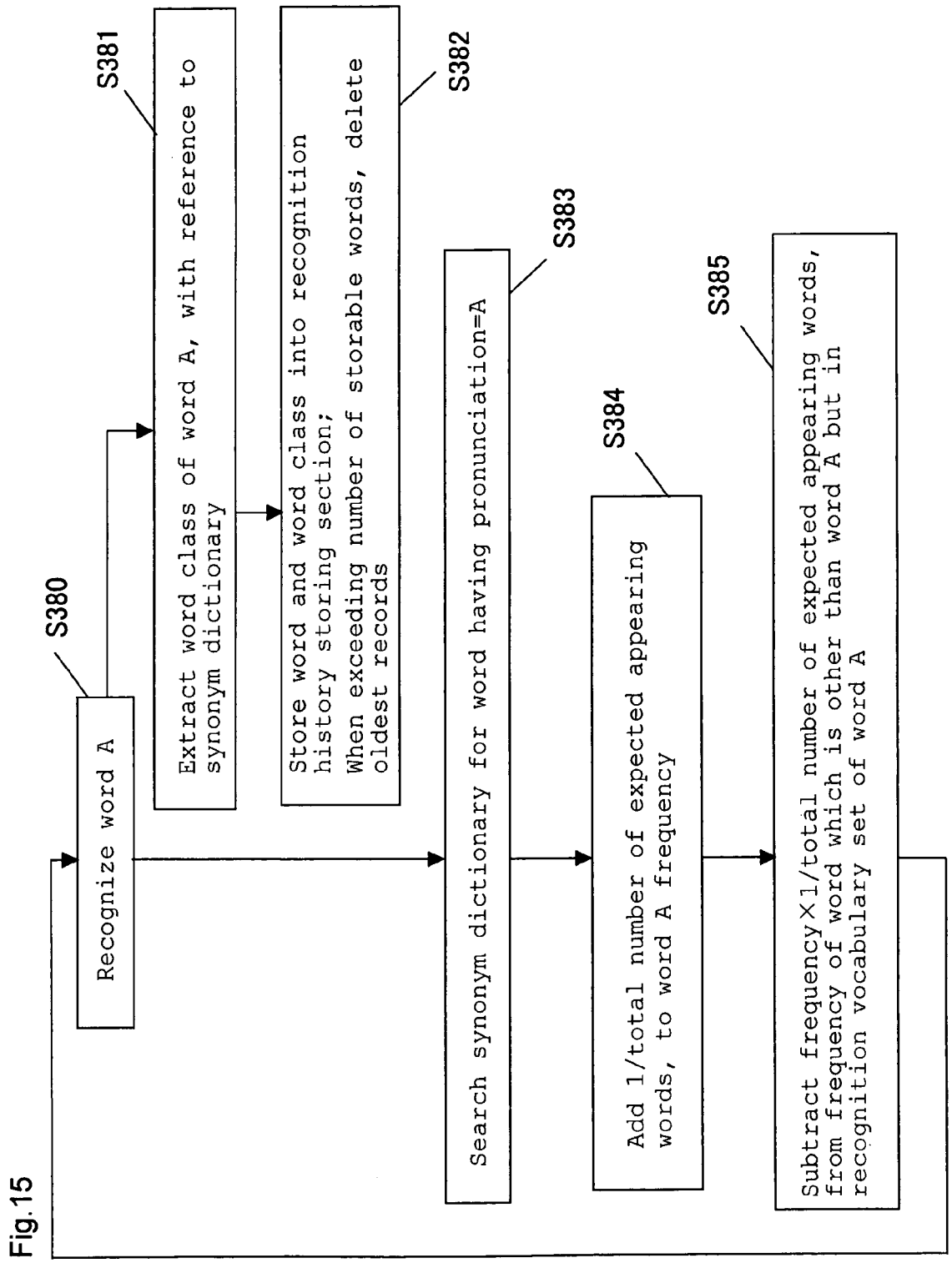
FIG. 15 is a flow chart showing the detail of operation of a shopping assistance system according to Embodiment 2 of the present invention.

FIG. 12 is a flow chart showing the operation that the shopping assistance system of the present embodiment generates a recognition vocabulary set, and then stores the recognition vocabulary set in a manner corresponding to the additional information into the recognition vocabulary storing section 361. FIG. 15 is a flow chart showing the operation in the case that a voice uttered by a viewing person has been recognized. First, with reference to FIG. 12, the operation is described that a recognition vocabulary set is generated, and that the generated recognition vocabulary set is then stored in a manner corresponding to the additional information into the recognition vocabulary storing section 361. After that, the operation is described that speech recognition is performed on a voice uttered by a viewing person.

In FIG. 12, similarly to Embodiment 1, from the broadcasting station 10, additional information that is made to correspond to an object appearing in the broadcast contents and that contains keyword information of specifying the object is broadcasted together with the broadcast contents. The broadcast receiving section 313 receives the broadcast.

FIG. 11 shows a synonym dictionary 400 used in Embodiment 2. In contrast to the synonym dictionary of Embodiment 1, the synonym dictionary 400 of Embodiment 2 can treat also the case that a single word is contained in a plurality of word classes. The synonym dictionary 400 is a dictionary listing a word 401, the pronunciation 461 of the word, a word class 1 (402) in which the word is contained, a word class 2 (403), ..., a word class n (404), and the appearance frequency 405 of the word. Here, a word class indicates a classification where a plurality of words are classified on the basis of synonymy between the words. In the synonym dictionary of Embodiment 2, a word 401 is contained in n word classes. In the initial state of the usage of the shopping assistance system of the present embodiment, the appearance frequency 405 is listed that is obtained from a sufficiently large Japanese corpus. In contrast to Embodiment 1, this listed appearance frequency 405 is an appearance frequency in a sufficiently large Japanese corpus.

An example of a word 401 is jacket. The pronunciation 461 of jacket is 'jacket'. A word class 1 (402) in which jacket is contained is clothing. A word class 2 (403) is fashion or the like. The appearance frequency 405 of jacket is 0.020.

At step 370, it is assumed that the additional information of the jacket has been transmitted as additional information. This additional information is similar to that described in Embodiment 1.

Next, at step 371, the recognition vocabulary extracting section 364 extracts keyword information contained in the additional information. That is, when the additional information of jacket has been transmitted, the information corresponding to the jacket is extracted as keyword information. Then, using the synonym dictionary 400, the recognition vocabulary extending section 366 generates a recognition vocabulary set consisting of the words belonging to the word class 1 (402), the word class 2 (403), ..., the word class n (404) which are the word classes of the keyword corresponding to the extracted keyword information.

More specifically, it is assumed that the keyword corresponding to the keyword information of the additional information having the object of jacket is jacket. Then, from this additional information, the recognition vocabulary extracting section 364 extracts jacket which is the keyword corresponding to the keyword information.

Then, since the word class 1 (402) containing the keyword of jacket is clothing and the word class 2 (403) is fashion or the like, the recognition vocabulary extending section 366 extracts a word having the word classes of clothing and fashion or the like. In the case of the synonym dictionary 400 of FIG. 11, the words having the word class of clothing are jacket and the like. In this case, the recognition vocabulary extending section 366 treats the jacket and the like as the words constituting the recognition vocabulary set.

FIG. 13 shows an example of the recognition vocabulary set 406 generated in this manner. The recognition vocabulary set 406 contains jacket, dress, coat, bag, and the like. The appearance frequency of the synonym dictionary 400 is also described for each word 406 of the recognition vocabulary set as the frequency 409.

Next, at step 372, the recognition vocabulary extending section 366 acquires the frequency 409 of each word in the recognition vocabulary set. That is, the frequency 409 is normalized within the recognition vocabulary set 406 such that the total of the frequencies 409 of the words within the recognition vocabulary set should be unity.

FIG. 14 shows the recognition vocabulary set 410 in which the frequency 409 is normalized in this manner. Eventually, in the recognition vocabulary set 410, the word pronunciation 411 and the within-the-set frequency 412 which is the normalized frequency are described.

Next, at step 373, the recognition vocabulary adaptation section 373 extracts from the recognition history storing section 363 the words contained in the word classes containing the keyword corresponding to the keyword information of the additional information. That is, the recognition history storing section 363 comprises a semiconductor memory or a hard disk, while the recognition history storing section 363 stores the words recognized by already performed speech recognition and the word classes to which the words belong. Among these words, extracted are the words contained in the word classes in which the keyword of jacket is contained. In general, in Embodiment 2, the number of word classes associated with jacket is plural. These word classes are clothing, fashion, and the like as shown in the synonym dictionary 401 of FIG. 11.

Next, at step 374, among the words of the recognition vocabulary set 410, with respect to the within-the-set frequency 412 of the word in agreement with the word extracted at step 373, the recognition vocabulary adaptation section 373 adds (the number of times of appearance in the recognition history/the number of times of appearance of expected words) to the frequency. On the other hand, among the words of the recognition vocabulary set 410, with respect to the within-the-set frequency 412 of the word not extracted at step 373, (within-the-set frequency×total number of times of appearance of the words in the recognition vocabulary set)/(the number of times of appearance of expected words) is subtracted.

Next, at step 375, the recognition vocabulary adaptation section 373 stores the recognition vocabulary set 410 in which the within-the-set frequency 412 has been corrected at step 374, into the recognition vocabulary storing section 361 in a manner corresponding to the additional information.

As a result, the recognition vocabulary set 410 is stored in the recognition vocabulary storing section 361 in a manner corresponding to the additional information.

The operation that the speech recognition section 362 specifies the additional information by using the recognition vocabulary set is similar to that of Embodiment 1, and hence description is omitted.

Next, the operation of speech recognition is described below. The operation described below is a procedure that when an already-generated recognition vocabulary set is to be used repeatedly even after the speech recognition, the speech recognition result is incorporated into the recognition vocabulary set.

That is, in the flow chart of FIG. 15, at step 380, it is assumed that the speech recognition section 362 has recognized a word A. Specifically, the recognized word A is assumed to be 'coat'.

At step 381, with reference to the synonym dictionary 400, the recognition vocabulary adaptation section 367 extracts the word class in which the word A is contained.

Next, at step 382, the recognition vocabulary adaptation section 367 stores into the recognition history storing section 363 the word A and the word class in which the word A is contained. Here, when the number of stored words in the recognition history storing section 363 exceeds the upper limit, the older words are deleted successively.

The word such as the word A stored in the recognition history storing section 363 at steps 381 and 382 is used at steps 373 and 374 of FIG. 12 described above.

On the other hand, at step 383, the recognition vocabulary adaptation section 367 searches the synonym dictionary 400 for a word having the pronunciation A. In the present embodiment, 'coat' is recognized as the word A. Thus, a word having the pronunciation 'coat' is searched for, so that the word of coat is extracted.

Next, at step 384, the recognition vocabulary adaptation section 367 adds (1/the number of times of appearance of expected words) to the within-the-set frequency 412 of the word A in the recognition vocabulary set 410. Specifically, when the total number of expected words is 100, the frequency of coat is corrected into 0.1+0.01=0.11.

Next, at step 385, the recognition vocabulary adaptation section 367 subtracts (within-the-set frequency×1/(the total number of expected words)) from the frequency 412 of each word other than the word A in the recognition vocabulary set 410. Specifically, the frequency of jacket is corrected into 0.2−(0.2×1/100)=0.198, while the frequency of dress is corrected into 0.3−(0.3×1/100)=0.297.

The procedure from step 380 to step 385 is repeated at each time that speech recognition is performed.

As described above, according to the shopping assistance system of the present embodiment, with respect to an article, music, or the like which appears in a program and in which a viewing person becomes interested, the information can be obtained and then the article or the like can be purchased in a manner that the watching of the program itself is not interrupted by the work of making a memorandum or the like, merely by means of natural utterance performed in parallel to the watching of the program.

Further, by virtue of the use of a recognition vocabulary set, in place of the keyword itself corresponding to the keyword information contained in the additional information, a word having synonymy with the keyword may be uttered so that the recognition vocabulary set is specified, and hence the additional information is specified.

Obviously, the various modifications described in Embodiment 1 are similarly applicable to Embodiment 2.

The broadcasting station 10 of the present embodiment is an example of a first apparatus according to the present invention. The TV/STB 310 of the present embodiment is an example of a second apparatus according to the present invention. The broadcast receiving section 313 of the present embodiment is an example of receiving part of the present invention. The recognition vocabulary generating section 360 of the present embodiment is an example of recognition vocabulary set generating part of the present invention. The speech recognition section 362 of the present embodiment is an example of speech recognition part of the present invention. The speech recognition section 362 of the present embodiment is an example of specifying part of the present invention. The displaying section 318 of the present embodiment is an example of displaying part of the present invention. The recognition vocabulary adaptation section 367 of the present embodiment is an example of appearance frequency correcting part of the present invention.

Embodiment 3

Described next is a shopping assistance system employing two-way broadcasting according to Embodiment 3 of the present invention.

Figure 16:
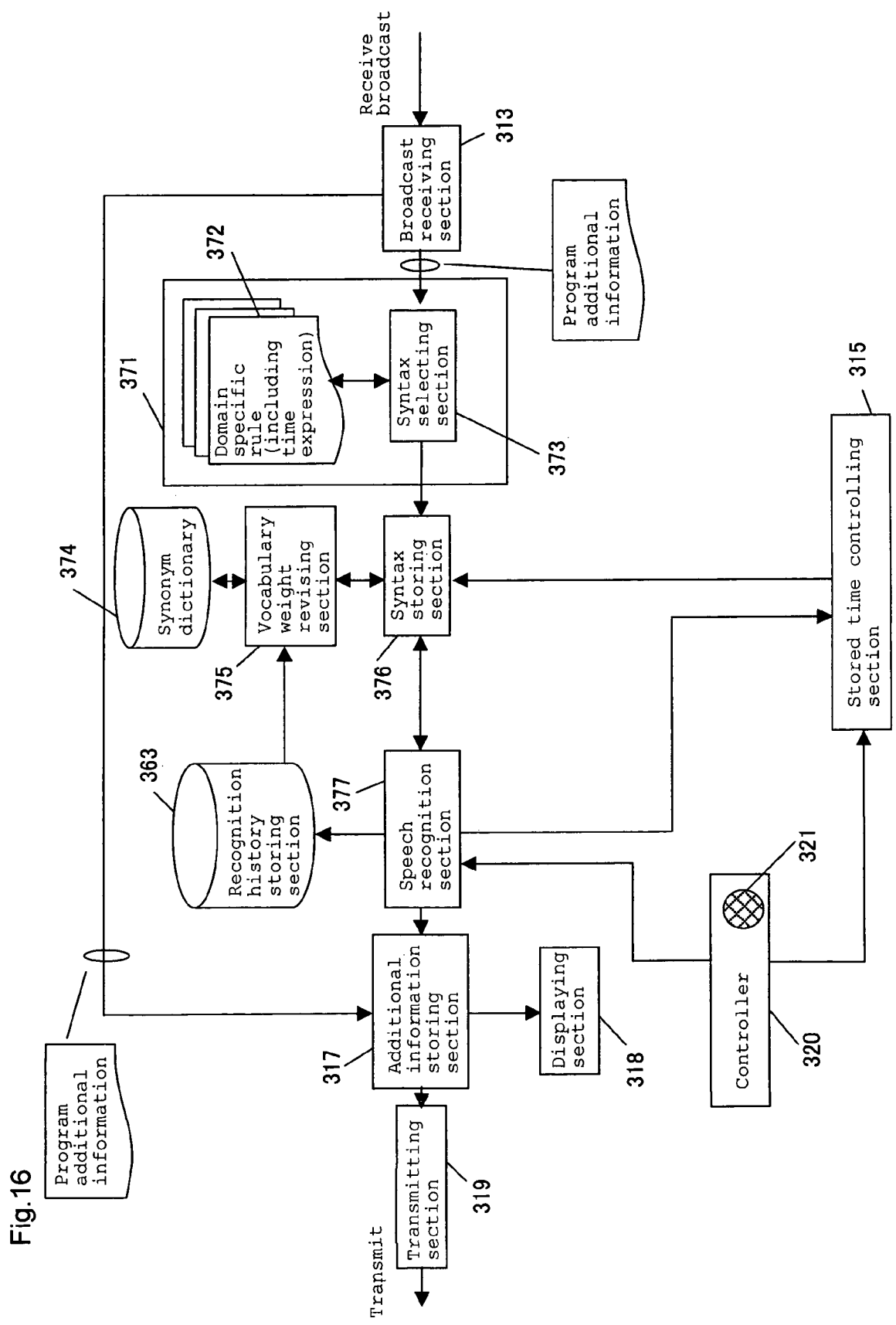
FIG. 16 is a block diagram showing the configuration of a TV/STB according to Embodiment 3 of the present invention.

A block diagram showing the conceptual configuration of a shopping assistance system employing two-way broadcasting according to Embodiment 3 of the present invention is equivalent to such a diagram that in FIG. 1, the recognition vocabulary storing section 351 is changed into a syntax storing section 376 while the speech recognition section 352 is changed into a speech recognition section 377. Thus, description for FIG. 1 overlaps with that of Embodiment 1, and hence is omitted. FIG. 16 is a functional block diagram showing the detail of the shopping assistance system employing two-way broadcasting (referred to as a shopping assistance system, hereafter).

As shown in FIG. 16, the TV/STB 310 comprises a broadcast receiving section 313, a recognition vocabulary generating section 371, a synonym dictionary 374, a vocabulary weight revising section 375, a syntax storing section 376, a speech recognition section 377, a recognition history storing section 363, an additional information storing section 317, a displaying section 318, a transmitting section 319, a remote controller 320, a microphone 321, and a stored time controlling section 315. The recognition vocabulary generating section 371 comprises a domain specific rule 372 and a syntax selecting section 373. That is, the recognition vocabulary generating section 371 has the function of a semiconductor memory or a hard disk, so that the domain specific rule 372 is stored in the semiconductor memory or the hard disk. The syntax storing section 376 has the function of a semiconductor memory or a hard disk, and stores later-described Ngram syntax information in the inside.

The broadcast receiving section 313, the stored time controlling section 315, the additional information storing section 317, the displaying section 318, the transmitting section 319, the remote controller 320, and the microphone 321 are similar to those of Embodiment 1. Thus, detailed description is omitted.

As shown in the domain specific rule 372, the recognition vocabulary generating section 371 stores, in advance, domain specific Ngram syntax information such as drama, outdoors, and autumn, in the semiconductor memory or the hard disk in the inside. The recognition vocabulary generating section 371 is part of selecting the Ngram syntax information of a domain corresponding to a scene code transmitted from the broadcast receiving section 313. That is, the syntax selecting section 373 is part of selecting the Ngram syntax information of a domain corresponding to a scene code outputted from the broadcast receiving section 313.

The syntax storing section 376 has the function of a semiconductor memory or a hard disk, and is part of storing Ngram syntax information selected by the syntax selecting section 373, into the semiconductor memory or the hard disk.

The vocabulary weight revising section 375 is correcting part of utilizing the synonym dictionary 374 in which a plurality of words are classified into word classes on the basis of the synonymy between the words, and of thereby correcting the frequency of appearance of a predetermined word with reference to a predetermined word class in an expression form of the Ngram syntax information, on the basis of the history information of speech recognition result of already performed speech recognition stored in the recognition history storing section 363.

The speech recognition section 377 is part of performing continuous speech recognition on a voice uttered by a viewing person, by using the Ngram syntax information stored in the syntax storing section 376.

Next, the operation of the present embodiment having such a configuration is described below.

Figure 17:
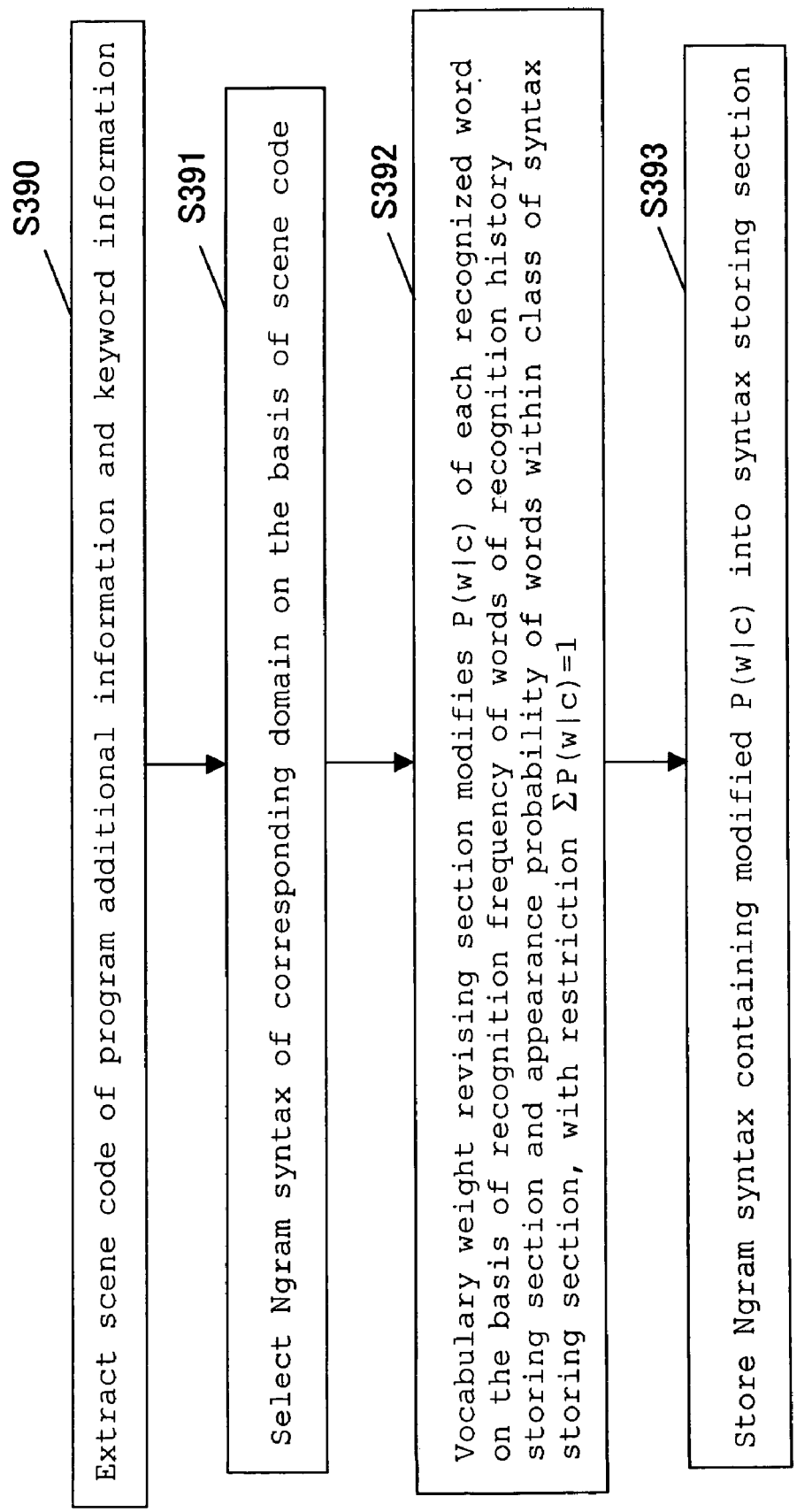
FIG. 17 is a flow chart showing the outline of operation of a shopping assistance system according to Embodiment 3 of the present invention.

First, the outline of operation is described with reference to the flow chart of FIG. 17.

At the same time that broadcast contents to be broadcasted are broadcasted from the broadcasting station 10, the following information is also broadcasted: additional information that is made to correspond to an object appearing in the broadcast contents and that contains keyword information of specifying the object; and a scene code of specifying Ngram syntax information. The broadcast receiving section 313 receives the broadcast.

At step 390, from the data outputted from the broadcast receiving section 313, the syntax selecting section 373 extracts the scene code and the keyword information contained in the additional information. Here, a scene code indicates information of specifying Ngram syntax information for each domain, stored in the recognition vocabulary generating section 371.

Next, at step 391, the syntax selecting section 373 selects the Ngram syntax information of a domain corresponding to the scene code outputted from the broadcast receiving section 313.

Next, at step 392, the vocabulary weight revising section 375 corrects the frequency of appearance of a predetermined word with reference to a predetermined word class in an expression form of the Ngram syntax information, on the basis of the recognition history information stored in the recognition history storing section 363 and of the synonym dictionary 374.

Next, at step 393, the recognition vocabulary weight revising section 375 stores the corrected Ngram syntax information into the syntax storing section 376.

As such, the Ngram syntax information stored in the syntax storing section 376 is used in the speech recognition in the speech recognition section 377. At step 393, the recognition vocabulary weight revising section 375 corrects the Ngram syntax information by using the recognition history information and the synonym dictionary 374. By virtue of this, the speech recognition of an object appearing in a broadcasted program or a broadcasted commercial is performed in a manner suitable for the expression uttered by a viewing person. Thus, the additional information made to correspond to an object appearing in a broadcasted program or a broadcasted commercial can be specified in a manner suitable for the expression uttered by a viewing person. This situation is described below in detail.

Next, the detailed operation of the shopping assistance system of Embodiment 3 is described below with reference to the flow chart of FIG. 18.

Figure 18:
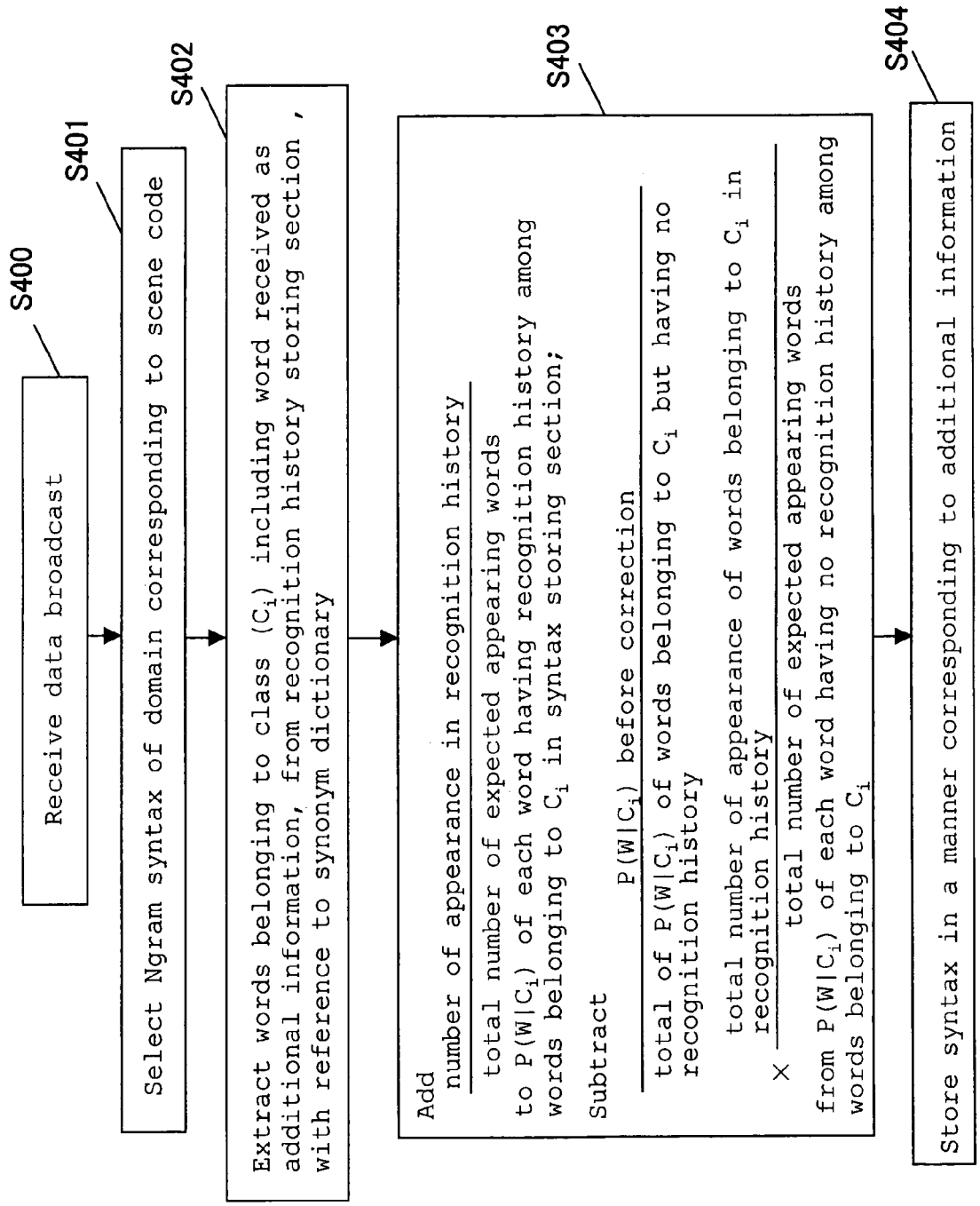
FIG. 18 is a flow chart showing the detail of operation of a shopping assistance system according to Embodiment 3 of the present invention.

In FIG. 18, as described above, at the same time that broadcast contents to be broadcasted are broadcasted from the broadcasting station 10, the following information is also broadcasted: additional information that is made to correspond to an object appearing in the broadcast contents and that contains keyword information of specifying the object; and a scene code of specifying Ngram syntax information.

At step 400, the broadcast receiving section 313 receives this broadcast.

At step 401, from the data outputted from the broadcast receiving section 313, the syntax selecting section 373 extracts the scene code and the keyword information contained in the additional information.

Here, a scene code indicates information of specifying Ngram syntax information for each domain, stored in the recognition vocabulary generating section 371. An example of the scene code is a code of specifying a domain, such as a drama, outdoors, and autumn. As shown in a domain specific rule 372, the recognition vocabulary generating section 371 stores Ngram syntax information for each domain. Thus, when a scene code is specified, the Ngram syntax information of a domain corresponding to the specified scene code is specified.

Similarly to Embodiment 1, it is assumed that the additional information of jacket has been transmitted as additional information. As for the additional information in this case, the additional information contains the explanation of the price, the size, the color, and the like of the jacket and the explanation of a vendor and the like of the jacket, in addition to the keyword information indicating the jacket, similarly to Embodiment 1.

The syntax selecting section 373 selects from the domain specific rule 372 the Ngram syntax information of the domain corresponding to the scene code, and then stores the selected Ngram syntax information into the syntax storing section 376.

Here, the general formula of Ngram syntax information is as the following Formula 1.

$$P(W_i / W_{i-1} W_{i-2} \ldots W_{i-n+1}) = \frac{N(W_i W_{i-1} \ldots W_{i-n+1})}{N(W_{i-1} \ldots W_{i-n+1})} \quad \text{(Formula 1)}$$

In Formula 1, $P(W_i|W_{i-1}W_{i-2} \ldots W_{i-n+1})$ expresses the probability that a word $W_i$ appears after a word sequence $W_{i-1}W_{i-2} \ldots W_{i-n+1}$ in a sufficiently large Japanese corpus. Further, $N(W_i W_{i-1} \ldots W_{i-n+1})$ expresses the frequency that a word sequence $W_i W_{i-1} \ldots W_{i-n+1}$ appears in a sufficiently large Japanese corpus.

In Ngram syntax, Formula 1 is approximated as the following Formula 2.

$$P(W_i / W_{i-1} W_{i-2} \ldots W_{i-n+1}) \approx \frac{N(C_i C_{i-1} \ldots C_{i-n+1})}{N(C_{i-1} C_{i-2} \ldots C_{i-n+1})} \times \frac{N(W_i)}{N(C_i)} \quad \text{(Formula 2)}$$

$$\approx P(C_i / C_{i-1} \ldots C_{i-n+1}) \times P(W_i / C_i)$$

In Formula 2, $P(C_i|C_{i-1} \ldots C_{i-n+1})$ expresses the probability that a word class $C_i$ appears after a word class sequence $C_{i-1}C_{i-2} \ldots C_{i-n+1}$ in a sufficiently large Japanese corpus. Further, $P(W_i|C_i)$ expresses the probability that a word $W_i$ among the words contained in a word class $C_i$ appears in a sufficiently large Japanese corpus.

In particular, in the case of n=2, Formula 1 is rewritten into Formula 3.

$$P(W_i / W_{i-1}) = \frac{N(W_i W_{i-1})}{N(W_{i-1})} \quad \text{(Formula 3)}$$

Formula 2 is rewritten into Formula 4.

$$P(W_i / W_{i-1}) \approx \frac{N(C_i C_{i-1})}{N(C_{i-1})} \times \frac{N(W_i)}{N(C_i)} \quad \text{(Formula 4)}$$

$$\approx P(C_i / C_{i-1}) \times P(W_i / C_i)$$

The following description is given for the case of n=2. When n is larger than 2, the word class $C_{i-1}$ and the like should read as a word class sequence $C_{i-1} \ldots C_{i-n+1}$ and the like.

In Formula 4, $P(W_i|W_{i-1})$ expresses the probability that a word $W_i$ appears after a word $W_{i-1}$. Further, $P(C_i|C_{i-1})$ expresses the probability that a word contained in a word class $C_i$ appears after a word contained in a word class $C_{i-1}$ in a sufficiently large Japanese corpus. Furthermore, $P(W_i|C_i)$ expresses the probability that a word $W_i$ among the words contained in a word class $C_i$ appears in the above-mentioned sufficiently large Japanese corpus. Here, the word classes $C_i$, $C_{i-1}$, and the like are defined in the synonym dictionary 374. The synonym dictionary 374 is similar, for example, to the synonym dictionary 390 of FIG. 5 of Embodiment 1. That is, Formula 4 shows that the probability that a word $W_i$ appears after a word Wi−1 is given by the product of the probability that a word contained in the word class $C_i$ appears after a word contained in the word class $C_{i-1}$ and the probability that the word $W_i$ appears among the words contained in the word class $C_i$.

FIG. 19 shows Ngram syntax information 454 which is an example of the Ngram syntax information stored in the syntax storing section 376 in this manner. In the Ngram syntax information 454, for example, the probability that the word of 'coat' appears after the word of 'that' is expressed by the product of the probability that a word contained in the word class [clothing] appears after a word contained in the word class [demonstrative] and the probability that the word of 'coat' appears among the words contained in the word class [clothing].

Next, at steps 402 and 403, the vocabulary weight revising section 375 corrects the frequency of appearance of a predetermined word with reference to a predetermined word class in an expression form of the Ngram syntax information, on the basis of the recognition history information stored in the recognition history storing section 363 and of the synonym dictionary 374. That is, the vocabulary weight revising section 375 corrects $P(W_i|C_i)$ of Formula 4 by using the recognition history information stored in the recognition history storing section 363 and the synonym dictionary 374.

FIG. 20 is a diagram describing the operation of steps 402 and 403. The operation of steps 402 and 403 are described below in detail with reference to FIG. 20.

First, at step 402, the keyword corresponding to the keyword information contained in the additional information is jacket as described above. It is assumed that in the synonym dictionary 374, the jacket is defined as contained in the word class [clothing]. Further, the words contained in the word class [clothing] are defined as 'jacket', 'dress', 'coat', and 'shirt' as shown in $C_i$ 424 in the synonym dictionary 374. In this case, when the keyword corresponding to the keyword information contained in the additional information is jacket, the vocabulary weight revising section 375 selects 'jacket', 'dress', 'coat', and 'shirt' which are the words belonging to the word class [clothing], as shown in $C_i$ 424.

Next, at step 403, the recognition history storing section 363 retains words such as 'pumps', 'lipstick', 'television', and 'jacket', as recognition history information 421. The recognition history information 421 stored in the recognition history storing section 363 indicates the history of the words recognized as a result of already performed speech recognition.

Further, it is assumed that when the syntax selecting section 373 has specified and selected the Ngram syntax information from the scene code, $P(W_i|C_i)$ of Formula 4 is as shown as the initial state 421. That is, among the words contained in the word class [clothing], the probability of appearance of 'jacket' is 0.4. Among the words contained in the word class [clothing], the probability of appearance of 'dress' is 0.3. Among the words contained in the word class [clothing], the probability of appearance of 'coat' is 0.2. Among the words contained in the word class [clothing], the probability of appearance of 'shirt' is 0.1.

In this case, the vocabulary weight revising section 375 adds (the number of times of appearance in the recognition history information 421)/(the number of times of appearance of expected words) to $P(W_i|C_i)$ of Formula 4 for each word contained in the recognition history information 421 among 'jacket', 'dress', 'coat', and 'shirt' which are the words belonging to [clothing] which is the word class containing the word jacket. Here, the number of times of appearance of expected words has a similar meaning to that in Embodiment 1. The recognition history information 421 contains 'jacket' and 'dress' among 'jacket', 'dress', 'coat', and 'shirt'. The 'jacket' has appeared twice. The 'dress' has appeared once. In this case, when the number of times of appearance of expected words is assumed to be 100, 2/100 is added to P('jacket'|[clothing]), while 1/100 is added to P('dress'|[clothing]).

The vocabulary weight revising section 375 subtracts ((P(W_i|[clothing]) before correction)/(total of P(W_i|[clothing]) of the words belonging to the word class [clothing] but not contained in the recognition history information 421))×((total of the number of times of appearance of the words belonging to the word class [clothing] in the recognition history information 421)/(total of the number of times of appearance of expected words)) from $P(W_i|C_i)$ of Formula 4 for each word not contained in the recognition history information 421, among 'jacket', 'dress', 'coat', and 'shirt' which are the words belonging to [clothing] which is the word class containing the word jacket. That is, in general, (($P(W_i|C_i)$ before correction)/(total of $P(W_i|C_i)$ of the words belonging to the word class $C_i$ but not contained in the recognition history information 421))×((total of the number of times of appearance of the words belonging to the word class $C_i$ in the recognition history information 421)/(total of the number of times of appearance of expected words)) is subtracted from $P(W_i|C_i)$ of Formula 4 for each word not contained in the recognition history information 421.

The recognition history information 421 does not contain 'coat' and 'shirt' among 'jacket', 'dress', 'coat', and 'shirt'. In this case, when the number of times of appearance of expected words is assumed to be 100, (0.2/(P('coat'|[clothing]+P('shirt'|[clothing])))×(3/100) is subtracted from P('coat'|[clothing]). Further, (0.1/(P('coat'|[clothing]+P('shirt'|[clothing])))×(3/100))) is subtracted from P('shirt'|[clothing])

Further, when no word among 'jacket', 'dress', 'coat', and 'shirt' which are the words belonging to [clothing] which is the word class containing the word jacket is contained in the recognition history information 421, the vocabulary weight revising section 375 does not correct $P(W_i|C_i)$ of Formula 4 for the word class [clothing], and uses the data intact.

When the vocabulary weight revising section 375 corrects $P(W_i|C_i)$ of Formula 4 as described above, the correction is achieved as indicated by after-the-adaptation 422 in FIG. 20.

Next, at step 404, the vocabulary weight revising section 375 stores the Ngram syntax information shown in Formula 4 which has been obtained by correcting $P(W_i|C_i)$ of Formula 4, into the syntax storing section 376 in a manner corresponding to the additional information.

Next, in speech recognition, the speech recognition section 377 performs the speech recognition of the voice uttered by a viewing person, by using the Ngram syntax information stored in the syntax storing section 376.

When the viewing person utters "that jacket is good", the speech recognition section 377 performs continuous speech recognition by using the corrected Ngram syntax information stored in the syntax storing section 376. As a result, the statement "that jacket is good" is recognized. The Ngram syntax information is used in dividing into words the pronunciation sequence having been speech-recognized in the speech recognition.

It is assumed that using the Ngram syntax information, the speech recognition section 377 has recognized the words "that", "jacket", and "is good". Then, since the jacket which is the keyword corresponding to the keyword information contained in the additional information agrees with the jacket which is the word obtained by the speech recognition, the speech recognition section 377 specifies the additional information of the jacket. Then, the specified additional information of jacket is stored into the additional information storing section 317. The subsequent operation of processing the additional information is similar to that of Embodiment 1, and hence description is omitted.

Further, at each time that the speech recognition section 363 recognizes a word as described above, the recognized word is stored into the recognition history storing section 363.

Then, until a scene code is newly transmitted from the broadcasting station 10, at each time that a word is newly stored into the recognition history information storing section 363, the newly stored word is incorporated into the recognition history information 421, so that the vocabulary weight revising section 375 repeats the operation of steps 402 and 403. As such, the vocabulary weight revising section 375 corrects $P(W_i|C_i)$ of Formula 4 even during the speech recognition.

Then, when a scene code has newly been transmitted from the broadcasting station 10, the recognition weight revising section 375 performs the operation of steps 402 and 403 of FIG. 18 onto the previous recognition history information 421 in the state before the scene code has been transmitted.

On the other hand, after the speech recognition using the Ngram syntax information in Embodiment 3, when the additional information is specified using the keyword corresponding to the keyword information contained in the additional information, the additional information may be specified using the recognition vocabulary set described in Embodiment 1 or 2. This approach realizes also the effect of Embodiment 1 or 2 in addition to the effect of the present embodiment.

Further, the Ngram syntax information shown as a domain specific rule 372 stored in the recognition vocabulary generating section 371 of the present embodiment may be downloaded in advance using a network such as the Internet.

Further, the present embodiment has been described for the case that when receiving a scene code, the syntax selecting section 372 selects the Ngram syntax information of the domain corresponding to the scene code. However, the invention is not limited to this. A keyword information for Ngram syntax information specification which is the information of specifying Ngram syntax information may be transmitted from the broadcasting station 10, while a keyword information for Ngram syntax information specification may be imparted also to the Negron syntax information stored in the domain specific rule 372. Then, the syntax selecting section may specify the Ngram syntax information depending on the degree of agreement of those keywords for Ngram syntax information specification, and may thereby select the specified Ngram syntax information.

Further, the present embodiment has been described for the case that speech recognition is performed using the Ngram syntax information. However, the invention is not limited to this. Even when the speech recognition is performed using a language model other than the Ngram, similar effect to that of the present embodiment is obtained. Here, examples of the language model other than the Ngram include a hidden Markov model and a probabilistic context-free grammar. In a language model other than the Ngram, for example, in a hidden Markov model, the output probability that the word recognized by speech recognition is outputted from a "state" of outputting a recognized word may be increased on the basis of the recognition result. Alternatively, in a probabilistic context-free grammar, a "non-termination symbol" (for example, indicating the class to which the recognized word belongs) expanded to a recognized word may increase the probability that the recognized word is generated as a "termination symbol".

As such, the recognition weight revising section 375 corrects $P(W_i|C_i)$ of Formula 4. This realizes more reliable recognition of a continuous speech suitable for the expression uttered by a viewing person. Thus, the additional information made to correspond to an object appearing in a broadcasted program or a broadcasted commercial can be specified in a manner suitable for the expression uttered by a viewing person.

The broadcasting station 10 of the present embodiment is an example of a first apparatus according to the present invention. The TV/STB 310 of the present embodiment is an example of a second apparatus according to the present invention. The broadcast receiving section 313 of the present embodiment is an example of receiving part of the present invention. The recognition vocabulary generating section 371 of the present embodiment is an example of language model specifying part of the present invention. The vocabulary weight revising section 375 of the present embodiment is an example of correcting part of the present invention. The speech recognition section 377 of the present embodiment is an example of speech recognition part of the present invention. The speech recognition section 377 of the present embodiment is an example of specifying part of the present invention. The displaying section 318 of the present embodiment is an example of displaying part of the present invention. The scene code of the present embodiment is an example of an ID of the present invention.

Embodiment 4

Described next is a shopping assistance system employing two-way broadcasting according to Embodiment 4 of the present invention.

Figure 21:
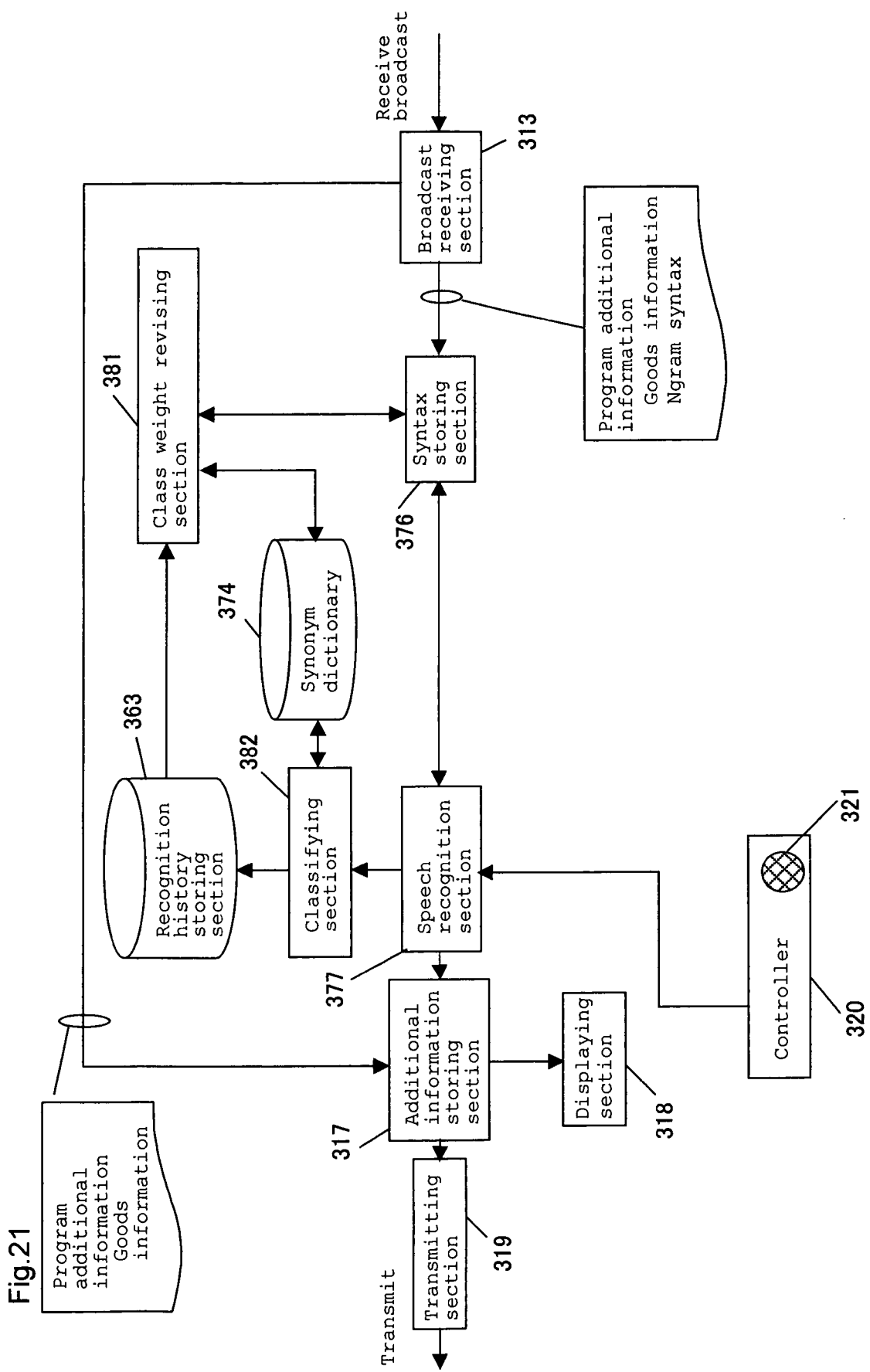
FIG. 21 is a block diagram showing the configuration of a TV/STB according to Embodiment 4 of the present invention.

A block diagram showing the conceptual configuration of a shopping assistance system employing two-way broadcasting Embodiment 4 of the present invention is equivalent to such a diagram that in FIG. 1, the recognition vocabulary storing section 351 is changed into a syntax storing section 376 while the speech recognition section 352 is changed into a speech recognition section 377. Thus, description for FIG. 1 overlaps with that of Embodiment 1, and hence is omitted. FIG. 21 is a functional block diagram showing the detail of the shopping assistance system employing two-way broadcasting (referred to as a shopping assistance system, hereafter).

As shown in FIG. 21, the TV/STB 310 comprises a broadcast receiving section 313, a syntax storing section 376, a speech recognition section 377, a goods data storing section 317, a displaying section 318, a transmitting section 319, a classifying section 382, a recognition history storing section 363, a synonym dictionary 374, and a class weight revising section 381.

The broadcast receiving section 313, the additional information storing section 317, the displaying section 318, the transmitting section 319, the remote controller 320, and the microphone 321 are similar to those of Embodiment 1. Thus, detailed description is omitted. Further, the syntax storing section 376, the speech recognition section 377, and the recognition history storing section 363 are similar to those of Embodiment 3, and hence detailed description is omitted.

The class weight revising section 381 is part of utilizing a synonym dictionary 374 in which a plurality of words are classified into word classes on the basis of the synonymy between the words, and of thereby correcting the frequency that a predetermined word class appears after a predetermined word class in an expression form of Ngram syntax information.

The speech recognition section 377 is part of specifying, by using the synonym dictionary 374 and on the basis of the word recognized as the speech recognition result, the class in which the word is contained, and of storing into the recognition history storing section 363 the recognized word and the class in which the word is contained.

Next, the operation of Embodiment 4 having such a configuration is described below with focusing attention on the difference from Embodiment 3.

First, the outline of operation is described with reference to the flow chart of FIG. 22.

At the same time that broadcast contents to be broadcasted are broadcasted from the broadcasting station 10, the following information is also broadcasted: additional information that is made to correspond to an object appearing in the broadcast contents and that contains keyword information of specifying the object; and Ngram syntax information. The broadcast receiving section 313 receives the broadcast.

At step 410, the broadcast receiving section 313 stores the broadcasted Ngram syntax information into the syntax storing section 376.

Next, at step 411, using the recognition history information stored in the recognition history storing section 363, the class weight revising section 381 corrects the frequency that a predetermined word class appears after a predetermined word class in an expression form of Ngram syntax information.

Next, at step 412, the class weight revising section 381 stores the corrected Ngram syntax information into the syntax storing section 376.

As such, the Ngram syntax information stored in the syntax storing section 376 is used by the speech recognition section 377 for the speech recognition in a manner similar to Embodiment 3. At step 411, the class weight revising section 381 corrects the Ngram syntax information by using the recognition history information. By virtue of this, the speech recognition of an object appearing in a broadcasted program or a broadcasted commercial is performed in a manner suitable for the interest of a viewing person. Thus, the additional information made to correspond to an object appearing in a broadcasted program or a broadcasted commercial can be specified in a manner suitable for the interest of a viewing person. This situation is described below in detail.

Next, the detailed operation of the shopping assistance system of Embodiment 4 is described below with reference to the flow chart of FIG. 23.

Figure 23:
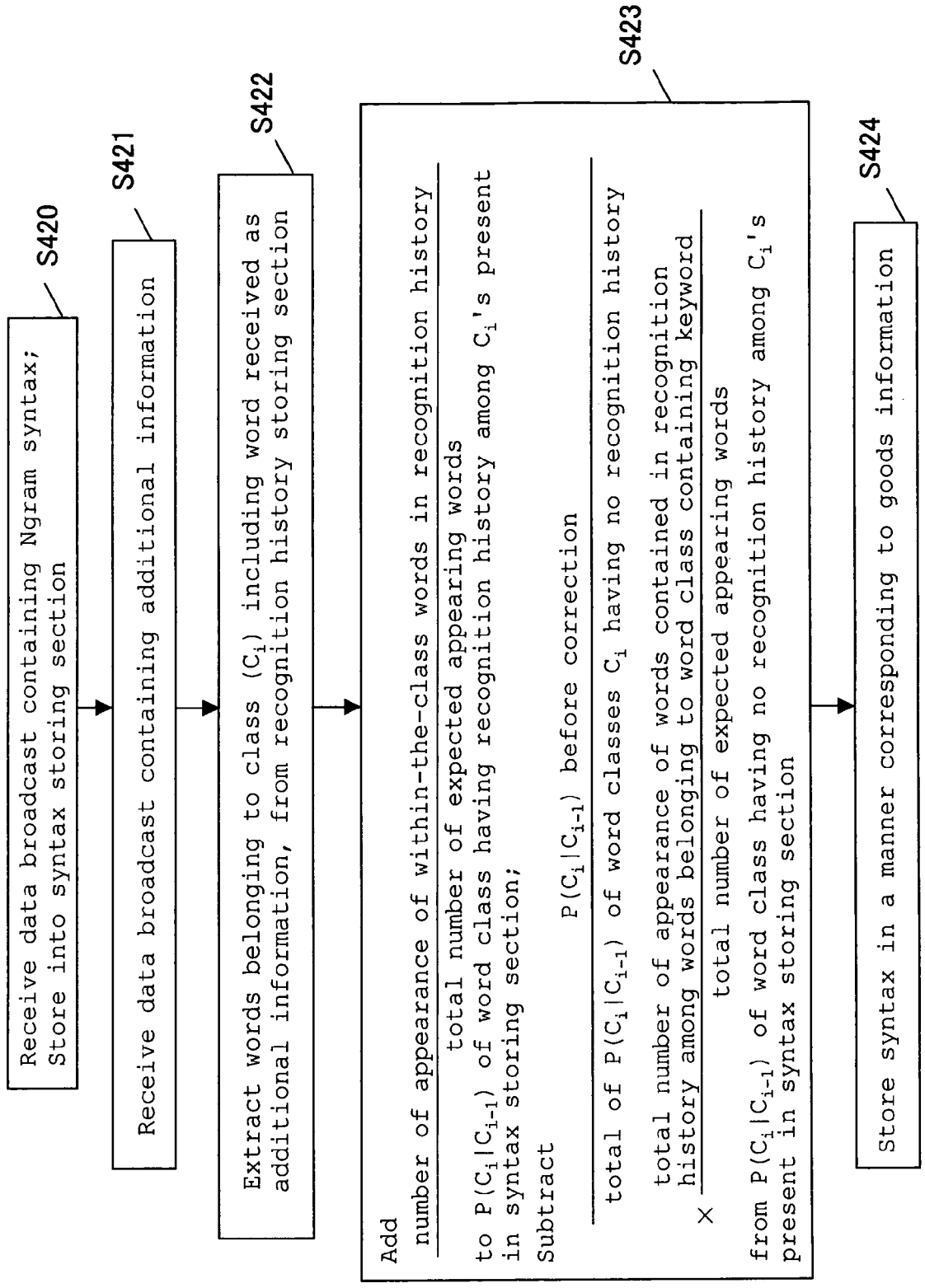
FIG. 23 is a flow chart showing the detail of operation of a shopping assistance system according to Embodiment 4 of the present invention.

In FIG. 23, as described above, at the same time that broadcast contents to be broadcasted are broadcasted from the broadcasting station 10, the following information is also broadcasted: additional information that is made to correspond to an object appearing in the broadcast contents and that contains keyword information of specifying the object; and Ngram syntax information.

At step 420, the broadcast receiving section 313 receives the broadcast, and then stores the Ngram syntax information into the syntax storing section 376.

The Ngram syntax information has been described in Embodiment 3, and hence description is omitted. In Embodiment 4, in contrast to Embodiment 3, $P(C_i|C_{i-1})$ of Formula 4 is corrected using the recognition history information of the recognition history storing section 363.

FIG. 24 show an example of $P(C_i|C_{i-1})$ of Formula 4. In FIG. 24, for example, the probability that the class of clothing appears after the word class of demonstrative is 0.30.

Next, at step 421, the broadcast receiving section 313 receives the additional information, and then stores the information into the additional information storing section 317. Here, the received additional information is assumed to be the additional information of jacket similarly to Embodiment 3.

Next, at steps 422 and 423, using the recognition history information stored in the recognition history storing section 363, the class weight revising section 381 corrects the frequency that a predetermined word class appears after a predetermined word class in an expression form of Ngram syntax information. That is, the class weight revising section 381 corrects $P(C_i|C_{i-1})$ of Formula 4 by using the recognition history information stored in the recognition history storing section 363.

FIG. 25 is a diagram describing the operation of steps 422 and 423. The operation of steps 422 and 423 are described below in detail with reference to FIG. 25.

First, at step 422, the keyword corresponding to the keyword information contained in the additional information is jacket as described above. It is assumed that in the synonym dictionary 374, the jacket is defined as contained in the word class [clothing]. Further, the recognition history storing section 363 stores recognition history information similar to that shown as the recognition history information 451 of FIG. 25.

This recognition history information 451 comprises the word obtained by speech recognition and the word class in which the word is contained. That is, using the synonym dictionary 374, the classifying section 382 detects the word class containing the word recognized as a result of speech recognition of the speech recognition section 377. Then, the classifying section 382 stores in advance into the recognition history storing section 363 the recognized word and the word class in which the word is contained. As such, the recognition history information 451 is generated by the classifying section 382.

Using the synonym dictionary 374, the class weight revising section 381 specifies [clothing] which is the word class containing the jacket which is the keyword corresponding to the keyword information of the additional information, and then extracts the word belonging to the word class [clothing] from the recognition history information 451. As shown in the recognition history information 451, 'jacket' is extracted twice, as the word belonging to the word class [clothing], and so is 'dress'.

Next, at step 423, it is assumed that n word classes are defined as shown as a class set 450 in the synonym dictionary 374. At the time that the broadcast receiving section 313 receives the Ngram syntax information and then stores the information into the syntax storing section 376, $P(C_i|C_{i-1})$ of Formula 4 is assumed to be in a state similar to the initial state 452. For example, the probability that a word contained in the word class [clothing] appears after a word contained in the word class [demonstrative] is 0.7, while the probability that a word contained in the word class [furniture] appears after a word contained in the word class [demonstrative] is 0.3.

In this case, in the class weight revising section 381, a value obtained by dividing the number of times of appearance that the word contained in the word class [clothing] appears in the recognition history information 451 by the total number of expected appearing words is added to P ($[clothing]|C_{i-1}$) which is the probability that the word contained in the word class [clothing] appears after the word contained in a certain word class. That is, when $C_i$ is the word class containing the keyword corresponding to the keyword information of the additional information, a value obtained by dividing the number of times of appearance that the word contained in the word class $C_i$ appears in the recognition history information 451 by the total number of expected appearing words is added to the probability that the word contained in $C_i$ appears after the word contained in a certain word class.

The four words of the word class [clothing] appear in the recognition history information 451. Thus, assuming that the total number of expected appearing words is 100, 4/100 is added to P([clothing]|[demonstrative]) of the initial state 452.

On the other hand, when the word classes other than the word class [clothing] is denoted by $C_j$, the class weight revising section 381 subtracts, from $P(C_j|C_{i-1})$, (($P(C_j|C_{i-1})$ before correction)×(total of $P(C_j|C_{i-1})$ of the word class $C_j$ having no recognition history))×((total of the number of times of appearance of the words belonging to the word class [clothing] in the recognition history information 451)/(total number of expected appearing words)). That is, when $C_j$ is a word class other than the word class containing the keyword corresponding to the keyword information of the additional information, and when $C_i$ is the word class containing the keyword corresponding to the keyword information of the additional information, (($P(C_j|C_{i-1})$ before correction)×(total of $P(C_j|C_{i-1})$ of the word class $C_j$ having no recognition history))×((total of the number of times of appearance of the words belonging to $C_i$ in the recognition history information 451)/(total number of expected appearing words)) is subtracted from $P(C_j|C_{i-1})$.

A value (0.3/0.3)×(4/100) is subtracted from P([furniture]|[demonstrative]) of the initial state 452. As a result, $P(C_j|C_{i-1})$ of Formula 4 is corrected as shown in after-the-adaptation 453 of FIG. 25.

Next, at step 424, the class weight revising section 381 stores the Ngram syntax information shown in Formula 4 which has been obtained by correcting $P(C_i|C_{i-1})$ of Formula 4, into the syntax storing section 376 in a manner corresponding to the additional information.

Next, in speech recognition, the speech recognition section 377 performs the speech recognition of the voice uttered by the viewing person, by using the Ngram syntax information stored in the syntax storing section 376.

When the viewing person utters "that jacket is good", the speech recognition section 377 performs continuous speech recognition, by using the corrected Ngram syntax information stored in the syntax storing section 376. As a result, the statement "that jacket is good" is recognized. The Ngram syntax information is used in dividing into words the pronunciation sequence having been speech-recognized in the speech recognition.

It is assumed that using the Ngram syntax information, the speech recognition section 377 has recognized the words "that", "jacket", and "is good". Then, since the jacket which is the keyword corresponding to the keyword information contained in the additional information agrees with the jacket which is the word obtained by the speech recognition, the speech recognition section 377 specifies the additional information of the jacket. Then, the specified additional information of jacket is stored into the additional information storing section 317. The subsequent operation of processing the additional information is similar to that of Embodiment 1, and hence description is omitted.

As such, the class weight revising section 381 corrects $P(C_i|C_{i-1})$ of Formula 4. This realizes more reliable recognition of a continuous speech suitable for the preference of a viewing person. Thus, the additional information made to correspond to an object appearing in a broadcasted program or a broadcasted commercial can be specified in a manner suitable for the preference of a viewing person.

Obviously, the various modifications described in the embodiments given above are applicable also to the present embodiment.

In the present embodiment, description has been given for the case that Ngram syntax information is transmitted from the broadcasting station 10. However, similarly to Embodiment 3, the Ngram syntax information may be selected using a scene code or the like. On the contrary, in Embodiment 3, the Ngram syntax information may be transmitted from the broadcasting station 10 as described in Embodiment 4, instead that the Ngram syntax information is selected using a scene code.

Further, in the present embodiment, description has been given for the case that the speech recognition is performed using the Ngram syntax information. However, the invention is not limited to this. A language model other than the Ngram may be used. Here, examples of the language model other than the Ngram include a hidden Markov model and a probabilistic context-free grammar. In a language model other than the Ngram, for example, in a hidden Markov model, when a "state" of outputting the recognized word on the basis of the recognition result is denoted by S1, with respect to each state Si having an arc transiting to S1, the transition probability from Si to S1 may be increased. Alternatively, in a probabilistic context-free grammar, when a "non-termination symbol" of developing the recognized word (termination symbol) is denoted by C1, the probability of the generation rule of developing a symbol string containing C1 may be increased.

The broadcasting station 10 of the present embodiment is an example of a first apparatus according to the present invention. The TV/STB 310 of the present embodiment is an example of a second apparatus according to the present invention. The broadcast receiving section 313 of the present embodiment is an example of receiving part of the present invention. The class weight revising section 381 of the present embodiment is an example of correcting part of the present invention. The speech recognition section 377 of the present embodiment is an example of speech recognition part of the present invention. The speech recognition section 377 of the present embodiment is an example of specifying part of the present invention. The displaying section 318 of the present embodiment is an example of displaying part of the present invention.

Embodiment 5

Described next is a shopping assistance system according to Embodiment 5 of the present invention.

Figure 29:
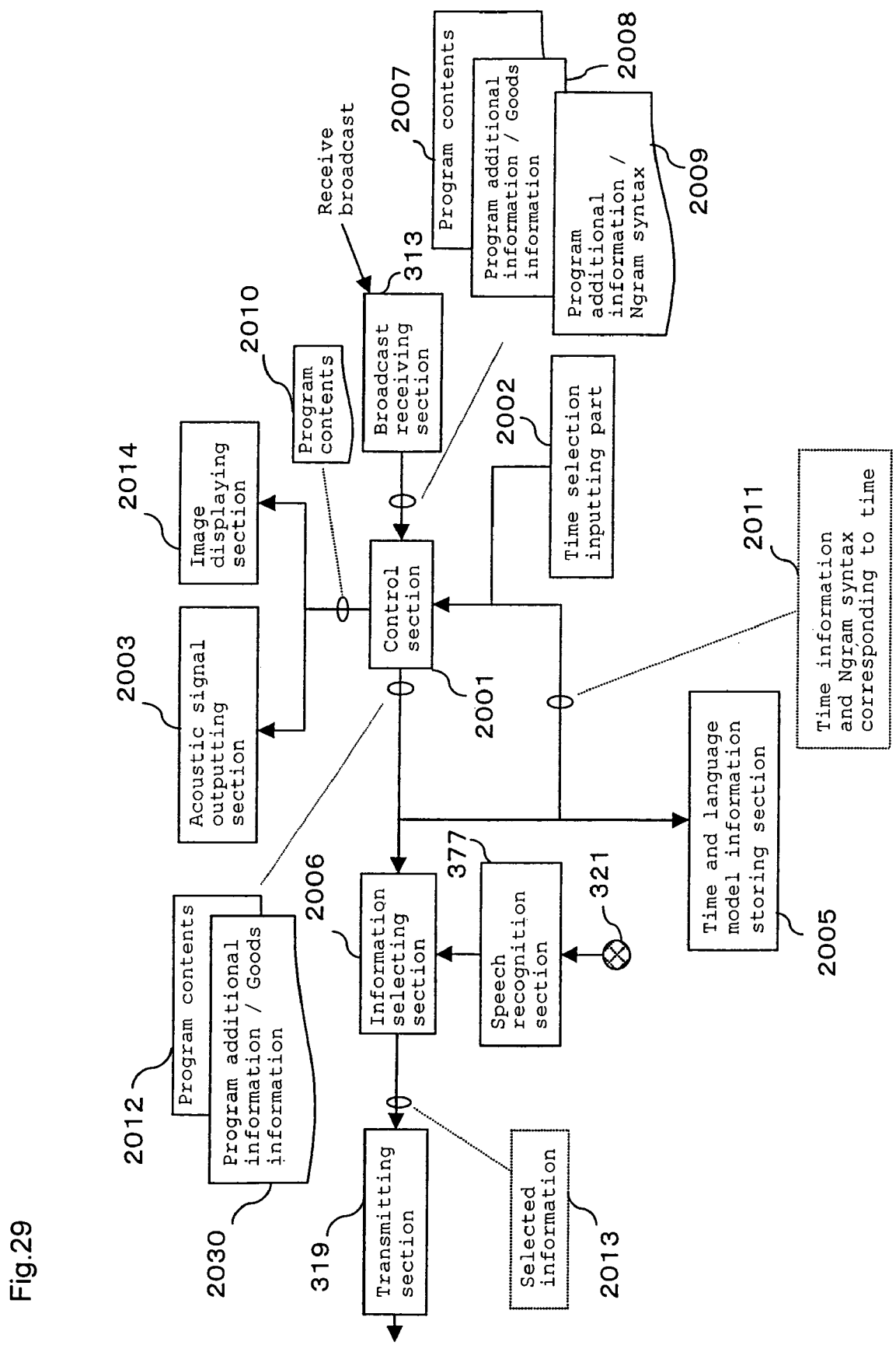
FIG. 29 is a block diagram showing the configuration of a TV/STB according to Embodiment 5 of the present invention.

A block diagram showing the conceptual configuration of the shopping assistance system according to Embodiment 5 of the present invention is equivalent to such a diagram that in FIG. 1, the recognition vocabulary storing section 351 is changed into a time and language model information storing section 2005 while the speech recognition section 352 is changed into a speech recognition section 377. Thus, description for FIG. 1 overlaps with that of Embodiment 1, and hence is omitted. FIG. 29 is a functional block diagram showing the detail of the shopping assistance system.

As shown in FIG. 29, the TV/STB 310 comprises a broadcast receiving section 313, a control section 2001, an acoustic outputting section 2003, an image displaying section 2004, a time selection inputting part 2002, a time and language model information storing section 2005, an information selecting section 2006, a speech recognition section 377, a microphone 321, and a transmitting section 319.

The broadcast receiving section 313, the transmitting section 319, the remote controller 320, and the microphone 321 are similar to those of Embodiment 1, and hence detailed description is omitted.

The control section 2001 is part of controlling the acoustic outputting section 2003, the image displaying section 2004, the information selecting section 2006, and the like.

The acoustic signal outputting section 2003 is part of outputting an acoustic signal outputted from the control section 2001, as a voice through a speaker provided in the acoustic signal outputting section 2003.

The image displaying section 2004 is part of displaying a video signal outputted from the control section 2001, onto a display provided in the image displaying section 2004.

The time selection inputting part 2002 is provided with a button switch, and is part of specifying the time position of an occasion that a user of the shopping assistance system becomes interested in something during the watching of a program.

Time and language model information storing section 2005 is part of storing the time position specified by the time selection inputting part 2002 and the language model information corresponding to the time position.

The speech recognition section 377 is part of performing speech recognition on a voice uttered by the user of the shopping assistance system, by using Ngram syntax information.

The information selecting section 2006 is part of selecting additional information depending on the degree of agreement between a word recognized by speech recognition in the speech recognition section 377 and a keyword corresponding to the keyword information contained in the additional information. The information selecting section 2006 has various kinds of functions of the recognition vocabulary generating section 371, the synonym dictionary 374, the vocabulary weight revising section 375, the recognition history storing section 363, the additional information storing section 317, and the like of Embodiment 3.

The transmitting section 319 is part of transmitting purchase information contained in the selected additional information to a broadcasting station, together with an identification number or the like of the corresponding additional information.

The TV/STB 310 of the present embodiment incorporates a hard disk of recording a program under watching.

Next, the operation of the present embodiment having such a configuration is described below.

Figure 30:
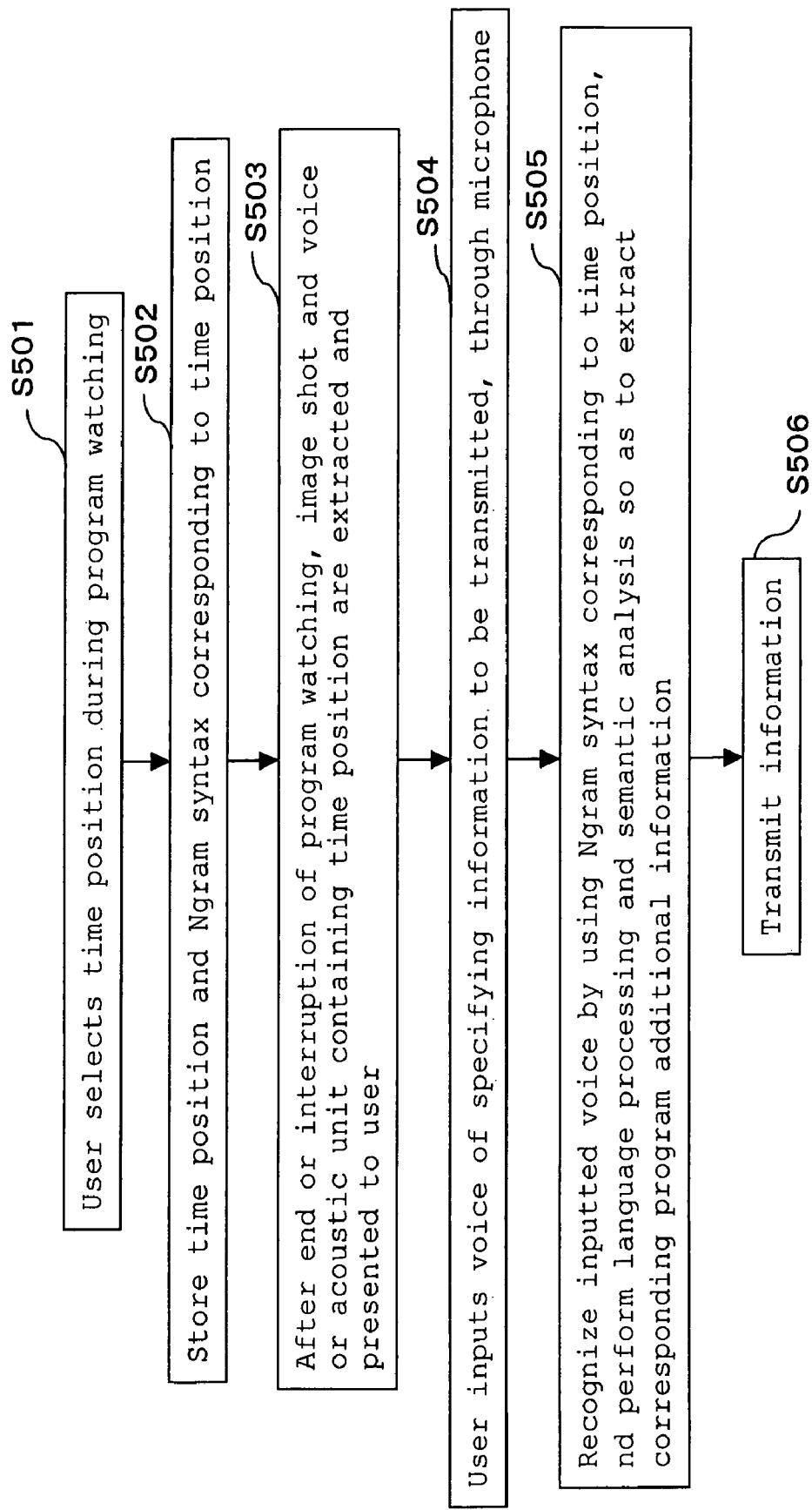
FIG. 30 is a flow chart showing the operation of a shopping assistance system employing two-way broadcasting according to Embodiment 5 of the present invention.

FIG. 30 is a flow chart showing operation of the TV/STB 310 of the present embodiment. The operation is described below with reference to FIG. 30.

At the same time that program contents 2007 which are broadcast contents to be broadcasted are broadcasted from the broadcasting station 10, the following information is also broadcasted: program additional information (goods information) 2008 which is additional information that is made to correspond to an object appearing in the broadcast contents and that contains keyword information of specifying the object; and program additional information (Ngram syntax) 2009 which is Ngram syntax information. The broadcast receiving section 313 receives the broadcast. That is, in the present embodiment, in contrast to Embodiment 3, the program additional information (Ngram syntax) 2009 is also broadcasted from the broadcasting station.

The control section 2001 outputs the program contents 2007 received by the broadcast receiving section 313, as program contents 2010 to the acoustic signal outputting section 2003 and the image displaying section 2004. At that time, the control section 2001 controls and causes the acoustic signal outputting section 2003 to output a sound signal of the program contents 2010 through the speaker, and controls and causes the image displaying section 2004 to display a video signal of the program contents 2010 on the display. Further, the control section 2001 performs control such that the broadcasted information such as the program contents 2007, the program additional information (goods information) 2008, and the program additional information (Ngram syntax) 2009 should be temporarily recorded in the built-in hard disk.

For example, a program of drama is being outputted through the speaker of the acoustic signal outputting section 2003 and on the display of the image displaying section 2004. Then, a user of the shopping assistance system of the present embodiment is watching the drama.

When the viewing person is watching the program, in case that something interesting such as the suit of a character, a furniture used in the set of the drama, and a book is displayed in the program on the display, the user operates the time selection inputting part 2002 and thereby appends a time tag.

That is, in case that something interesting is displayed on the display during the program watching, the user pushes the button switch provided in the time selection inputting part 2002.

The time selection inputting part 2002 outputs the time point of 10 seconds before the time that the command of appending the tag is inputted in response to the user's operation of the button switch and the time point of 10 seconds after the time that the command of appending the tag is inputted, as time positions to the control section 2001 (step 501).

Then, when time positions are inputted from the time selection inputting part 2002, the control section 2001 stores into the time and language model information storing section 2005 the time positions and the program additional information (Ngram syntax) 2009 included between the time positions, in a manner corresponding to each other, as time information and Ngram syntax 2011 corresponding to time (step 502).

Next, after the user has finished the watching of the program, or alternatively, after the user interrupts the watching, the control section 2001 reads the time positions and the Ngram syntax 2011 corresponding to time which are stored in the time and language model information storing section 2005. Then, the control section 2001 extracts from the built-in hard disk the sound signal and the video signal of the program contents which are included between the read-out time positions, and then outputs the signals to the acoustic signal outputting section 2003 and the image displaying section 2004, respectively (step 503). Then, in case that the scene included between the time positions stored in the time and language model information storing section 2005 is a scene where a character of the drama wears a suit, the scene which has the 20-second time width specified by the time position and in which the character of the drama wears the suit is presented to the user.

Further, the control section 2001 outputs the Ngram syntax information corresponding to the read-out time positions to the information selecting section 2006. The information selecting section 2006 outputs the Ngram syntax information to the speech recognition section 377.

Further, the control section 2001 extracts from the built-in hard disk the program additional information (goods information) 2008 included between the read-out time positions, and then outputs the information to the information selecting section 2006.

The user watches the re-displayed scene specified by the time position, and then inputs into the microphone 321 a voice of specifying the suit worn by the character (step 504). For example, the user utters "that suit is good" toward the microphone 321.

Then, using the Ngram syntax information which is the program additional information (Ngram syntax) 2009 read from the time and language model information storing section 2005, the speech recognition section 377 performs the speech recognition of the sound signal "that suit is good" (step 505).

That is, when the user utters "that suit is good", the speech recognition section 377 performs continuous speech recognition by using the Ngram syntax information which has been read from the time and language model information storing section 2005 and then optimized as described in Embodiment 3. The method of optimizing the Ngram syntax information is similar to that of Embodiment 3, and hence detailed description is omitted. As a result, the statement "that suit is good" is recognized. The Ngram syntax information is used in dividing into words the pronunciation sequence having been speech-recognized in the speech recognition.

It is assumed that using the Ngram syntax information, the speech recognition section 377 has recognized the words "that", "suit", and "is good". Then, the speech recognition section 377 outputs the word sequence "that", "suit", and "is good" to the information selecting section 2006.

Then, since the suit which is the keyword corresponding to the keyword information contained in the extracted additional information (goods information) 2013 agrees with the suit which is the word obtained by the speech recognition, the information selecting section 2006 specifies the additional information of the suit. Then, the specified additional information of suit is outputted as the selected information 2013 to the transmitting section 319. The transmitting section 319 transmits to the broadcasting station the purchase information contained in the selected information 2013, together with an identification number or the like of the corresponding additional information (step 506).

In case that the time selection inputting part 2002 is provided with a touch panel, in case that something interesting is displayed on the display during the program watching, the user may merely touch a tag button of the touch panel. Further, in case that the time selection inputting part 2002 is provided with a microphone, in case that something interesting is displayed on the display during the program watching, the user may merely utter "append a tag" or the like.

Further, in the present embodiment, description has been given for the case that the information selecting section 2006 optimizes the Ngram syntax information read from the time and language model information storing section 2005, by a method similar to Embodiment 3. However, the invention is not limited to this. The optimization may be performed by a method similar to Embodiment 4.

Further, in the present embodiment, the description has been given for the case that the time and language model information storing section 2005 stores the time positions and the Ngram syntax information which is the program additional information (Ngram syntax) 2009, as the time information and the Ngram syntax 2011 corresponding to time. However, the invention is not limited to this. The time and language model information storing section 2005 may store solely the time positions, and may store no Ngram syntax information. In this case, at step 503, the control section 2001 may extract the Ngram syntax information included between the read-out time positions, from the program additional information (Ngram syntax) 2009 stored in the built-in hard disk, and may then output the information to the information selecting section 2006.

Further, in the present embodiment, the description has been given for the case that the time and language model information storing section 2005 stores the time positions and the Ngram syntax information which is the program additional information (Ngram syntax) 2009, as the time information and the Ngram syntax 2011 corresponding to time. However, the invention is not limited to this. The time and language model information storing section 2005 may store the program additional information (goods information) 2008 included between the time positions, in addition to the time positions and the Ngram syntax information which is the program additional information (Ngram syntax) 2009. In this case, at step 503, the control section 2001 may read the additional information (goods information) 2008 included between the read-out time positions, from the time and language model information storing section 2005, and may then output the information to the information selecting section 2006.

Further, in the present embodiment, description has been given for the case that the program additional information (Ngram syntax) 2009 is broadcasted from the broadcasting station 10. However, in place of the program additional information (Ngram syntax) 2009, the recognition vocabulary set described in Embodiment 1 or 2 may be broadcasted from the broadcasting station 10. In this case, the control section 2001, the speech recognition section 377, and the information selecting section 2006 processes the recognition vocabulary set in place of the Ngram syntax information. The operation of the information selecting section 2006 and the speech recognition section 377 is similar to that of Embodiment 1 or 2 where the additional information (goods information) 2008 is specified using the recognition vocabulary set.

Further, in the present embodiment, the description has been given for the case that the entire program additional information (goods information) 2008 is recorded onto the built-in hard disk, and that the program additional information (goods information) 2008 included between the time positions specified by the time selection inputting part 2002 is solely presented. However, the invention is not limited to this. The program additional information (goods information) 2008 included between the time positions specified by the time selection inputting part 2002 may solely be recorded and presented.

As such, according to the present embodiment, the operation of specifying the additional information (goods information) is performed not during the watching of a program but after the end of the program or the interruption of the program. This allows the additional information (goods information) to be specified without interrupting the watching of the program in the course that the user watches the program.

Embodiment 6

Described next is a shopping assistance system according to Embodiment 6 of the present invention.

Figure 31:
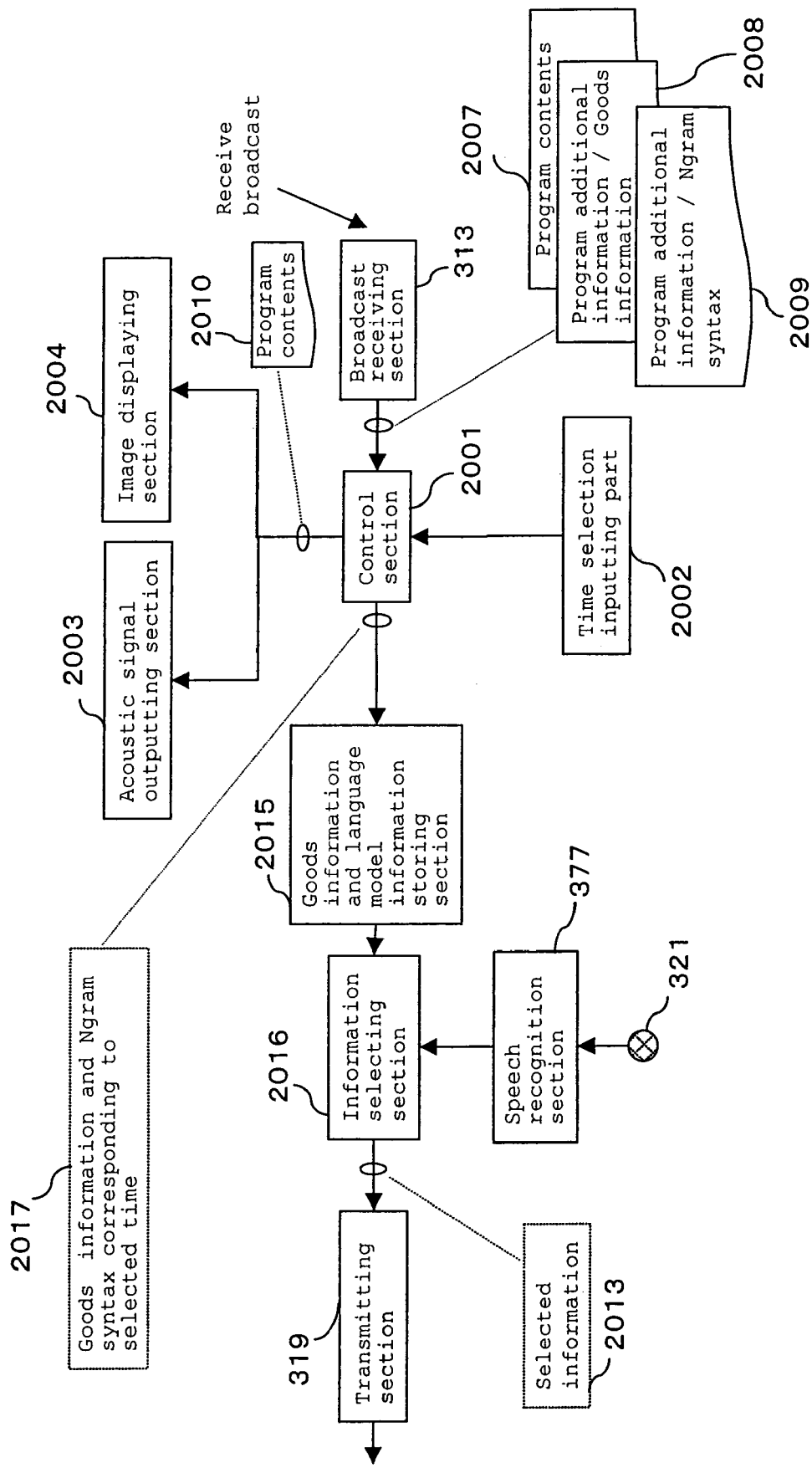
FIG. 31 is a block diagram showing the configuration of a TV/STB according to Embodiment 6 of the present invention.
Figure 32:
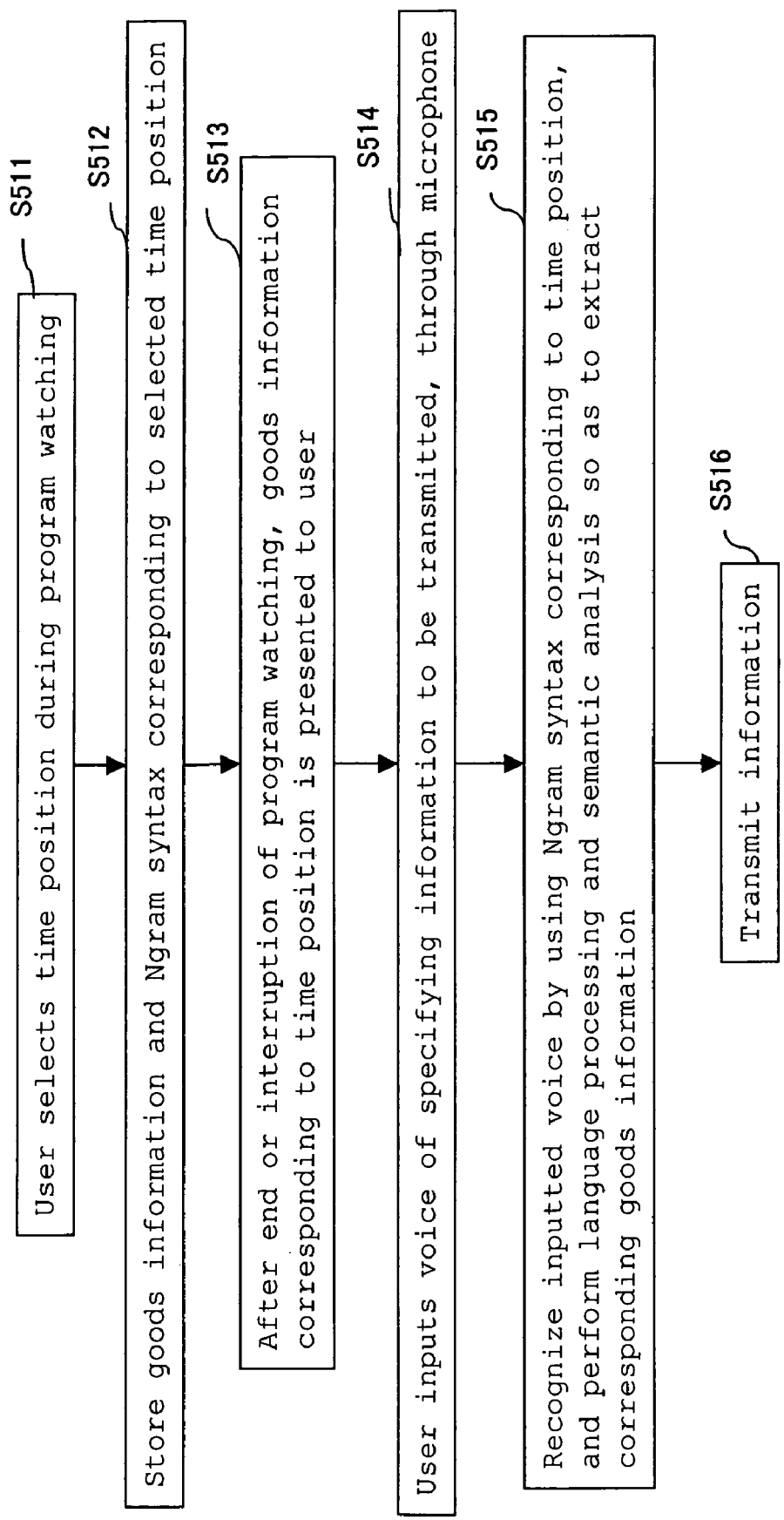
FIG. 32 is a flow chart showing the operation of a shopping assistance system employing two-way broadcasting according to Embodiment 6 of the present invention.

A block diagram showing the conceptual configuration of the shopping assistance system according to Embodiment 6 of the present invention is equivalent to such a diagram that in FIG. 1, the recognition vocabulary storing section 351 is changed into a goods information and language model information storing section 2015 while the speech recognition section 352 is changed into a speech recognition section 377. Thus, description for FIG. 1 overlaps with that of Embodiment 1, and hence is omitted. FIG. 31 is a functional block diagram showing the detail of the shopping assistance system (referred to as a shopping assistance system, hereafter).

As shown in FIG. 31, the TV/STB 310 comprises a broadcast receiving section 313, a control section 2001, an acoustic outputting section 2003, an image displaying section 2004, a time selection inputting part 2002, a goods information and language model information storing section 2015, an information selecting section 2016, a speech recognition section 377, a microphone 321, and a transmitting section 319.

The broadcast receiving section 313, the transmitting section 319, the remote controller 320, and the microphone 321 are similar to those of Embodiment 1, and hence detailed description is omitted.

The control section 2001 is part of controlling the acoustic outputting section 2003, the image displaying section 2004, the information selecting section 2016, and the like.

The acoustic signal outputting section 2003 is part of outputting an acoustic signal outputted from the control section 2001, as a voice through a speaker provided in the acoustic signal outputting section 2003.

The image displaying section 2004 is part of displaying a video signal outputted from the control section 2001, onto a display provided in the image displaying section 2004.

The time selection inputting part 2002 is provided with a button switch, and is part of specifying the time position of an occasion that a user of the shopping assistance system becomes interested in something during the watching of a program.

The goods information and language model information storing section 2015 is part of storing the language model information (Ngram syntax information) and the goods information, as the additional information corresponding to the time position specified by the time selection inputting part 2002.

The speech recognition section 377 is part of performing speech recognition on a voice uttered by a user of the shopping assistance system, by using Ngram syntax information.

The information selecting section 2016 is part of selecting the additional information depending on the degree of agreement between a word recognized by speech recognition in the speech recognition section 377 and a keyword corresponding to the keyword information contained in the additional information. The information selecting section 2016 has various kinds of functions of the recognition vocabulary generating section 371, the synonym dictionary 374, the vocabulary weight revising section 375, the recognition history storing section 363, the additional information storing section 317, and the like of Embodiment 3.

The transmitting section 319 is part of transmitting to the broadcasting station the purchase information contained in the selected additional information, together with an identification number or the like of the corresponding additional information.

Similarly to Embodiment 5, the TV/STB 310 of the present embodiment may incorporate a hard disk of recording a program or the like under watching. However, such a hard disk need not necessarily be incorporated.

Next, the operation of the present embodiment having such a configuration is described below with focusing attention on the difference from Embodiment 5.

FIG. 31 is a flow chart showing operation of the TV/STB 310 of the present embodiment. The operation is described below with reference to FIG. 31.

At the same time that program contents 2007 which are broadcast contents to be broadcasted are broadcasted from the broadcasting station 10, the following information is also broadcasted: program additional information (goods information) 2008 which is the additional information that is made to correspond to an object appearing in the broadcast contents and that contains keyword information of specifying the object; and program additional information (Ngram syntax) 2009 which is the Ngram syntax information. The broadcast receiving section 313 receives the broadcast. That is, in the present embodiment, in contrast to Embodiment 3, the program additional information (Ngram syntax) 2009 is also broadcasted from the broadcasting station.

The control section 2001 outputs the program contents 2007 received by the broadcast receiving section 313, as program contents 2010 to the acoustic signal outputting section 2003 and the image displaying section 2004. At that time, the control section 2001 controls and causes the acoustic signal outputting section 2003 to output a sound signal of the program contents 2010 through the speaker, and controls and causes the image displaying section 2004 to display a video signal of the program contents 2010 on the display.

For example, a program of drama is being outputted through the speaker of the acoustic signal outputting section 2003 and on the display of the image displaying section 2004. Then, a user of the shopping assistance system of the present embodiment is watching the drama.

The operation of step 511 is similar to the operation of step 501 of Embodiment 5.

Then, when time positions are inputted from the time selection inputting part 2002, the control section 2001 stores into the goods information and language model information storing section 2015 the following information as the goods information and the Ngram syntax 2017 corresponding to the selected time. The information to be stored is: goods information which is the program additional information (goods information) 2008 included between the time positions; and Ngram syntax information which is the program additional information (Ngram syntax) 2009 (step 512).

Next, after the user has finished the watching of the program, or alternatively, after the user interrupts the watching, the control section 2001 reads the Ngram syntax information and the goods information stored in the goods information and language model information storing section 2015, and then outputs the goods information in the form of a list to the image displaying section 2004. The image displaying section 2004 displays the list of the goods information on the display (step 513). FIG. 33 shows an example of the goods information displayed in this manner. That is, the goods information of the goods having appeared within the range between the time positions specified by the time selection inputting part 2002 is displayed as shown in FIG. 33. As such, the goods information specified by the time position is presented to the user.

The control section 2001 outputs to the information selecting section 2016 the Ngram syntax information and the goods information having been read out. The information selecting section 2016 outputs the Ngram syntax information to the speech recognition section 377.

While looking at the list of the goods information of FIG. 33, the user inputs a voice of specifying a suit into the microphone 321 (step 514). For example, the user utters "that suit is good" toward the microphone 321. The operation subsequent to step 514 is similar to the operation of Embodiment 5, and hence description is omitted.

The modifications described in Embodiment 5 are similarly applicable to Embodiment 6.

As such, according to the present embodiment, the operation of specifying additional information (goods information) is performed not during the watching of a program but after the end of the program or the interruption of the program. This allows the additional information (goods information) to be specified without interrupting the watching of the program in the course that the user watches the program.

Embodiment 7

Described next is a shopping assistance system according to Embodiment 7 of the present invention.

Figure 34:
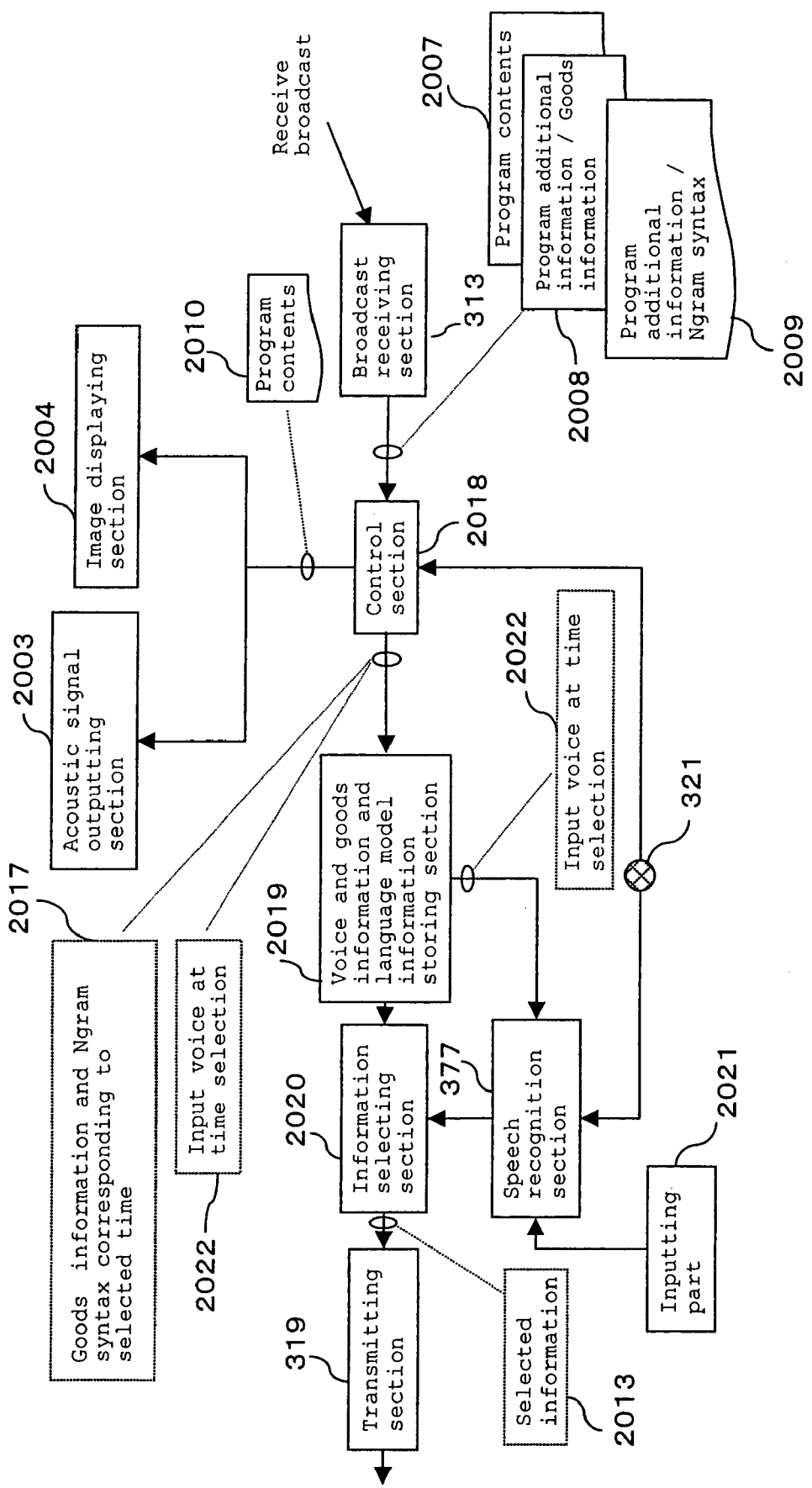
FIG. 34 is a block diagram showing the configuration of a TV/STB according to Embodiment 7 of the present invention.

A block diagram showing the conceptual configuration of the shopping assistance system according to Embodiment 7 of the present invention is equivalent to such a diagram that in FIG. 1, the recognition vocabulary storing section 351 is changed into a voice and goods information and language model information storing section 2019 while the speech recognition section 352 is changed into a speech recognition section 377. Thus, description for FIG. 1 overlaps with that of Embodiment 1, and hence is omitted. FIG. 34 is a functional block diagram showing the detail of the shopping assistance system (referred to as a shopping assistance system, hereafter).

As shown in FIG. 34, the TV/STB 310 comprises a broadcast receiving section 313, a control section 2018, an acoustic outputting section 2003, an image displaying section 2004, a voice and goods information and language model information storing section 2019, an information selecting section 2020, a speech recognition section 377, a microphone 321, and a transmitting section 319.

The broadcast receiving section 313, the transmitting section 319, the remote controller 320, and the microphone 321 are similar to those of Embodiment 1, and hence detailed description is omitted.

The control section 2018 is part of controlling the acoustic outputting section 2003, the image displaying section 2004, the information selecting section 2020, and the like.

The acoustic signal outputting section 2003 is part of outputting an acoustic signal outputted from the control section 2018, as a voice through a speaker provided in the acoustic signal outputting section 2003.

The image displaying section 2004 is part of displaying a video signal outputted from the control section 2018, onto a display provided in the image displaying section 2004.

The voice and goods information and language model information storing section 2019 is part of storing: language model information (Ngram syntax information); goods information; and a voice uttered by the user; as the additional information included within the 20 seconds containing the time point that the user of the shopping assistance system has uttered toward the microphone 321 during the watching of the program.

The speech recognition section 377 is part of performing speech recognition on a voice uttered by the user of the shopping assistance system, by using Ngram syntax information.

The information selecting section 2020 is part of selecting additional information depending on the degree of agreement between a word recognized by speech recognition in the speech recognition section 377 and a keyword corresponding to the keyword information contained in the additional information. The information selecting section 2020 has various kinds of functions of the recognition vocabulary generating section 371, the synonym dictionary 374, the vocabulary weight revising section 375, the recognition history storing section 363, the additional information storing section 317, and the like of Embodiment 3.

The transmitting section 319 is part of transmitting to the broadcasting station the purchase information contained in the selected additional information, together with an identification number or the like of the corresponding additional information.

Similarly to Embodiment 5, the TV/STB 310 of the present embodiment may incorporate a hard disk of recording a program or the like under watching. However, such a hard disk need not necessarily be incorporated.

Next, the operation of the present embodiment having such a configuration is described below with focusing attention on the difference from Embodiments 5 and 6.

Figure 35:
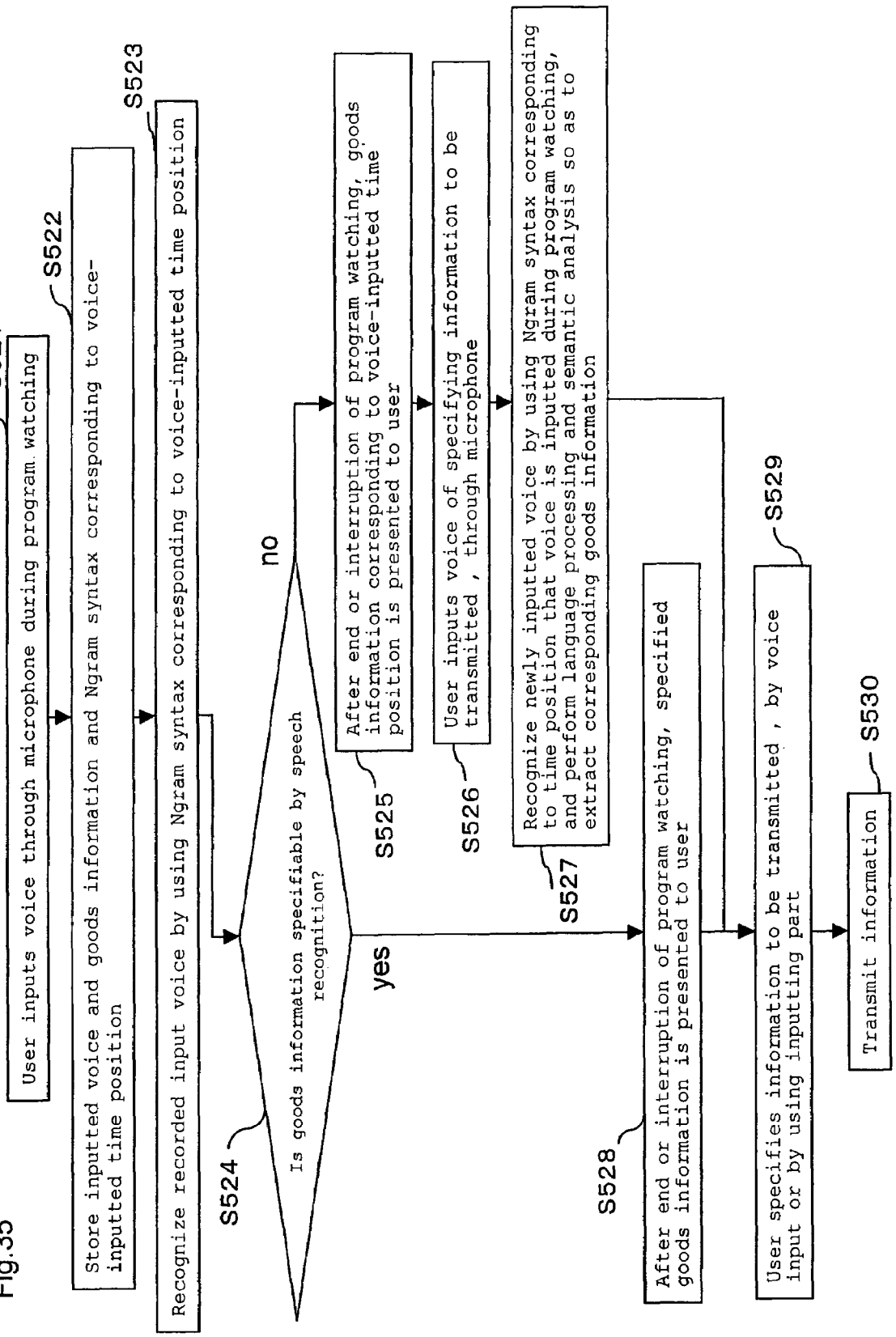
FIG. 35 is a flow chart showing the operation of a shopping assistance system employing two-way broadcasting according to Embodiment 7 of the present invention.

FIG. 35 is a flow chart showing operation of the TV/STB 310 of the present embodiment. The operation is described below with reference to FIG. 35.

At the same time that program contents 2007 which are broadcast contents to be broadcasted are broadcasted from the broadcasting station 10, the following information is also broadcasted: program additional information (goods information) 2008 which is the additional information that is made to correspond to an object appearing in the broadcast contents and that contains keyword information of specifying the object; and program additional information (Ngram syntax) 2009 which is the Ngram syntax information. The broadcast receiving section 313 receives the broadcast. That is, in the present embodiment, in contrast to Embodiment 3, the program additional information (Ngram syntax) 2009 is also broadcasted from the broadcasting station.

The control section 2018 outputs the program contents 2007 received by the broadcast receiving section 313, as program contents 2010 to the acoustic signal outputting section 2003 and the image displaying section 2004. At that time, the control section 2018 controls and causes the acoustic signal outputting section 2003 to output a sound signal of the program contents 2010 through the speaker, and controls and causes the image displaying section 2004 to display a video signal of the program contents 2010 on the display.

For example, a program of drama is being outputted through the speaker of the acoustic signal outputting section 2003 and on the display of the image displaying section 2004. Then, a user of the shopping assistance system of the present embodiment is watching the drama.

When the viewing person is watching the program, in case that something interesting such as the suit of a character, a furniture used in the set of the drama, and a book is displayed in the program on the display, the user utters toward the microphone 321 (step 521).

Next, the control section 2018 stores into the voice and goods information and language model information storing section 2019: the input voice inputted at step 521; the goods information included within the 20 seconds containing the time position that the input voice was inputted; and Ngram syntax information (step 522). That is, the control section 2018 stores into the voice and goods information and language model information storing section 2019 the following information as the goods information and the Ngram syntax 2017 corresponding to the selected time. The information to be stored is: goods information which is the program additional information (goods information) 2008 included within the 20 seconds containing the time position that the input voice was inputted; and Ngram syntax information which is the program additional information (Ngram syntax) 2009. Further, the control section 2018 stores into the voice and goods information and language model information storing section 2019 the input voice inputted at step 521, as the input voice 2022 at time selection.

Next, without interrupting the watching of the program, the control section 523 controls and causes the speech recognition section 377 to receive the at-the-time-selection input voice 2022 stored in the voice and goods information and language model information storing section 2019, by using the Ngram syntax information that corresponds to the input voice and that is stored in the voice and goods information and language model information storing section 2019. In response to this control, the speech recognition section 377 performs speech recognition (step 523). Then, in case that goods information can be specified, the information selecting section 2020 specifies the goods information. This operation of specifying the goods information is performed similarly to Embodiment 3. When the operation of step 523 is performed, the watching of the program is not interrupted.

Next, as a result of speech recognition in the speech recognition section 377, in the case that the information selecting section 2020 can specify the goods information, the procedure goes to step 528. In the case that the goods information cannot be specified, the procedure goes to step 525 (step 524). The case that the goods information can be specified is a case that the input voice 2022 at the time selection indicates a specific goods item, such as the case of "that suit is good". The case that the goods information cannot be specified is a case that the input voice 2022 at the time selection does not indicate a specific goods item, such as the case of "that is good".

At step 528, after the end of the program watching or the interruption of the program watching, the control section 2018 controls and causes the information selecting section 2020, the acoustic outputting section 2003, and the image displaying section 2004 to present to the user the specified goods information. In response to this control, the specified goods information is displayed on the display of the image displaying section 2004. Then, the procedure goes to step 530.

On the other hand, at step 525, after the end of the program watching or the interruption of the program watching, the control section 2018 reads the goods information included within the 20 seconds including the time point of inputting of the input voice 2022 at the time selection, from the voice and goods information and language model information storing section 2019, and then outputs the goods information in the form of a list to the image displaying section 2004. Then, the image displaying section displays the list of goods information. FIG. 33 shows an example of the goods information displayed in this manner. That is, the goods information included within the 20 seconds including the time point of inputting of the input voice 2022 at the time selection is displayed as shown in FIG. 33. As such, the goods information specified by the time position is presented to the user.

While looking at the list of goods information of FIG. 33, the user inputs a voice of specifying desired goods information into the microphone 321 (step 526). For example, a suit is to be specified, a voice such as "that suit is good" of specifying a suit is uttered toward the microphone 321.

Next, the speech recognition section 377 reads the Ngram syntax information included within the 20 seconds including the time point of inputting of the input voice 2022 at the time selection, from the voice and goods information and language model information storing section 2019, and then performs speech recognition by using the read-out Ngram syntax information (step 527). That is, when the user utters "that suit is good", the speech recognition section 377 performs continuous speech recognition by using the Ngram syntax information read from the voice and goods information and language model information storing section 2019 and then optimized as described in Embodiment 3. The method of optimizing the Ngram syntax information is similar to that of Embodiment 3, and hence detailed description is omitted. As a result, the statement "that suit is good" is recognized. The Ngram syntax information is used in dividing into words the pronunciation sequence having been speech-recognized in the speech recognition.

It is assumed that using the Ngram syntax information, the speech recognition section 377 has recognized the words "that", "suit", and "is good". Then, the speech recognition section 377 outputs the word sequence "that", "suit", and "is good" to the information selecting section 2020.

Then, since the suit which is the keywords corresponding to the keyword information contained in the voice and goods information and language model information storing section 2019 agrees with the suit which is the word obtained by the speech recognition, the information selecting section 2020 specifies the additional information of suit.

At step 530, the information selecting section 2020 outputs the specified additional information as the selected information 2013 to the transmitting section 319. The transmitting section 319 transmits to the broadcasting station the purchase information contained in the selected information 2013, together with an identification number or the like of the corresponding additional information (step 530).

In Embodiment 7, at step 526, a voice has been inputted after looking at the list of FIG. 33. However, similarly to Embodiment 5, the voice input may be performed when the scene specified by the time position is displayed again.

The modifications described in Embodiment 5 are similarly applicable to Embodiment 7.

As such, according to the present embodiment, the operation of presenting or specifying additional information (goods information) is performed not during the watching of a program but after the end of the program or the interruption of the program. This allows the additional information (goods information) to be specified without interrupting the watching of the program in the course that the user watches the program.

Figure 36:
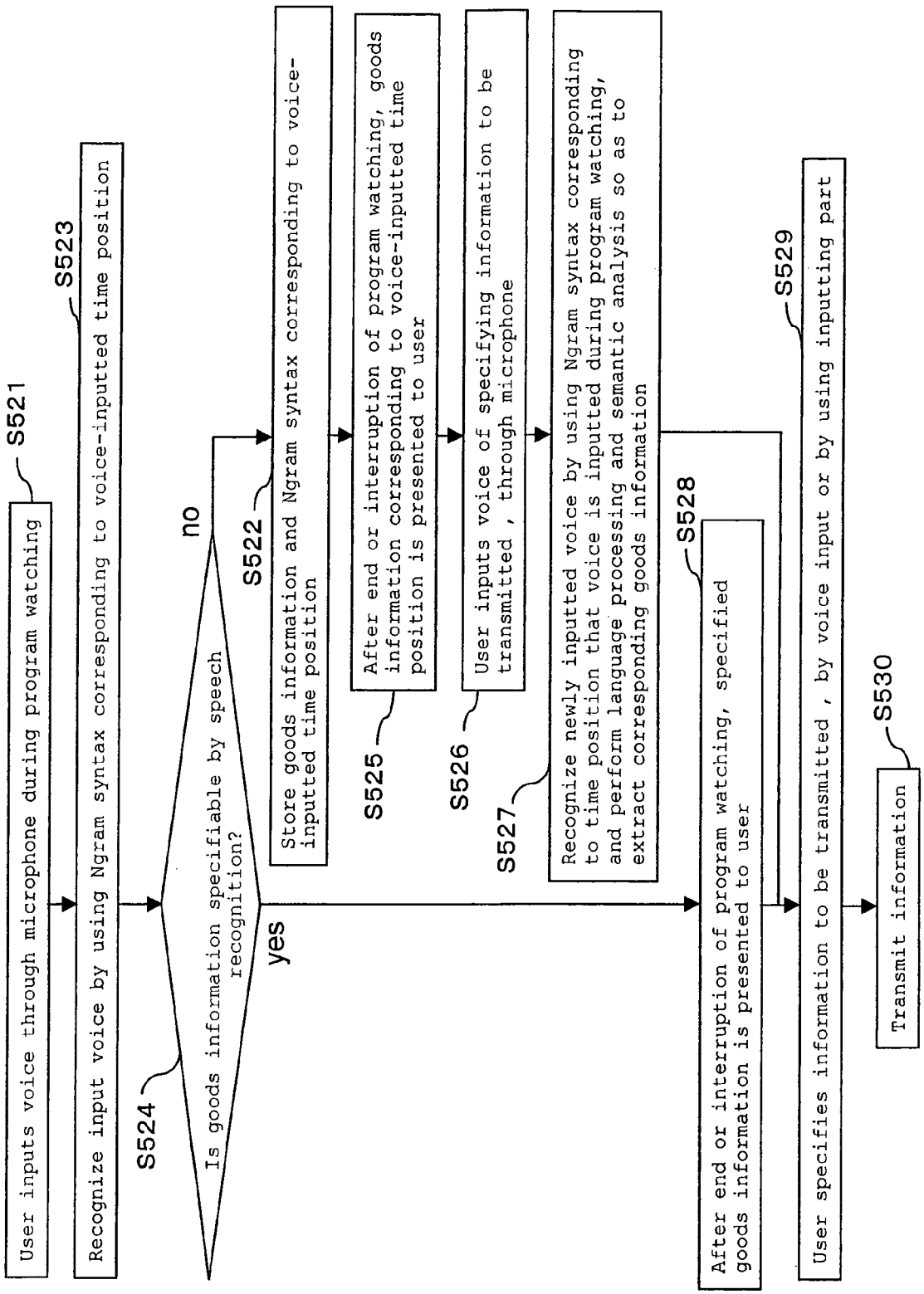
FIG. 36 is a flow chart showing the operation of a shopping assistance system employing two-way broadcasting according to Embodiment 7 of the present invention, in which the operation is different from that of FIG. 35.
Figure 37:
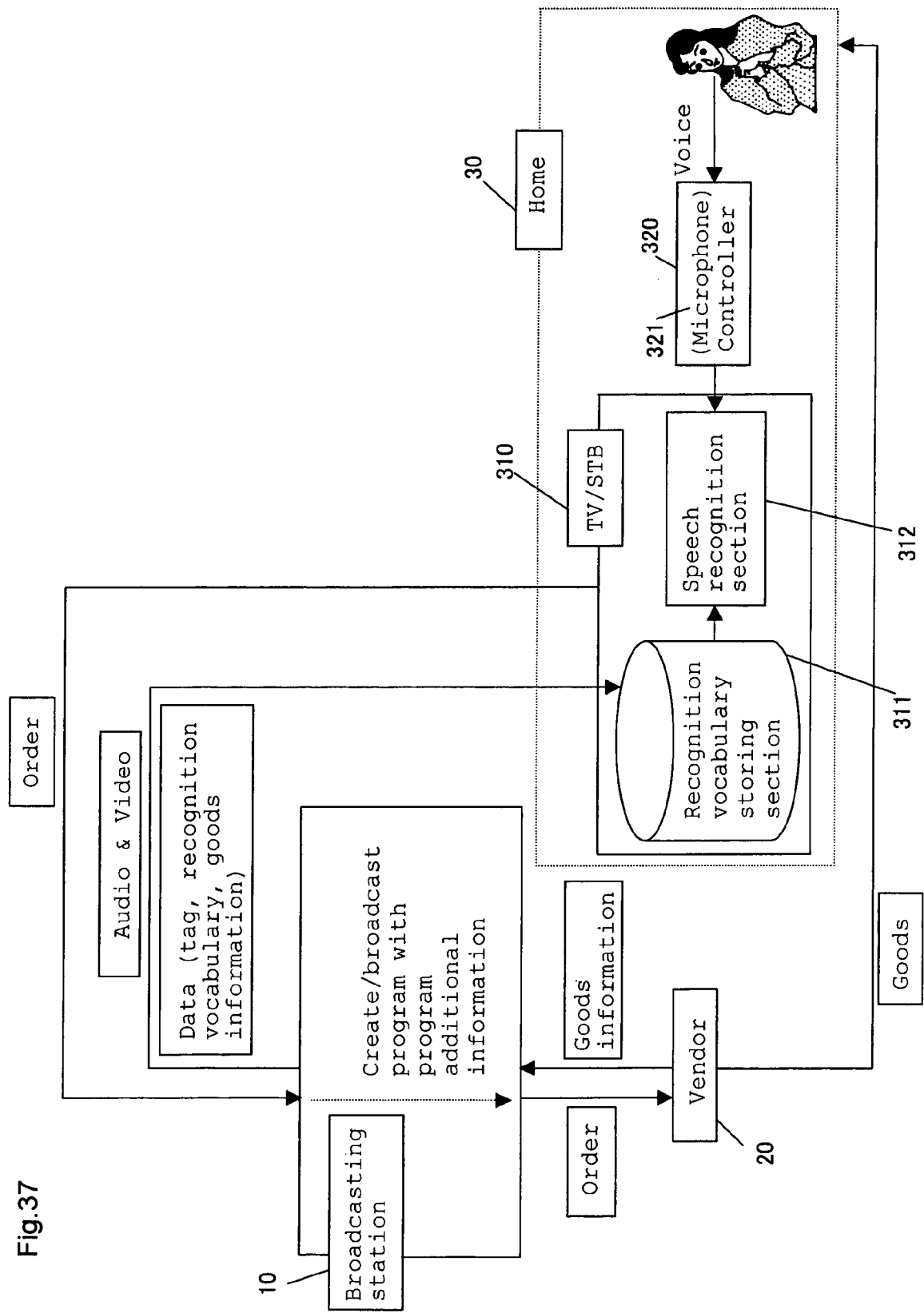
FIG. 37 is a block diagram showing the conceptual configuration of a shopping assistance system employing two-way broadcasting in a previous application of the present inventor.
Figure 38:
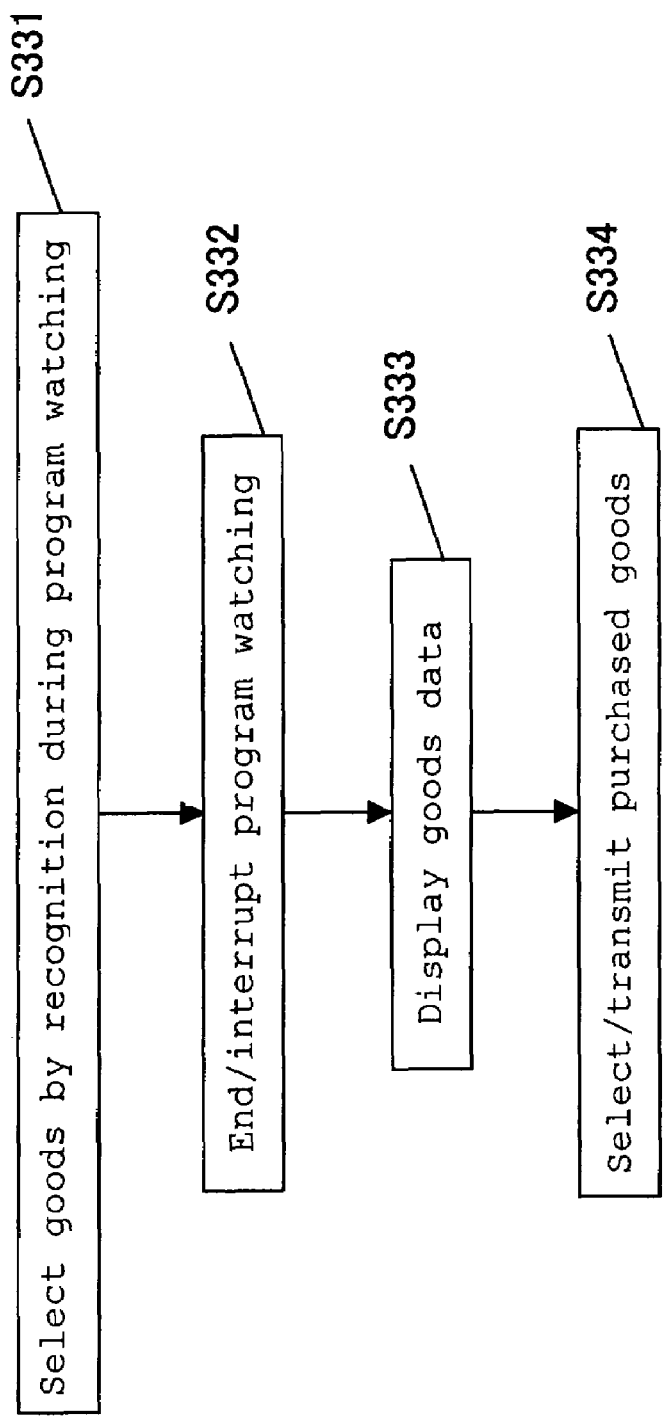
FIG. 38 is a flow chart showing the operation of a shopping assistance system employing two-way broadcasting in a previous application of the present inventor.
Figure 39:
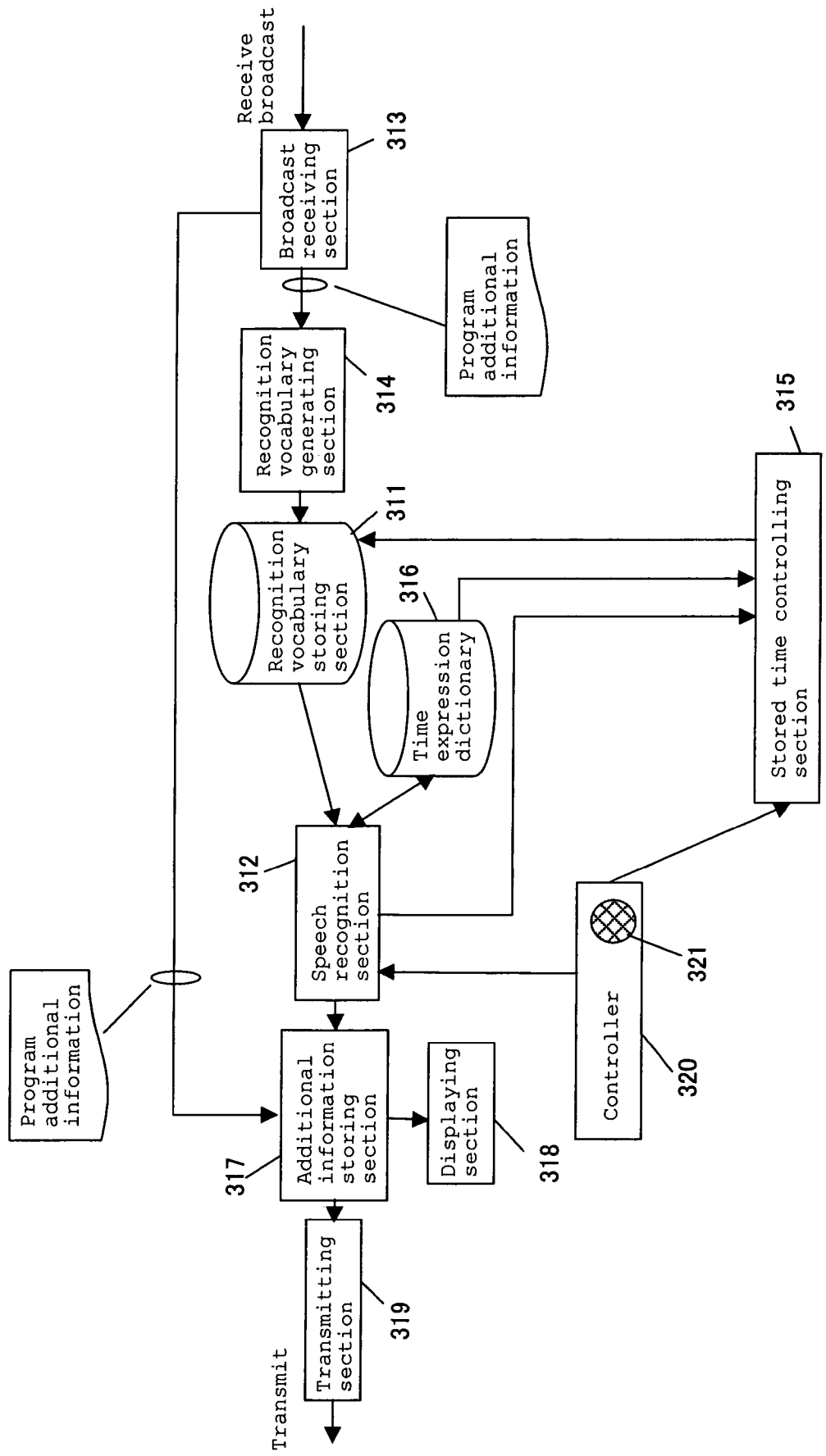
FIG. 39 is a block diagram showing a detailed configuration of a shopping assistance system employing two-way broadcasting in a previous application of the present inventor.

Further, in the present embodiment, description has been given for the case that the operation is performed according to the flow chart of FIG. 35. However, the invention is not limited to this. The operation may be performed according to the flow chart of FIG. 36. In the flow chart of FIG. 36, the insertion position of step 522 differs from that of the flow chart of FIG. 35. That is, in FIG. 35, step 522 has been performed before step 524. In contrast, in FIG. 36, step 522 is performed only when the goods information cannot be specified by speech recognition at step 524. As such, even in case that the goods information and the Ngram syntax corresponding to the time position of voice input are stored only when the goods information cannot be specified by speech recognition, similar effect to that of the present embodiment is obtained.

(Related Art 1)

Next, Related Art 1 which has relevance to the present invention is described below.

Figure 26:
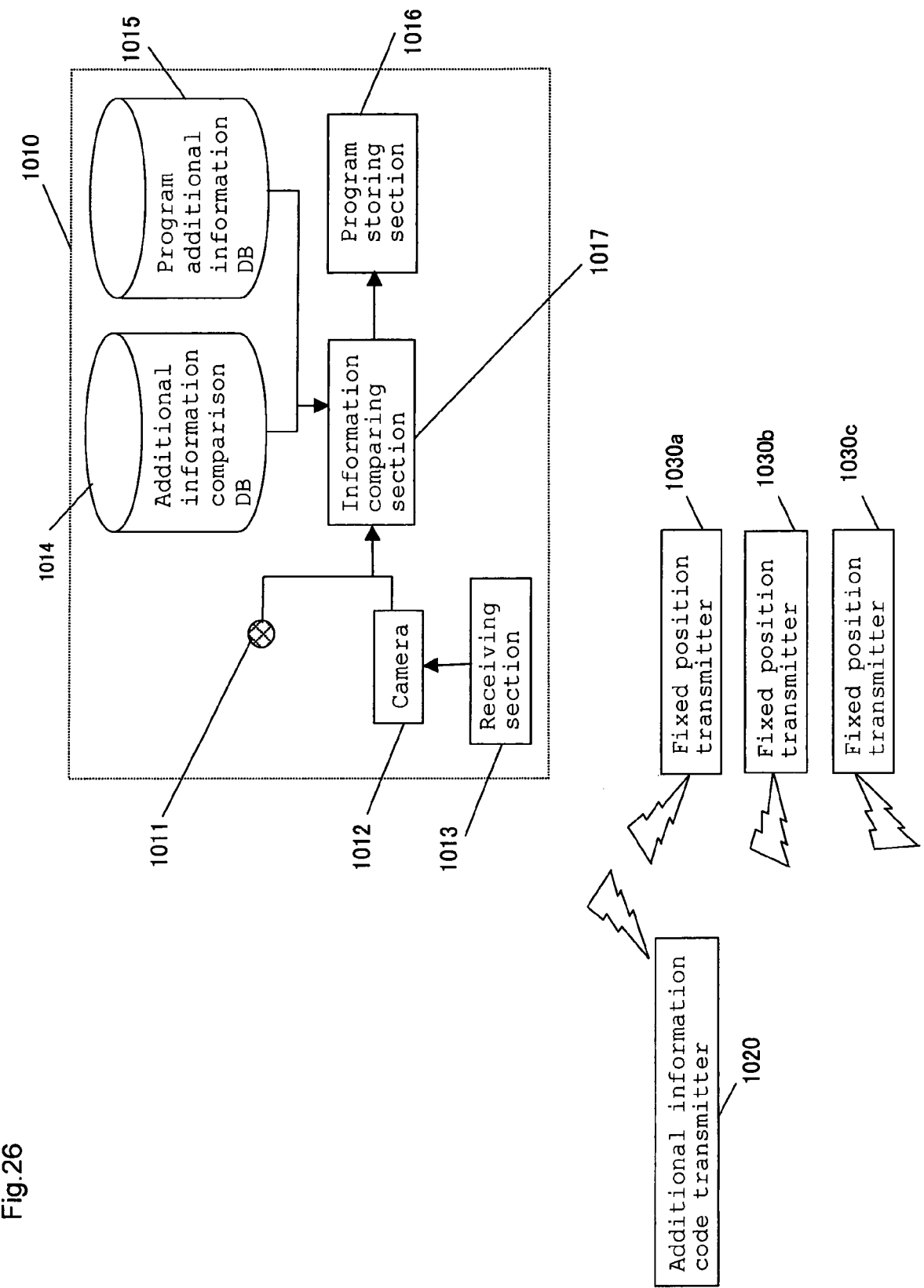
FIG. 26 is a block diagram showing the configuration of an automatic program additional information generating apparatus according to Related Art 1 of the present invention.
Figure 27:
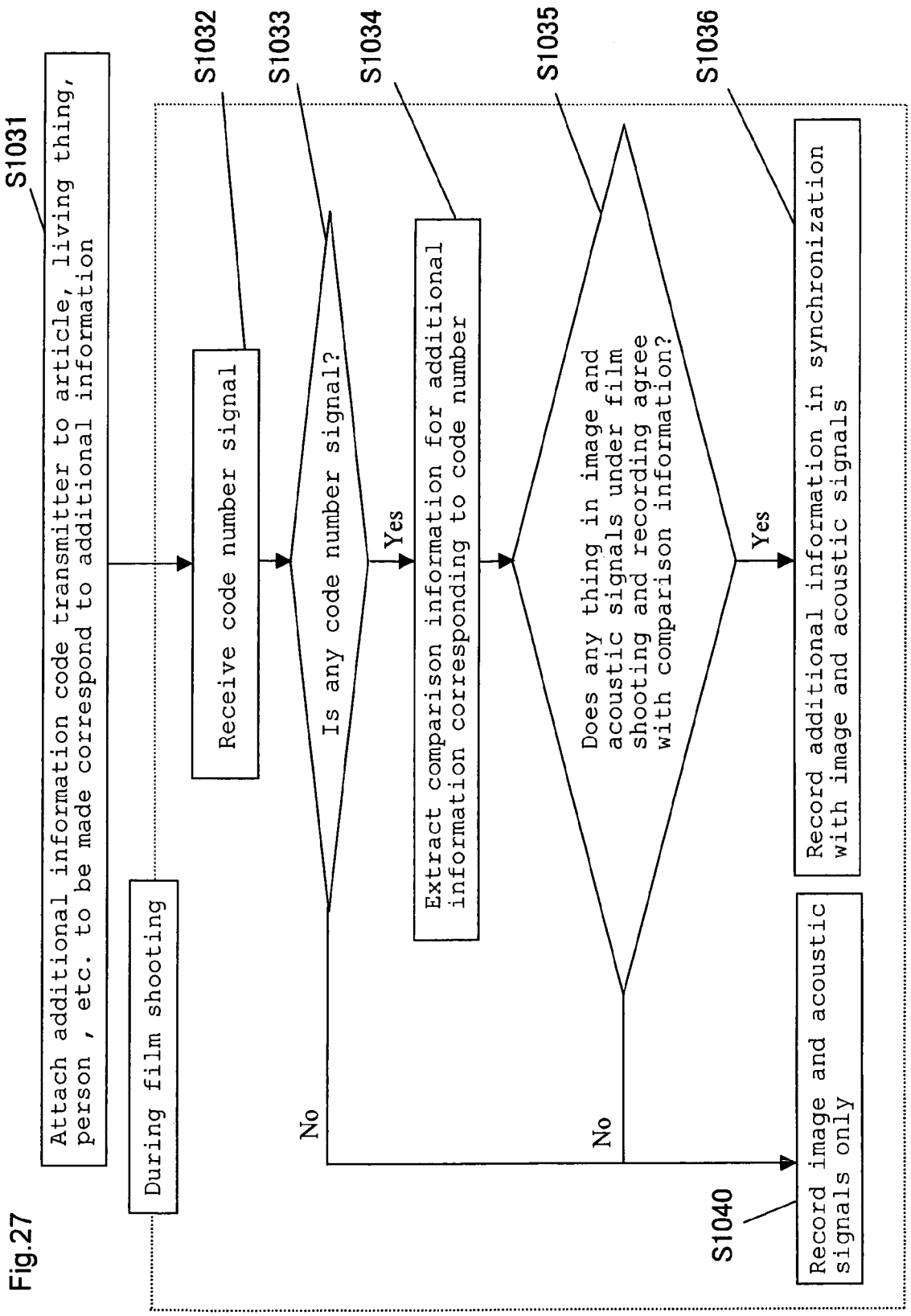
FIG. 27 is a flow chart showing the operation of an automatic program additional information generating apparatus according to Related Art 1 of the present invention.

FIG. 26 is a functional block diagram showing the part of automatically generating the shopping-use program additional information simultaneously with the program creation, in a shopping assistance system according to Related Art 1 of the present invention. FIG. 27 is a flow chart showing the operation of automatically generating the shopping-use program additional information simultaneously with the program creation, in a shopping assistance system according to Related Art 1 of the present invention.

In FIG. 26, a program recorder 1010 and an additional information code transmitter 1020 are shown.

The additional information code transmitter 1020 is a transmitter of transmitting a code number of program additional information in the form of radio waves or infrared rays.

The program recorder 1010 is provided with a microphone 1011, a camera 1012, a receiving section 1013, a database 1014 for additional information comparison, an information comparing section 1017, a program additional information database 1015, and a program storing section 1016.

The receiving section 1013 is part of receiving a signal of the additional information code transmitter 1020. The database 1014 for additional information comparison is a database of recording the code number of program additional information and the comparison information of the program additional information. The information comparing section 1017 is part of judging whether an article, a living thing, or a person corresponding to the additional information code received by the receiving section 1013 is recorded in the image and acoustic signals inputted through the camera and the microphone, on the basis of the contents of the database 1014 for additional information comparison. The program additional information database 1015 is a database of storing the additional information to be recorded onto the program. The program storing section 1016 is part of recording the image and acoustic signals and the program additional information in a synchronized manner.

Next, the operation of Related Art 1 having such a configuration is described below.

The following description is given with reference to FIG. 27. In case that the operation is performed according to the flow chart of FIG. 27, only when an object among many objects such as an article, a living thing, and a person is appearing in the video, the broadcast contents of broadcasting the program additional information of the object is automatically created.

First, the outline of operation is described below with reference to the flow chart of FIG. 27.

First, before the film shooting, the additional information code transmitter 1020 is attached to an article, a living thing, or a person having corresponding additional information (step 1031).

In the film shooting, the camera 1012 and the microphone 1011 acquire the image and acoustic signals. At the same time, the receiving section 1013 receives a signal transmitted from the additional information code transmitter (step 1032).

Next, in the information comparing section 1017, the presence of absence of a signal of the transmitter is judged. At the same time, it is judges whether an additional information code is contained in a received signal (step 1033). At step 1033, when no signal of the transmitter is present, or alternatively when no additional information code is contained in a received signal, the image and acoustic signals inputted through the camera 1012 and the microphone 1011 are solely recorded (step 1040).

On the other hand, at step 1033, when an additional information code is present in the receiving contents, comparison information corresponding to the additional information code is extracted from the database 1014 for additional information comparison (step 1034). Then, the information comparing section 1017 judges whether any information among the image and acoustic signals inputted through the camera 1012 and the microphone 1011 agrees with the comparison information (step 1035).

At step 1035, when no information among the inputted image and acoustic signals is judged to agree with the comparison information, the image and acoustic signals inputted through the camera 1012 and the microphone loll are solely recorded (step 1040).

At step 1035, when certain information among the inputted image and acoustic signals is judged to agree with the comparison information, corresponding program additional information is extracted from the program additional information database 1015, and then recorded in synchronization with the image and acoustic signals (step 1036).

Figure 28:
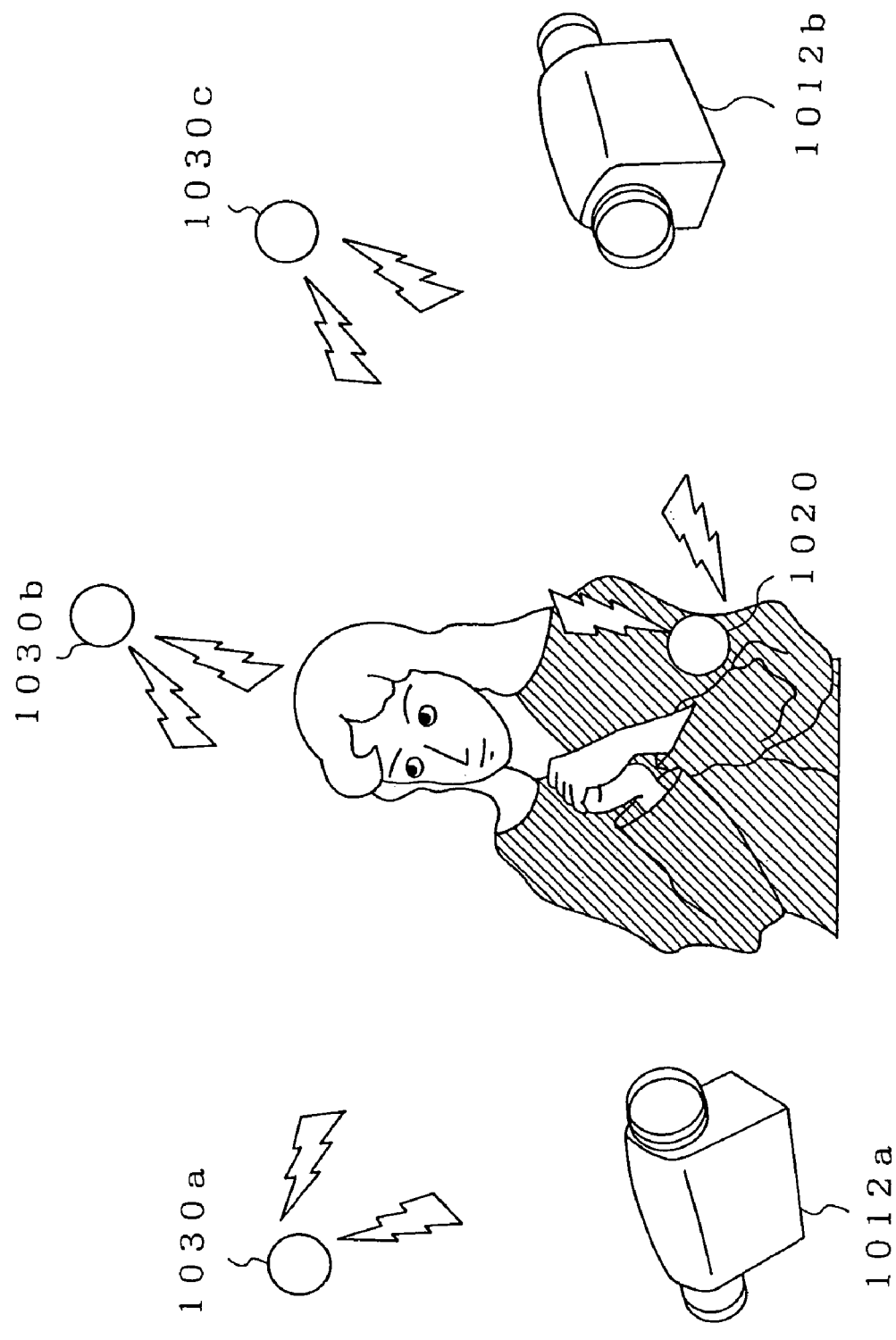
FIG. 28 is a diagram showing the relation between a camera, fixed position transmitters, and an additional information code transmitter according to Related Art 1 of the present invention.

FIG. 28 shows a film shooting site where broadcast contents such as a program and a commercial is created. The camera 1012 is installed in the film shooting site. The position of the camera 1012 can be moved. For example, the camera 1012 can be moved arbitrarily from the position of a camera 1012*a* to the position of a camera 1012*b*.

Further, in the film shooting site, fixed position transmitters 1030*a*, 1030*b*, and 1030*c* are installed at fixed positions different from each other. These fixed position transmitters 1030*a*, 1030*b*, and 1030*c* construct three-dimensional fixed coordinates. In FIG. 28, description has been given for the case that the three fixed position transmitters 1030*a*, 1030*b*, and 1030*c* are installed at fixed positions. However, the invention is not limited to this. The more than three fixed position transmitters may be installed at fixed positions.

The position and the orientation of the camera 1012 can be changed. Then, when signals are received from the fixed position transmitters 1030*a*, 1030*b*, and 1030*c*, the information of own position and orientation of the camera 1012 can be calculated with respect to the above-mentioned coordinates.

On the other hand, when receiving signals from the fixed position transmitters 1030*a*, 1030*b*, and 1030*c*, the additional information code transmitter 1020 calculates its own position on the coordinates. Then, the additional information code transmitter 1020 transmits its own position on the coordinates.

The camera 1012 judges whether the additional information code transmitter 1020 is present within the field of view of the camera 1012, on the basis of: the own position and orientation of the camera 1012 with respect to the coordinates; the position of the additional information code transmitter 1020 with respect to the coordinates; and the focal length and the viewing angle which are internal information of the camera 1012.

Then, when the additional information code transmitter 1020 is determined as present within the field of view of the camera 1012, the camera 1012 outputs to the information reference section 1017 the additional information code transmitted from the additional information code transmitter 1020. When the additional information code transmitter 1020 is determined not as present within the field of view of the camera 1012, the camera 1012 does not output to the information reference section 1017 the additional information code transmitted from the additional information code transmitter 1020. Then, when the additional information code 1020 is being transmitted, the information reference section 1017 records the program additional information corresponding to the additional information code 1020, in synchronization with the video and the voice. As a result, the broadcast contents of broadcasting the program additional information made to correspond to the object can be created automatically only when the object is appearing in the video image.

As described above, the system that automatically creates program additional information simultaneously with program creation according to Related Art 1 avoids the necessity of the work that a film manufacturer checks all scenes after the program creation so as to impart and record the program additional information to the program. This reduces the necessary work time and work cost in program creation.

In Related Art 1, the additional information code transmitter 1020 has transmitted the code number of the additional information. However, the additional information code transmitter 1020 may transmits data for additional information comparison. Then, the information comparing section 1016 may use no database for additional information comparison, and may perform comparison with the image and acoustic signals on the basis of the received data.

In Related Art 1, the information comparing section 1017 has extracted the program additional information corresponding to the code number from the program additional information database, and then recorded the information in synchronization with the image and acoustic signals. However, tag information that links the program and the additional information may be recorded.

The recording medium of the present invention is a computer-readable recording medium which carries a program of causing a computer to perform all or a part of the function of all or a part of parts (or apparatuses, elements, or the like) of the second apparatus of the present invention described above, wherein said program having been read out performs said function in cooperation with said computer.

said phrase "a part of parts (or apparatuses, elements, or the like)" of the present invention indicates a piece or pieces of part among plural pieces of the parts, while said phrase "a part of steps (or process steps, operations, actions, or the like)" of the present invention indicates a step or steps among a plurality of the steps.

said phrase "the function of part (or an apparatus, an element, or the like)" of the present invention indicates all or a part of the function of said part, while said phrase "the operation of a step (or a process step, an operation, an action, or the like)" of the present invention indicates all or a part of the operation of said step.

The scope of the recording medium of the present invention includes a ROM.

The above-mentioned computer according to the present invention is not restricted to genuine hardware such as a CPU, and may be firmware, an OS, and a peripheral device.

As described above, the configuration according to the present invention may be implemented by software or hardware.

As seen from the description given above, the present invention provides a broadcast receiving method, a broadcast receiving system, a first apparatus, a second apparatus, a recording medium, and a program which allow an object appearing in a broadcasted program or a broadcasted commercial to be acquired more easily with less time and effort.

The present invention provides a broadcast receiving method, a broadcast receiving system, a first apparatus, a second apparatus, a recording medium, and a program which allow an object appearing in a broadcasted program or a broadcasted commercial to be acquired easily without much time and effort, in a manner suitable for the expression uttered by a viewing person.

The present invention provides a broadcast receiving method, a broadcast receiving system, a first apparatus, a second apparatus, a recording medium, and a program which allow an object appearing in a broadcasted program or a broadcasted commercial to be acquired easily without much time and effort, in a manner suitable for the interest of a viewing person.

The invention claimed is:

1. A broadcast receiving method comprising:
a receiving step of receiving, simultaneously with broadcast contents, additional information containing keyword information for specifying an object that appears in the broadcast contents, and a scene code indicating a scene of the broadcast contents, the additional information and the scene code being broadcasted;
a language model specifying step of specifying, out of language models retained in advance, the language model corresponding to the received scene code when the scene code is received;
a speech recognition step of performing speech recognition of a voice uttered by a viewing person, by using the specified language model;
a specifying step of specifying the keyword information based on the speech recognition result; and
a displaying step of displaying the additional information containing the specified keyword information.

2. The broadcast receiving method according to claim 1, further comprising:
a correcting step of utilizing a synonym dictionary, in which a plurality of words are classified into word classes based on synonymy between the words, thereby correct a frequency of appearance of a predetermined combination of the word classes in an expression form of the specified language model and/or a frequency of appearance of a predetermined word with reference to a predetermined word class in the expression form of the specified language model, based on history information on speech recognition results of already performed speech recognition,
wherein the speech recognition step performs the speech recognition by using the corrected language models.

3. A broadcast receiving system comprising:
a first apparatus comprising a broadcasting part broadcasting additional information containing keyword information for specifying an object that appears in broadcast contents, and a scene code indicating a scene of the broadcast contents, and
a second apparatus comprising:
a receiving part receiving, simultaneously with the broadcast contents, the additional information and the scene code;
a language model specifying part specifying, out of language models retained in advance, the language model corresponding to the received scene code when the scene code is received;
a speech recognition part performing speech recognition of a voice uttered by a viewing person, by using the specified language model;
a specifying part specifying the keyword information based on the speech recognition result; and
a displaying part displaying the additional information containing the specified keyword information.

4. The broadcast receiving system according to claim 3, wherein
the second apparatus further comprises a correcting part utilizing a synonym dictionary, in which a plurality of words are classified into word classes based on a synonymy between the words, to thereby correct a frequency of appearance of a predetermined combination of the word classes in an expression form of the specified language model and/or a frequency of appearance of a predetermined word with reference to a predetermined word class in the expression form of the specified language model, based on history information on speech recognition results of already performed speech recognition, and
the speech recognition part performs the speech recognition by using the corrected language model.

5. A first apparatus comprising
a broadcasting part broadcasting additional information containing keyword information for specifying an object that appears in broadcast contents, and a scene code indicating a scene of the broadcast contents, wherein
the additional information and the scene code are, simultaneously with the broadcast contents, received,
a language model corresponding to the received scene code when the scene code is received is, out of the language models retained in advance, specified,
speech recognition of a voice uttered by a viewing person is, by using the corrected specified language model, performed,
the keyword information is specified based on the speech recognition result, and
the additional information containing the specified keyword information is displayed.

6. The first apparatus according to claim 5, wherein
a synonym dictionary, in which a plurality of words are classified into word classes based on a synonymy between the words, is utilized to thereby correct a frequency of appearance of a predetermined combination of the word classes in an expression form of the specified language model and/or a frequency of appearance of a predetermined word with reference to a predetermined word class in the expression form of the specified language model, based on history information on speech recognition results of already performed speech recognition, and
the speech recognition is performed by using the corrected language model.

7. A second apparatus comprising:
a receiving part receiving, simultaneously with broadcast contents, additional information containing keyword information for specifying an object that appears in the broadcast contents, and a scene code indicating a scene of the broadcast contents, the additional information and the scene code being broadcasted;
a language model specifying part specifying, out of language models retained in advance, the language model corresponding to the received scene code when the scene code is received;
a speech recognition part performing speech recognition of a voice uttered by a viewing person, by using the specified language model;
a specifying part specifying the keyword information based on the speech recognition result; and
a displaying part displaying the additional information containing the specified keyword information.

8. The second apparatus according to claim 7, further comprising
a correcting part utilizing a synonym dictionary, in which a plurality of words are classified into word classes based on a synonymy between the words, to thereby correct a frequency of appearance of a predetermined combination of the word classes in an expression form of the specified language model and/or a frequency of appearance of a predetermined word with reference to a predetermined word class in the expression form of the specified language model, based on history information on speech recognition results of already performed speech recognition wherein the speech recognition part performs the speech recognition by using the corrected language model.

9. The second apparatus according to claim 7, wherein the language model is specified by using an ID imparted to the language model in advance.

10. The second apparatus according to claim 7, wherein
the language model is specified by using keyword information for language model specification,
the keyword information for language model specification is imparted also to the language model retained in advance, and
the language model specifying part specifies the language model depending on a degree of agreement of those keywords for language model specification.

11. The second apparatus according to claim 8, wherein
if the correcting part corrects the frequency of appearance of the predetermined word with reference to the predetermined word class in the expression form of the language model, the history information containing a word recognized in the already performed speech recognition, and
the correcting part extracts a word contained in the word class containing the word corresponding to the keyword information,
with respect to a word contained in the history information among the extracted words, the frequency of appearance of the word with reference to the word class in the expression form of the language model is increased, and
with respect to a word not contained in the history information among the extracted words, the frequency of appearance of the word with reference to the word class in the expression form of the language model is decreased.

12. The second apparatus according to claim 8, wherein
if the correcting part corrects the frequency of appearance of the predetermined combination of the word classes in the expression form of the language model, the history information containing a word recognized in the already performed speech recognition,
the correcting part extracts a word class containing the word corresponding to the keyword information,
with respect to the extracted word class, the frequency of appearance of the predetermined combination of the word classes in the expression form of the language model is increased, and
with respect to a word class not extracted, the frequency of appearance of the predetermined combination of the word classes in the expression form of the language model is decreased.

13. The second apparatus according to claim 8 wherein
if the correcting part corrects the frequency of appearance of the predetermined combination of the word classes in the expression form of the language model, the history information containing a word class containing a word recognized in the already performed speech recognition,
the correcting part extracts a word class corresponding to the keyword information,
with respect to the extracted word class, the frequency of appearance of the predetermined combination of the word classes in the expression form of the language model is increased, and
with respect to a word class not extracted, the frequency of appearance of the predetermined combination of the word classes in the expression form of the language model is decreased.

14. The second apparatus according to any one of claims 7-10, further comprising a transmitting part transmitting an instruction corresponding to a predetermined operation to a predetermined transmission destination when the predetermined operation is performed on the displayed additional information.

15. The second apparatus according to claim 14, wherein
the additional information is goods sales information and/or services sales information,
the instruction corresponding to the predetermined operation is a request for brochure or purchase instruction information concerning the goods and/or the service.

16. The second apparatus according to claim 7, wherein the language model retained in advance has been acquired in advance through a network.

17. The broadcast receiving method according to claim 1, wherein
the scene code is broadcasted every time the scene has changed,
the receiving step receives the scene code broadcasted every time the scene has changed,
the language model specifying step specifies the language model every time the scene code has received, and
the speech recognition step performs the speech recognition by using the language model specified every time the scene code is received.

18. The broadcast receiving system according to claim 3, wherein
the broadcasting part broadcasts the scene code every time the scene has changed,
the receiving part receives the scene code broadcasted every time the scene has changed,
the language model specifying part specifies the language model every time the scene code has received, and
the speech recognition part performs the speech recognition by using the language model specified every time the scene code is received.

19. A speech recognition method comprising:
a receiving step of receiving, simultaneously with broadcast contents, a scene code indicating a scene of the broadcast contents broadcasted;
a language model specifying step of specifying, out of language models retained in advance, the language model corresponding to the received scene code when the scene code is received; and
a speech recognition step of performing speech recognition of a voice uttered by a viewing person, by using the specified language model.

20. A speech recognition apparatus comprising:
a receiving part receiving, simultaneously with broadcast contents, a scene code indicating a scene of the broadcast contents broadcasted;
a language model specifying part specifying, out of language models retained in advance, the language model corresponding to the received scene code when the scene code is received; and
a speech recognition part performing speech recognition of a voice uttered by a viewing person, by using the specified language model.

* * * * *